(12) United States Patent
Shigeta

(10) Patent No.: US 11,983,991 B2
(45) Date of Patent: May 14, 2024

(54) CASINO SYSTEM, CASINO ITEM, AND METHOD OF PROVIDING CASINO ITEMS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/443,617

(22) Filed: Jul. 27, 2021

(65) Prior Publication Data
US 2022/0036698 A1 Feb. 3, 2022

(30) Foreign Application Priority Data
Jul. 29, 2020 (JP) .................................. 2020-128075

(51) Int. Cl.
*G07F 17/32* (2006.01)
*G06F 16/23* (2019.01)
(Continued)

(52) U.S. Cl.
CPC ...... *G07F 17/3241* (2013.01); *G06F 16/2365* (2019.01); *G06K 19/0723* (2013.01);
(Continued)

(58) Field of Classification Search
CPC ............ G07F 17/3241; G07F 16/3265; G07F 17/322; G06V 10/10; G06K 19/0723; G06F 16/3265
(Continued)

(56) References Cited

U.S. PATENT DOCUMENTS

2003/0222792 A1\* 12/2003 Berman .................. G07F 9/026
340/5.1
2007/0060311 A1\* 3/2007 Rowe ................... G07F 17/3251
463/25
(Continued)

FOREIGN PATENT DOCUMENTS

EP 1973081 A2 9/2008
EP 3324374 A1 5/2018
(Continued)

OTHER PUBLICATIONS

International Search Report dated Oct. 26, 2021 issued in PCT Application PCT/JP2021/027653 cites the patent documents above.
(Continued)

*Primary Examiner* — Jay Trent Liddle
*Assistant Examiner* — Ryan Hsu
(74) *Attorney, Agent, or Firm* — NORTON ROSE FULBRIGHT US LLP

(57) ABSTRACT

A casino system in a casino that uses a gaming chip with an RFID tag that stores identification information is installed in the casino and has an activation reader/writer that reads the identification information from the RFID tag of the gaming chip, and a registration device that determines the authenticity of the gaming chip and registers the gaming chip that is determined to be authentic as usable supplies. The registration device determines the authenticity of the gaming chip based on whether or not the identification information given by a manufacturer of the gaming chip matches the identification information read from the RFID tag of the gaming chip by the activation reader/writer. The identification information of the gaming chip that is determined to be genuine is registered as the identification information of the gaming chip that can be used.

48 Claims, 33 Drawing Sheets

(51) Int. Cl.
*G06K 19/07* (2006.01)
*G06V 10/10* (2022.01)

(52) U.S. Cl.
CPC .......... *G06V 10/10* (2022.01); *G07F 17/322* (2013.01); *G07F 17/3251* (2013.01)

(58) Field of Classification Search
USPC .......................................................... 463/29
See application file for complete search history.

(56) References Cited

U.S. PATENT DOCUMENTS

| | | |
|---|---|---|
| 2010/0105486 A1 | 4/2010 | Shigeta |
| 2018/0053377 A1* | 2/2018 | Shigeta ............... G07F 17/3241 |
| 2018/0144166 A1* | 5/2018 | Shigeta ............... G07F 17/3232 |
| 2019/0333322 A1 | 10/2019 | Shigeta |
| 2021/0287488 A1 | 9/2021 | Shigeta |

FOREIGN PATENT DOCUMENTS

| | | |
|---|---|---|
| EP | 3324375 A1 | 5/2018 |
| WO | 2008120749 A1 | 10/2008 |
| WO | 2018025622 A1 | 2/2018 |
| WO | 2018092501 A1 | 5/2018 |

OTHER PUBLICATIONS

European Search Report dated Dec. 15, 2021 issued in EP Application 21188242.8 cites the patent documents above.
European Search Report dated Dec. 8, 2023 issued in EP Application 21849154.6.

\* cited by examiner

17

| ID NUMBER | CASINO NAME | TYPE | FACE VALUE | LOCATION INFORMATION HISTORY |
|---|---|---|---|---|
| ⋮ | ⋮ | ⋮ | ⋮ | ⋮ |
| apxx7216-3319 | ABC Casino | ROLLING CHIP FOR VIP | $500 | ○→○→⋯→○→○ |
| apxx7216-3320 | ABC Casino | ROLLING CHIP FOR VIP | $1,000 | ○→○→⋯→○→○ |
| apxx7216-3321 | ABC Casino | ROLLING CHIP FOR VIP | $1,000 | ○→○→⋯→○→○ |
| ⋮ | ⋮ | ⋮ | ⋮ | ⋮ |

FIG.17

CHIP READING RESULT AT BETTING AREA

| PLACE AND ID OF BET CHIP | ONE PIECE ON BANKER (ID3) | TWO PIECES ON BANKER (ID12 AND 13) TWO PIECES ON BANKER PAIR (ID6 AND 18) | TWO PIECES ON PLAYER (ID29 AND 54) | ONE PIECE ON BANKER PAIR (ID75) ONE PIECE ON PLAYER PAIR (ID77) | ONE PIECE ON BANKER (ID97) ONE PIECE ON PLAYER PAIR (ID68) |
|---|---|---|---|---|---|
| READING RESULT BY CAMERA | ONE PIECE ON BANKER | TWO PIECE ON BANKER | TWO PIECES ON PLAYER | NONE | ONE PIECE ON BANKER ONE PIECE ON PLAYER PAIR |
| READING RESULT BY RFID (READ ID) | ID3 | ID6, 12, 13, 18 | ID29, 54 | NONE | ID68, 97 |
| SITTING NUMBER | 6 | 5 | 3 | 2 | 1 |

| GAME RESULT DETERMINED BY GAME RESULT DETERMINATION DEVICE | BANKER WINS |
|---|---|
| ID THAT CHIP TRAY DETERMINATION DEVICE DETERMINES BEING INCREASED FROM BEFORE COLLECTION TO AFTER COLLECTION | ID6, 18, 29, 54, 68, 75, 77 |

FIG.21

CASINO SYSTEM, CASINO ITEM, AND METHOD OF PROVIDING CASINO ITEMS

CROSS REFERENCE TO RELATED APPLICATION

This nonprofessional application claims priority to JP Pat. App. No. 2020-128075 filed Jul. 29, 2020, the entire contents of which are hereby incorporated by reference.

FIELD

The present disclosure relates to a casino system applied to casinos that use casino items, casino item that can be used in casino, and a method for providing casino items.

BACKGROUND

Casino items used in casinos requires high security, and casino items should be strictly controlled. For example, casino items is manufactured in a manufacturing factory, but there is a risk of theft by malicious persons during the process of transporting the equipment from the manufacturing factory to the casino and using it on the floor. There is also a risk of counterfeit casino items being used on the casino floor to help players win games unfairly.

SUMMARY

One of the purposes of the present disclosure is to enhance the security management of casino items.

The casino system of one aspect of the present disclosure is a casino system in a casino that uses casino items to which RFID tags storing identification information are attached, and has a first reading device installed in the casino and configured to read the identification information from the RFID tags of the casino items, and a registration device configured to determine an authenticity of the casino item based on whether or not identification information given by a manufacturer of the casino items matches the identification information read from the RFID tag of the casino item by the first reading device.

With this configuration, the casino item is registered as a usable casino item in the backyard of the casino, and when an unregistered casino item is stolen in the process of being transported to the casino and used on a casino floor, such an unregistered casino item can be detected. In addition, at the casino, the identification information given by the manufacturer of the casino items is checked against the identification information stored in the RFID tag of the casino items before registration, so that the registration can be carried out after confirming that the casino items were indeed manufactured at the casino items manufacturing factory.

The above casino system may further comprise a verification device that is installed at a casino items handling location in the casino and that checks the identification information read from the casino items against the identification information of the casino items registered by the registration device.

In the above casino system, the registration device may invalidate the registration under a predetermined condition for the identification information registered as identification information of usable casino item.

In the above casino system, the registration device may invalidate the registration of the identification information for the casino item that cannot read the identification information.

In the above casino system, the casino item may carry information for identifying the casino item in a manner other than the RFID tag, and the registration device may invalid the registration of the identification information using the information for identifying the casino item for the casino item that cannot read the identification information.

In the above casino system, the identification information may include the tag identification information assigned by the manufacturer of the RFID tags and the item identification information assigned by the manufacturer of the casino items.

In the above casino system, the verification device may normally match the item identification information read from the casino item at the casino item handling location in the casino with the item identification information read in the past, and at a predetermined timing and/or under a predetermined condition, match the tag identification information read from the casino item at the casino item handling location with the tag identification information of the casino item registered in the registration device.

In the above casino system, the identification information given by the manufacturer of the casino items may be encrypted, and the registration device may have a function to decrypt the encrypted identification information.

In the above casino system, the registration device may store the identification information of the usable casino item with a flag indicating that the casino item is usable.

In the above casino system, the first reading device may simultaneously read the identification information from the RFID tags of the plurality of casino items, and the registration device may simultaneously determine the authenticity of the plurality of casino items.

In the above casino system, the plurality of casino items may be contained in a single case, the case may have case identification information, the registration device may determine the authenticity of each case, the casino system may further comprise a second reading device configured to read the case identification information, and the registration device may further determine whether or not the case identification information given by the manufacturer of the casino items matches the case identification information read by the second reading device.

In the above casino system, the plurality of casino items may be contained in a single case that can contain a predetermined number of the casino items, the registration device may determine authenticity of each case, and the registration device may compare the number of casino items based on the number of identification information read by the first reading device with the predetermined number of the casino items that can be contained in the case.

In the above casino system, the plurality of casino items may be contained in a single case, the case may be assigned case identification information, the registration device may determine authenticity of each case, the casino system may further comprise a second reading device configured to read the case identification information, and the registration device may identify the identification information of the plurality of casino items contained in the case based on the case identification information read by the second reading device, and determine authenticity based on whether or not the identified identification information matches the identification information read from the RFID tag of the casino items by the first reading device.

In the above casino system, the RFID tag may store manufacturing information indicating the manufacturing status of the casino item, type information indicating the type of the casino item, and/or information on the casino where the casino item is used, and the manufacturing information, the type information, and/or the casino information corresponding to the identification information may be given to the registration device along with the identification information by the manufacturer of the casino items.

In the above casino system, the manufacturer of the casino items may provide the type information along with the identification information to the registration device, and an operator of the registration device may specify the type of casino item to be determined, and the registration device may determine whether or not the type information given by the manufacturer of the casino items corresponding to the identification information read by the first reading device matches the type information specified by the operator.

In the above casino system, the RFID tag may store type information indicating the type of the casino item, and type of the casino item pertained to the determination may be specified by an operator of the registration device, and the registration device may determine whether or not the type information read by the first reading device matches the type information specified by the operator.

The above casino system may further comprise an identification device configured to capture an image of the casino item and identify type information of the casino item based on the image, and the registration device may be given the type information along with the identification information from the manufacturer of the casino items and the type information identified by the discriminating device, the registration device may determine whether or not the type information given by the manufacturer of the casino items corresponding to the identification information read by the first reading device matches the type information determined by the identification device.

The above-mentioned casino system may be further equipped with an identification device that photographs the casino item and determines the type information of the casino item from the photographic image, and the RFID tag may store the type information indicating the type of the casino item, and the registration device may determine whether the type information read by the first reading device and the type information determined by the identification device match. The registration device may determine whether or not the type information read by the first reading device and the type information determined by the identification device match.

In the above casino system, the type information may be information representing the value of the casino item.

In the above casino system, the casino items may further have the identification information in a manner other than the RFID tag.

In the above casino system, the identification information given by the manufacturer of the casino items may have date information added to it, and the registration device may determine whether or not a difference between the date information given by the manufacturer of the casino items and the current date exceeds a predetermined threshold.

In the above casino system, the casino item may be used by the player in the casino to bet in the game and can be redeemed for cash.

A casino item of the present disclosure is used in the above casino system, and is provided with an RFID tag storing identification information.

A method of providing casino items in one aspect of the present disclosure is a method of providing casino items that can be used in a casino, comprising: at a manufacturing factory, preparing an RFID tag with tag identification information; at the manufacturing factory, manufacturing a casino item including the RFID tag and storing item identification information in the RFID tag; transferring the casino item from the manufacturing factory to the casino; transferring a combination of the tag identification information and the item identification information from the manufacturing factory to the casino through a route different from a route used to transfer the casino item; at the casino, reading the tag identification information and the item identification information from the RFID tag of the casino item; and determining whether or not the combination of the tag identification information and the item identification information transferred from the manufacturing factory matches a combination of the tag identification information and the item identification information read from the casino item.

BRIEF DESCRIPTION OF DRAWINGS

FIG. 17 shows a database in another example of variation 4 of the embodiment of the present disclosure.

FIG. 21 shows a status of the game token wagered on a game table of Variant 4 of the embodiment of the present disclosure.

DETAILED DESCRIPTION OF NON-LIMITING EXAMPLE EMBODIMENTS

The following is a detailed description of the management system of the present disclosure with reference to the drawings. However, the disclosure is not limited by the following embodiments, and the components in the following embodiments include those that can be readily assumed by those skilled in the art or those that are substantially the same.

In the following, an example in which the casino items are gaming chips will be described, but casino items may be something other than gaming chips, for example, a shuffled playing card package in which multiple decks of playing cards are shuffled and packaged. In addition, a casino item does not have to be distributed in the casino like gaming chips, and do not have to be consumed in large quantities and disposed of in the casino like shuffle playing card packages.

Figure 1:
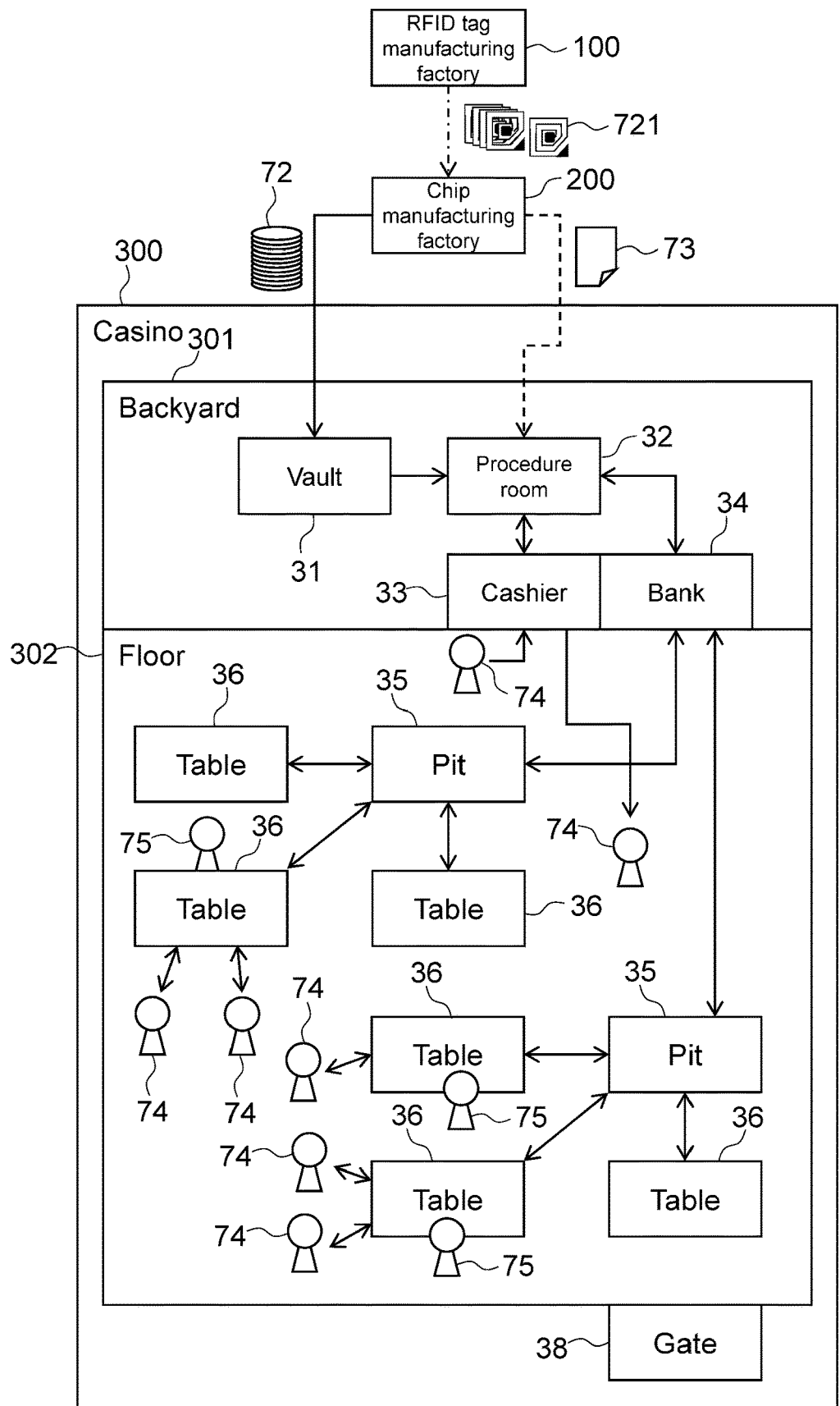
FIG. 1 shows the process of providing and using the casino item of an embodiment of the present disclosure.
Figure 2:
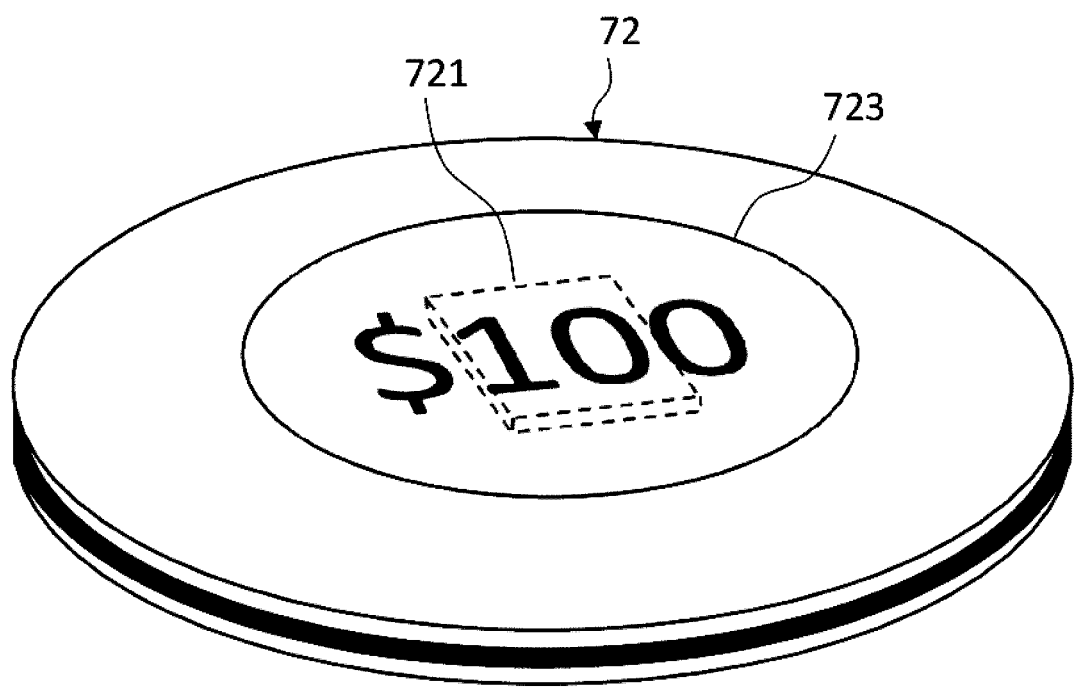
FIG. 2 shows a diagram of a gaming chip as a casino item of an embodiment of the present disclosure.

FIG. 1 shows the process of providing and using the casino item of an embodiment of the present disclosure. FIG. 2 shows a diagram of a gaming chip as a casino item of an embodiment of the present disclosure. As shown in FIG. 2, a pattern representing the value of the gaming chip 72 is shown on the side of the gaming chip 72, and a decal 723 is affixed to the center of the front and back of the gaming chip 72, and a number indicating the value of the gaming chip 72 is indicated on the decal 723. In addition, an RFID tag 721 is built into the gaming chip 72.

As shown in FIG. 1, the chip manufacturing factory 200 as a chip manufacturer purchases RFID tags 721 from the RFID tag manufacturing factory 100, uses them to manufacture gaming chips 72 with embedded RFID tags 721, and provides them to the casino 300. The casino 300 purchases gaming chips 72 with built-in RFID tags 721 from the chip manufacturing factory 200, and operates games using the gaming chips 72 on the floor 302.

Figure 3:
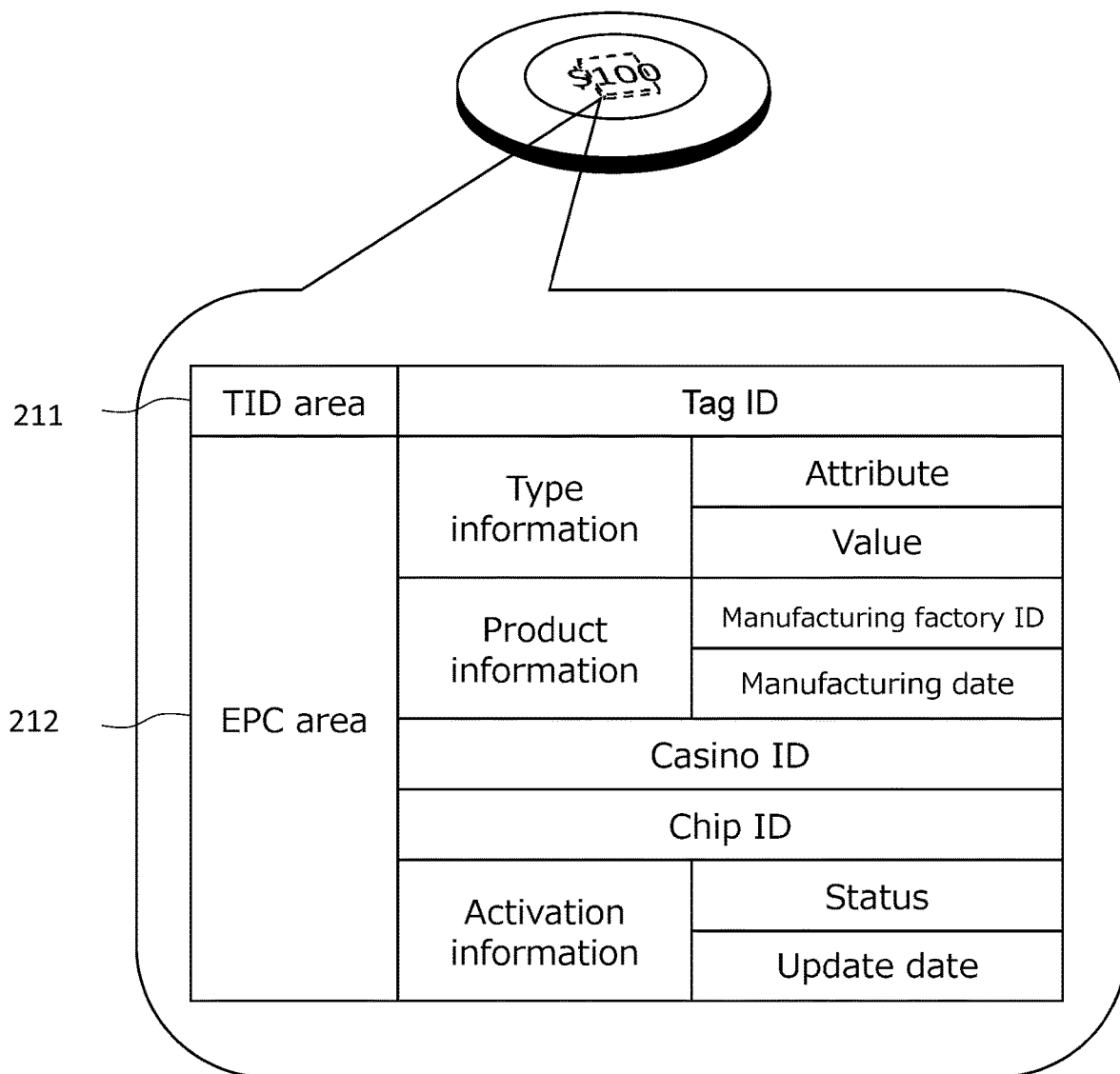
FIG. 3 shows information stored in a RFID tag of a gaming chip of an embodiment of the present disclosure.

FIG. 3 shows information stored in a RFID tag of a gaming chip of an embodiment of the present disclosure. As shown in FIG. 3, the RFID tag 721 includes, as storage areas, a TID (Transponder ID) area 211 that stores a tag identification information assigned by the manufacturer of the RFID tag 721 (the RFID tag manufacturing factory 100) and an EPC (Electronic Product Code) area 212 that stores an item identification information assigned by the manufacturer (the chip manufacturing factory 200) of the gaming chip 72 that incorporates the RFID tag 721. The tag identification information is stored in the TID area 211 by the RFID tag manufacturing factory 100 that manufactures the RFID tag 721, and the item identification information is stored in the EPC area 212 by the chip manufacturing factory 200 that manufactures the gaming chip 72.

The tag ID unique to the RFID tag 721 is stored in the TID area 211 as tag identification information, and the chip ID unique to the gaming chip 72 is stored in the EPC area 212 as item identification information. In addition to the chip ID, in the EPC area 212, the attributes of the gaming chip (whether it is a non-negotiable NN chip or a negotiable cash chip) and its value ($10, $100, $1,000, etc.) are stored as type information, the manufacturing factory ID to identify the manufacturing factory that manufactured the gaming chip 72 and the date of manufacture are stored as manufacturing information, the casino ID to identify the casino where the gaming chip 72 is used is stored, and an usable/unusable status and the date and time of update are stored as activation information. In this embodiment, two statuses are provided as the usable/unusable status: "valid," which indicates that the system can be used, and "invalid," which indicates that the system cannot be used. The usable/unusable status is "invalid" at the time when the gaming chip 72 is manufactured at the chip manufacturing factory 200.

The usable/unusable status may be represented by a flag. In this case, the status is interpreted as "valid" when the flag is present (or indicates "1") and "invalid" or "not valid" when the flag is not present (or indicates "0"). In addition, some or all of the type information, manufacturing information, casino ID, chip ID (the item identification information), and activation information may be stored in the user area of the RFID tag (not shown) instead of in the EPC area.

In order to manufacture a gaming chip 72 with a built-in RFID tag 721 in a chip manufacturing factory 200, the RFID tag 721 is first manufactured in the RFID tag manufacturing factory 100. At the RFID tag manufacturing factory 100, the tag identification information to identify the RFID tag 721 is written in the TID area 211 of the RFID tag 72. The RFID tags manufactured in the RFID tag manufacturing factory 100 are provided to the chip manufacturing factory 200. At the chip manufacturing factory 200, the gaming chip 72 that incorporates the RFID tag 721 is manufactured. At the chip manufacturing factory 200, the chip ID and other information (see FIG. 3) are written in the EPC area 212 of this RFID tag 721.

At the chip manufacturing factory 200, in parallel with the manufacture of the gaming chip 72, prepares a data file 73 in which a combination of the tag ID and chip ID (hereinafter, the tag ID and chip ID are collectively referred to as "identification information") is recorded. The chip manufacturing factory 200 supplies the manufactured gaming chip 72 to the casino 300 and also provides the data file 73 to the casino 300 through a different route. The data file 73 may be sent from the manufacturer of the gaming chip 72 to the casino 300 by e-mail, or may be recorded on a portable storage medium and handed over from the manufacturer of the gaming chip 72 to the casino 300, or may be stored in a cloud storage by the manufacturer of the gaming chip 72 and downloaded by the casino 300. At this time, the data file 73 is provided from the chip manufacturing factory 200 to the casino 300 in an encrypted state using an appropriate method.

The casino 300 has a backyard 301 as a security area that players 74 are not allowed to enter, and a floor 302 for players 74 to play games. The backyard 301 has a vault 31 for storing the gaming items including gaming chips 72, a procedure room 32 for procedures of activating gaming chips 72, and a cashier 33 and a bank 34 leading to the floor 302.

The cashier 33 has a window leading to the floor 302. The cashier 33 gives the gaming chip 72 to players 74 on floor 302 in exchange for cash, and gives cash to players 74 in exchange for the gaming chips 72 given by players 74 on floor 302. In other words, a player 74 can purchase the gaming chips 72 with cash through the window of the cashier 33, and can have the gaming chips 72 exchanged for cash.

The gaming chips 72 are filled from the bank 34 to the pit 35 and are credited from the pit 35 to the bank 34. In fill, the bank 34 supplies the gaming chips 72 to the pit 35 when the pit 35 has insufficient gaming chips 72 to supply the table 36. In credit, the gaming chips 72 are returned from pit 35 to bank 34 when there are enough gaming chips 72 in pit 35. For this purpose, the bank 34 is provided with a passageway or window to insert and withdraw the gaming chips 72 to and from the floor 302.

The gaming chips 72 supplied from the chip manufacturing factory 200 to the casino 300 are first stored in the vault 31 in the backyard 301. In the procedure room 32, activation procedures are performed on the gaming chips 72 stored in the vault 31. The activated gaming chips are brought to the floor 302 via cashier 33 or bank 34. The gaming chips 72 that have undergone the activation procedure may be stored in the vault 31 and provided from the vault 31 to the cashier 33 or bank 34.

A player 74 may purchase the gaming chips 72 at the cashier 33 or the table 36. The player 74 bets the gaming chips 72 in the game played at the table 36, and if he/she wins the game, receives payout of the gaming chips 72 from a dealer 75, and if he/she loses the game, the gaming chips 72 bet are collected by the dealer 75. In this way, the gaming chips 72 owned by the dealer 75 at the table 36 increase or decrease depending on the game. When there is a shortage of gaming chips 72 at table 36, gaming chips 72 are replenished from pit 35 to table 36, and when there is an excess of gaming chips 72 at table 36, gaming chips 72 are moved from table 36 to pit 35. Players 74 can also enter and exit the floor 302 through the gate 38. In some casinos, players are allowed to enter and exit the floor 302 with their gaming chips 72 in their possession. The pit 35 has jurisdiction over a number of tables 36.

The vault 31, the procedure room 32, the cashier 33, the bank 34, each pit 35, each table 36, and the gate 38 in the casino 300 are all locations where gaming chips 72 as casino items are handled, and are hereinafter collectively referred to as casino items handling locations. The configuration of the casino 300 is not limited to the above example. In particular, the configuration of the backyard 301 is not limited to the above example, and for example, the vault 31, the procedure room 32, and the bank 34 may be combined and referred to as a backyard, cage, bank, etc. In addition, there may be no pit 35 that manages a plurality of tables 36, in which case, in fills and credits, the gaming chips 72 are transported between the backyard 301 and each table 36.

Figure 4:
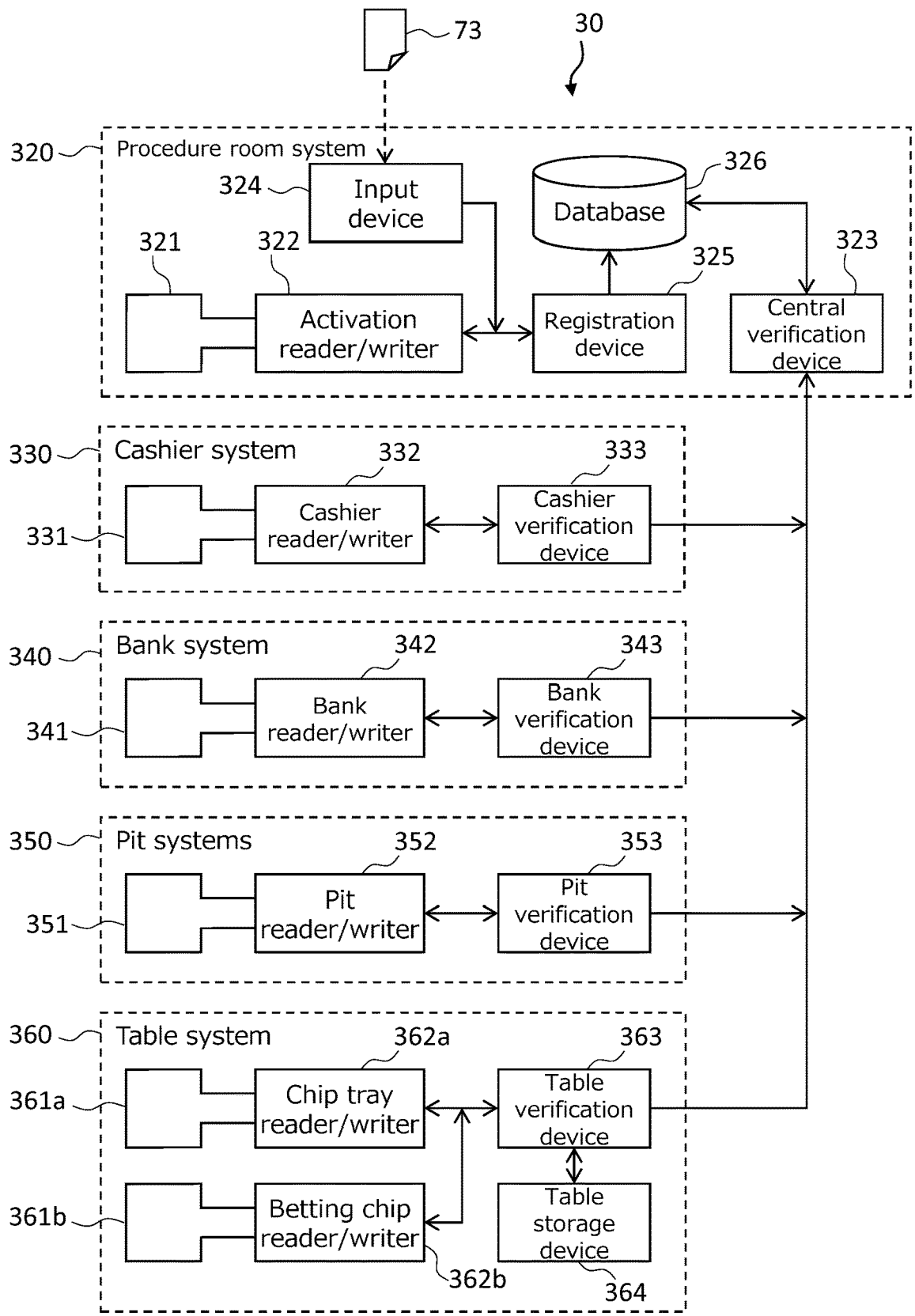
FIG. 4 shows a block diagram of an overall structure of a casino system of an embodiment of the present disclosure.

FIG. 4 is a block diagram of the overall structure of the casino system of the present disclosure. The casino system 30 has a procedure room system 320 in the procedure room 32, a cashier system 330 in the cashier 33, a bank system 340 in the bank 34, a pit system 350 in each pit 35, and a table system 3 in each table 36.

These procedure room system 320, cashier system 330, bank system 340, pit systems 350, and table systems 360 are communicatively connected to each other. The communication between these systems may be wired or wireless. Thus, the casino system 30 is a network system with a plurality of subsystems (i.e., the procedure room system 320, the cashier system 330, the bank system 340, the pit systems 350, and the table systems 360) installed at each casino items handling location.

The procedure room system 320 has an antenna 321 and an activation reader/writer 322 for reading the RFID tag 721 embedded in the gaming chip 72 brought into the procedure room 32, and a central verification device 323 that verifies whether the gaming chip 72 of each casino items handling location is a registered one or not, an input device 324 for inputting data, a registration device 325 for activating (or registering) the gaming chip 72, and a database 32 that stores information on each gaming chip 72, including identification information and usable/unusable status. The system is equipped with the following features The cashier system 330 has an antenna 331 and a cashier reader/writer 332 for reading the RFID tag 721 of the gaming chip 72 brought into the cashier 33 or taken out from the cashier 33 to the floor 302, and a cashier verification device 333 for verifying such gaming chip 72 using the information read by the cashier reader/writer 332.

The bank system 340 is provided with an antenna 341 and a bank reader/writer 342 for reading the RFID tag 721 of the gaming chip 72 brought into the bank 34 or taken out from the bank 34 to the floor 302, and a bank verification device 343 for verifying the gaming chip 72 using the information read by the bank reader/writer 342.

The pit system 350 is equipped with an antenna 351 and a pit reader/writer 352 for reading the RFID tag 721 of the gaming chip 72 brought into the pit 35 from the table 36 or bank 34 or brought into the table 36 or bank 34 from the pit 350, and a pit verification device 353 for verifying the gaming chip 72 using the information read by the pit reader/writer 352.

The table 36 has a chip tray or chip float (hereinafter simply referred to as "chip tray") for storing the dealer's gaming chips 72. The table 36 is also provided with a betting area for betting the gaming chips 72 for each player position. The table system 360 includes an antenna 361a and a chip tray reader/writer 362a provided on the chip tray to read the RFID tags 721 of the gaming chips 72 contained in the chip tray, and an antennas 361b and a bet chip reading device/writers 362b provided on the betting area of the table 36 to read the RFID tags 721 of the gaming chips 72 placed (bet on) in the betting area of the table 36.

The table system 360 further comprises a table verification device 363 for verifying the gaming chips 72 using the information read by the chip tray reader/writer 362a and the bet chip reading device/writer 362b, and a table storage device 364 that stores information read by the chip tray reader/writer 362a and bet chip reading device/writer 362b. The gate 38 may also be provided with a gate system similar to each of the above subsystems.

An activation procedure performed in the procedure room 32 is described below. The gaming chips 72 manufactured in the chip manufacturing factory 200 are brought to the backyard 301 of the casino 300 and stored in the vault 31. In the procedure room 32, the gaming chips 72 stored in the vault 31 are taken out and the procedure for activation of the gaming chips 72 is performed using the procedure room system 320.

The data file 73, in which the identification information is recorded by the chip manufacturing factory 200 (manufacturer of the gaming chip 72), is provided to the procedure room system 320, and the procedure room system 320 receives the data file 73 at the input device 324. Since the data file 73 is encrypted, the input device 324 decrypts the data file 73. In addition to the identification information, some or all of the other information stored in the RFID tag 721 of each gaming chip 72 (see FIG. 3) may also be recorded in the data file 73.

The antenna 321 and the activation reader/writer 322 read the tag ID and chip ID, which are identification information, from the RFID tag 721 of the gaming chip 72 to be activated. The registration device 325 determines (checks) whether or not the identification information read by the activation reader/writer 322 from the gaming chip 72 exists in the identification information recorded in the data file 73 decoded by the input device 324, thereby determines whether the gaming chip 72 is a genuine one formally manufactured at the chip manufacturing factory 200, a fake one not formally manufactured at the chip manufacturing factory 200, or a gaming chip with a broken RFID tag 721. In other words, the registration device 325 determines the authenticity of the gaming chip 72 by determining whether the identification information stored in the RFID tag 721 of the gaming chip 72 matches the identification information recorded in the data file 73 (first validation).

If the registration device 325 determines that the gaming chip 72 is genuine in the authenticity determination (or the first validation), it registers the gaming chip 72 by recording its identification information (tag ID and chip ID) in the database 326. At this time, if other information such as manufacturing information is recorded in the RFID tag 721 of the gaming chip 72 and/or the data file 73, such information is also recorded in the database 326 in association with the identification information. Furthermore, the registration device 325 records the activation information of each gaming chip 72 in the database 326.

Figure 5:
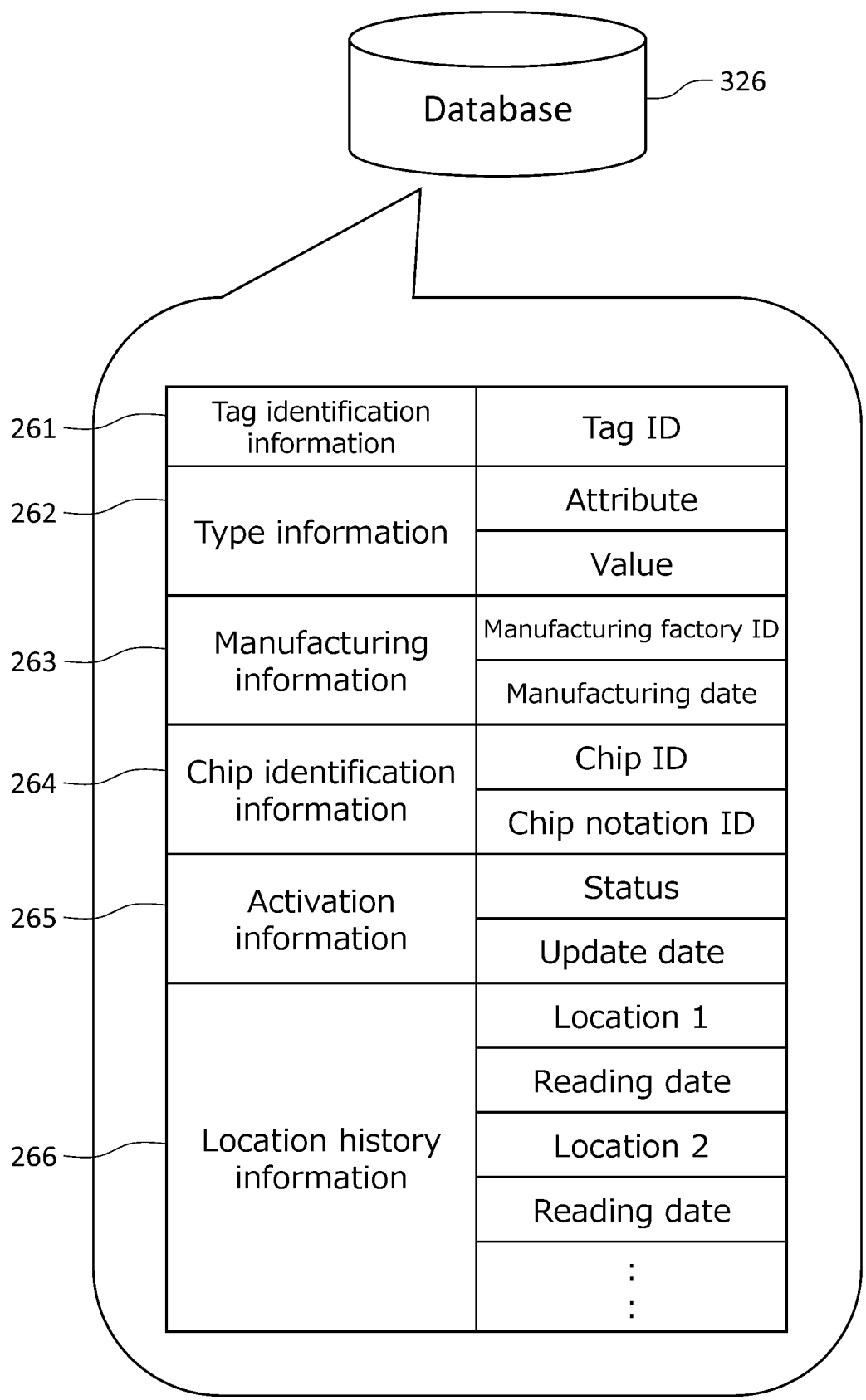
FIG. 5 shows a data structure of information of each gaming chip recorded in the database of an embodiment of the present disclosure.

FIG. 5 shows the data structure of the information of each gaming chip recorded in the database of the present embodiment of the present disclosure. In this embodiment, the database 326 records, for each gaming chip 72, the tag ID as the tag identification information 261, the attribute and the value as the type information 262, the manufacturing factory ID and the manufacturing date as the manufacturing information 263, the chip ID and the chip notation ID as the chip identification information 264, the usable/unusable status of usable/unusable activation and update date as the activation information 265, and the history of the combination of location and reading date as the location history information 266.

When registering a gaming chip 72 that has been successfully verified and determined to be genuine in the database 326, the registration device 325 records the usable/unusable status of the activation information 265 as "valid" and the date and time of the activation as the update date and time, thereby activating the gaming chip 72 as usable. is activated as available for use. In this way, it is possible to determine whether the usable/unusable status of each gaming chip 72 is "valid" or "invalid" by referring to the database 326, and it is also possible to know when the activation took place (when it was registered).

In this embodiment, since the activation information is also recorded in the EPC area 212 of the RFID 721 of the gaming chip 72, the registration device 325 controls the writer function of the activation reader/writer 322 as a process of registering the usable gaming chip 72, through the antenna 321, to rewrite the usable/unusable status recorded in the RFID tag 721 of the gaming chip 72 that has been successfully verified and determined to be genuine from "invalid" to "valid. As a result, the systems 330 to 360 at each game items handling location can know whether the usable/unusable status of the gaming chip 72 is "valid" or "invalid" by simply reading the RFID tag 721 of the gaming chip 72.

As described above, the gaming chip 702 is inactive ("invalid") until it is transported from the chip manufacturing factory 200 to the casino 300 and activated by the procedure room system 320. Therefore, even if a gaming chip 72 is stolen during the transportation process, the gaming chip 72 so stolen cannot be used in the floor 302 of the casino 300. The casino only needs to strictly control the gaming chip 72 after it is activated by the activation procedure, which allows for a higher level of security and smaller security costs compared to the case where the gaming chip 72 must be strictly controlled from the stage of its manufacture.

The cashier system 330, the bank system 340, the pit system 350, and the table system 360 are used at the cashier 33, the bank 34, the pit 35, and the table 36 locations, respectively, to verify the identification information of the gaming chips 72 handled therein and to check the activation status of the chips. The following is a description of each casino items handling location.

At the cashier 33, the antenna 331 and cashier reader/writer 332 of the cashier system 330 read the RFID tag 721 of the gaming chip 72 in the cashier 33 to obtain the tag ID, chip ID, and the usable/unusable status. The cashier verification device 333 first outputs an error signal indicating that the usable/unusable status read from the RFID tag 721 of the gaming chip 72 is "invalid." When the error signal is output, the cashier 33 shall stop handling the gaming chip 72.

The cashier verification device 333 further transmits the identification information (tag ID and chip ID) obtained by the cashier reader/writer 332 to the procedure room system 320. The central verification device 323 of the procedure room 330 verifies that the identification information received from the cashier system 330 is stored in the database 326 and that the usable/unusable status associated with the identification information is valid.

If the corresponding identification information is stored in the database 326 (i.e., the gaming chip is genuine) and its usable/unusable status is valid, the central verification device 323 sends a response signal indicating that the gaming chip 72 is genuine and valid to the cashier system 330. On the other hand, if the inquired gaming chip 72 is not genuine, the central verification device 323 sends an error signal indicating that it is not genuine to the cashier system 330, and if the inquired gaming chip 72 is genuine but the usable/unusable status is invalid, the central verification device 323 sends an error signal indicating that it is genuine but invalid as a response signal to the cashier system 330.

If the usable/unusable status read by the cashier verification device 333 from the RFID tag 721 of the gaming chip 72 is valid, but the usable/unusable status is recorded as invalid in the database 326, the cashier verification device 333 determines that the gaming chip 72 is counterfeit, and controls the writer function of the cashier reader/writer 332 to rewrite the usable/unusable status of the RFID tag 721 of the gaming chip 72 via the antenna 331 to "invalid." Alternatively, the cashier verification device 33 may rewrite the usable/unusable status to "unknown."

In addition, if the usable/unusable status is recorded as "valid" in the database 326, but the usable/unusable status read by the cashier verification device 333 from the RFID tag 721 of the gaming chip 72 is "invalid," the cashier verification device 333 shall assume that the usable/unusable status stored in the RFID tag 721 of the gaming chip 72 has been rewritten for some reason, and rewrite the usable/unusable status stored in the RFID tag 721 of the gaming chip 72 to "valid." Alternatively, the usable/unusable status of such a gaming chip 72 may be rewritten to "invalid" or "unknown" and its handling may be discontinued.

The possibility of counterfeit or fraudulent gaming chips being present in gaming chips 72 that are brought into the cashier 33 directly from the procedure room 32 or through the vault 31 is low because they have already been verified and activated in the procedure room 32. However, there is a possibility that counterfeit or fraudulent gaming chips 72 may be present in the gaming chips 72 that are brought in and redeemed by users from the floor 302. Therefore, the cashier verification device 333 may, among other things, verify the identification and usable/unusable status of the gaming chips 72 to be redeemed and indicate the results to the player 74 and cashier staff. Alternatively, in case reading the value information stored in the RFID tag 721 of the gaming chip 72 and presenting it to a player 74 when the player 74 purchases a gaming chip 72, at the same time, the identification information can be checked and the activation status can be confirmed, and the results can be presented together with the value information.

The bank system 340 operates basically in the same way as the cashier system 330. The gaming chips 72 to be filled will be transported from the bank 34 to the pit 35 on the floor 302, although it is unlikely that counterfeit or fraudulent gaming chips 72 will be mixed in since such gaming chips 72 were verified and activated in the procedure room 32. However, the gaming chips 72 that are brought into the bank 34 from the floor 302 during the credit process may contain counterfeit or fraudulent gaming chips 72 because some of them are collected by the dealer after they have been handed over to the player 74. Therefore, the banking system 340 may, in particular, refer to the database 326 for the gaming chips 72 brought in from the floor 302 to check the identification information and the usable/unusable status.

The pit system 350 operates basically in the same way as the cashier system 330. The gaming chips 72 to be filled from the bank 34 and the gaming chips 72 that have been overloaded at the table 36 are brought into the pit 35. The pit system 350 checks the gaming chips 72 that are brought into the pit 35 in this way. Excess gaming chips 72 in pit 35 are moved to bank 34 (credit), or gaming chips 72 are replenished from pit 35 to table 36 when there is a shortage of gaming chips 72 at the table 36. The pit system 350 also checks the gaming chips 72 leaving the pit 35 in this way.

The operation of the table system 360 is as follows. At the table 36, the dealer 75 redeems gaming chips 72 from the chip tray to the player 74 who won the game. An antenna 361a is provided on the chip tray, and the chip tray reader/writer 362a reads the identification information and usable/unusable status from the RFID tag 721 of the gaming chip 72 contained in the chip tray. The identification information read by the chip tray reader/writer 362a is checked by the table verification device 363 and stored in the table storage device 364. When a plurality of gaming chips 72 are housed in the chip tray, a plurality of identification information corresponding to the plurality of gaming chips 72 is stored in the table storage device 364.

The table verification device 363 first compares the most recent identification information stored in the table storage device 364 in the past with the current identification information read by the chip tray reader/writer 362a to determine whether the two match.

If there is any identification information among the identification information read by the chip tray reader/writer 362a that is not among the latest identification information stored in the table storage device 364, the table verification device 363 will, in the same manner as the cashier verification device 333 described above for such gaming chip 72, check whether such identification information is stored in the database 326 and whether the usable/unusable status corresponding to such identification information is set to "valid" in the database 326.

Specifically, the table verification device 363 normally checks the chip ID read from the RFID tag 721 of the gaming chip 72 against the previous chip ID registered in the table storage device 364, and if a new chip ID that was not read at the time of the previous reading is read, the table verification device 363 matches the identification information including the tag ID read from the RFID tag 721 of the gaming chip 72 with the identification information including the tag ID recorded in the database 326.

Figure 6:
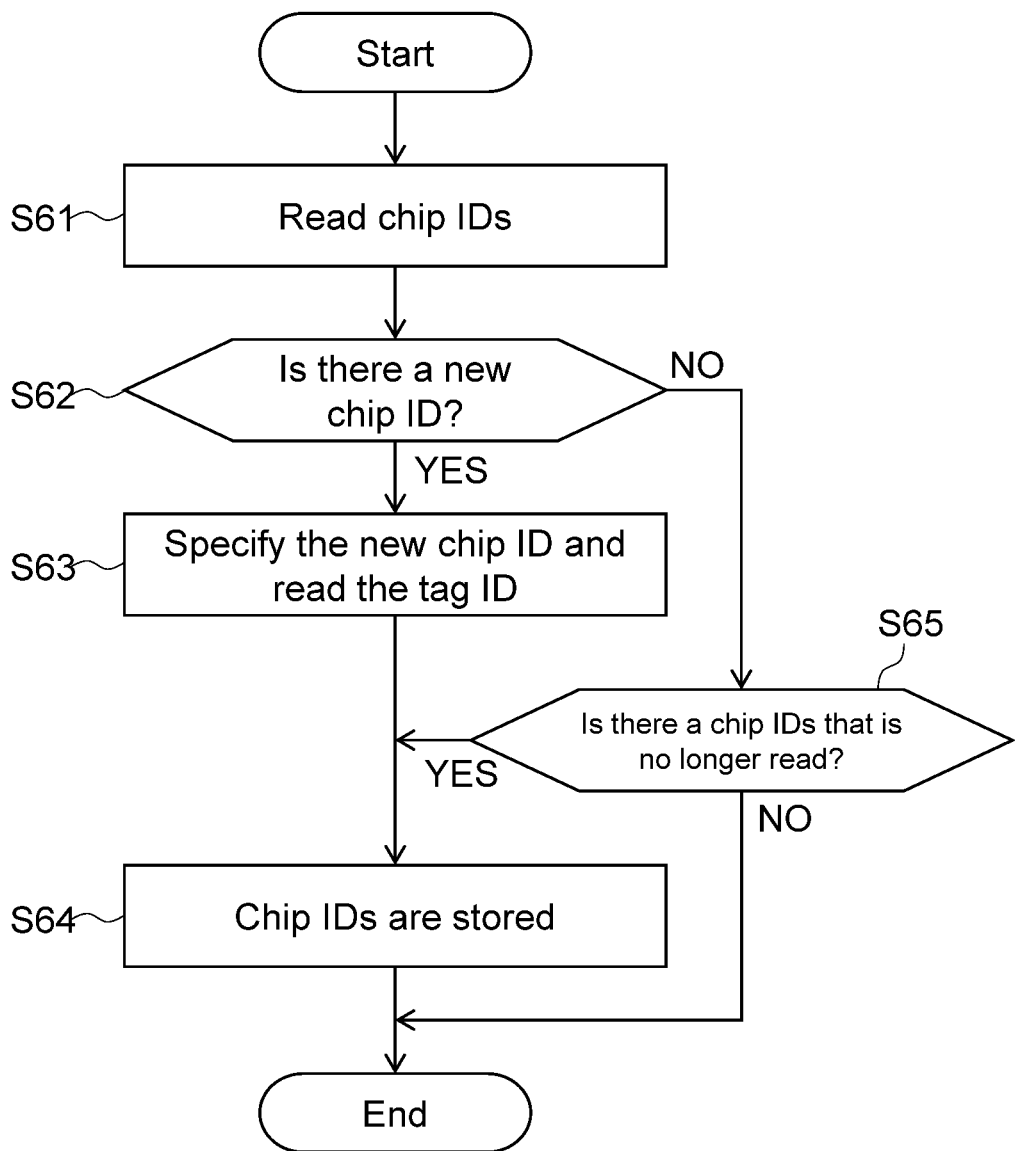
FIG. 6 shows a flowchart of operations of the table system of an embodiment of the present disclosure.

FIG. 6 is a flowchart of an operation of the table system in the present embodiment of the present disclosure. The antenna 361a and the chip tray reader/writer 362a read the chip IDs from the RFID tags 721 of all gaming chips 72 in the chip tray (Step S61). The table verification device 363 checks a group of the read chip IDs against a groups of chip IDs stored in the table storage device 364 as the latest chip IDs in the past, and determines whether there are new chip IDs among the read chip IDs that are not stored in the table storage device 364. In this way, the system is able to determine whether there is a new chip ID among the read chip IDs that is not stored in the table storage device 364 (Step S62).

If a new chip ID is read (YES in Step S62), the antenna 361a and the chip tray reader/writer 362a specify the new chip ID, read the tag ID from the RFID tag 721 of the gaming chip 72 having the new chip ID, and transmit a combination of the chip ID and the tag ID to the procedure room system 320 to check against the information stored in the database 326 (Step S63). Then, a group of all the read chip ID are stored in the table storage device 364 as new past group of chip IDs (Step S64).

If no new chip IDs are read, that is, if no new gaming chips 72 have been added to the chip tray since the previous reading, the table verification device 363 determines whether there are any chip IDs that were read in the previous reading but are no longer read in the current reading in comparison with the latest past group of chip IDs stored in the table storage device 364 and the group of chip IDs currently read (Step S65).

If there is a chip ID that is no longer read, i.e., if the gaming chip 72 is taken out of the chip tray (YES in Step S65), a group of all the read chip IDs is stored in the table storage device 364 as the latest group of chip ID in the past (Step S64). On the other hand, if there are no chip IDs that are no longer read (NO in Step S65), that is, if there has been no increase or decrease or change of gaming chips 72 in the chip tray, the table storage 364 is not updated.

Thus, in the chip tray of the table 36, the chip IDs stored in the EPC areas 212 are usually read at predetermined time intervals and the variation thereof is monitored, and when there is a variation in the chip IDs, especially when a new chip ID is read, the new chip ID is checked against the database 326 and the usable/unusable status in the database 326 is confirmed for the gaming chip 72. Therefore, the processing load can be reduced and the processing time required for one cycle can be shortened (the processing speed can be improved).

The table verification device 363 may perform the verification (collation) with the database 326 and the confirmation of the usable/unusable status of the database 326 at a predetermined timing and/or under a predetermined condition, regardless of whether or not there is a newly read chip ID.

When a player 74 bet on a game, the player 74 places the gaming chip 72 to be bet on at a predetermined betting area on the game table. The antenna 361b is placed under the betting area on the table surface of the game table, and the betting chip reading device/writer 362b reads the identification information from the RFID tag 721 of the betting gaming chip 72. The identification information read by the betting chip reading device/writer 362b is checked by the table verification device 363 and stored in the table storage device 364. When a plurality of gaming chips 72 are bet in the betting area, a plurality of identification information corresponding to the plurality of gaming chips 72 is stored in the table storage device 364.

The antenna 361B and the betting chip reading device/writer 362B read not only the gaming chips 72 bet in the betting area by the player 74, but also the RFID tags 721 of the gaming chips 72 paid out from the chip tray by the dealer 75, and the table storage device 364 also stores the RFID tags 721 of the gaming chips 72 so paid out.

The table verification device 363 performs the confirmation of the usable/unusable status and the verification for the identification information read from the RFID tag 721 by the betting chip reading device/writer 362b, in the same manner as for the gaming chips 72 contained in the chip tray. Specifically, the table verification device 363 does not always check the identification information read by the betting chip reading device/writer 362b against the database 326, but instead, when new identification information that is not included in the latest identification information stored in the table storage device 364 as having been read is read by the antenna 361b and the betting chip reading device/writer 362b, the table verification device 363 verifies it against the identification information stored in the database 326 and checks the usable/unusable status stored in the database 326, via the central verification device 323.

In this embodiment, it is assumed that the registration device 325 registers the usability status as "valid" when a new gaming chip 72 is newly registered, but this is not limited to the case. If the chip is stored for a relatively long time in a backyard before being put out on the casino floor 302 after being registered, the usable/unusable status can be registered as "invalid" first and then set to "valid" before it is sent to the casino floor 302 or when it is moved to the cashier 33.

In this embodiment, the registration device 325 performs both the first validation and the changing of the usable/unusable status to "valid" (activation), but a device that performs the first validation (the determination device) and a device that performs the activation (the registration device) may be separate devices. The first validation may be performed at the chip manufacturing factory 200.

In this embodiment, a record is created in the database 326 for the gaming chip 72 that is determined to be genuine by the first validation, and in addition, for the gaming chip 72 that is allowed to be used, the usable/unusable status of such gaming chip 72 recorded in the database 326 is set to "valid," instead, a database (usable database) may be composed of only the gaming chips 72 that is allowed to be used. In this case, gaming chips 72 that have a record in the usable database are determined to be allowed to be used. In addition to the usable database that records such usable gaming chips 72, a genuine database of gaming chips 72 that have been determined to be genuine in the first validation may be prepared. In this case, the gaming chips that are scanned at each casino items handling location are checked against the usable database, and for gaming chips 72 that do not have a record in the usable database, the genuine database may be referenced to determine whether the gaming chips 72 are provided by the chip manufacturing factory 200 or not.

As described above, the registration device 325 registers the gaming chip 72 in the database 326 by storing in the database 326 the respective information including the identification information of the new gaming chip 72 obtained from the factory. On the other hand, the registration device 325 deactivates the once-activated usable/unusable status for a broken gaming chip 72 and an aged gaming chip 72.

At each casino items handling location, the gaming chips 72 for which information could not be read from the RFID tag 721 (i.e., gaming chips 72 for which the RFID tag 721 is damaged) will be excluded on site from the gaming chips 72 that can be used. Also, the gaming chips 72 which identification information read from the RFID tag 721 fail to the collation will be excluded on site from the gaming chips 72 that can be used. Furthermore, the gaming chips 72 for which the usable/unusable status was not valid will also be excluded. These problematic gaming chips will be changed to invalid or deactivated by the registration device 325. In addition, if there are no problems, but a predetermined period of time (e.g., one year) has passed since the date and time of a first activation, a deactivation procedure is performed in order to discard the gaming chip 72.

In the process of deactivation, the registration device 325 updates the usable/unusable status of the gaming chip 72 in question recorded in the database 326 to "invalid" and records the date and time of the update. Alternatively, the registration device 325 may delete the information of the gaming chip 72 to be disabled from the database 326. If the RFID tag 721 of the gaming chip 72 is broken, the identification information to be disabled cannot be read from such gaming chip 72. Therefore, the registration device 325 disables such gaming chip 72 in the following manner.

Figure 7:
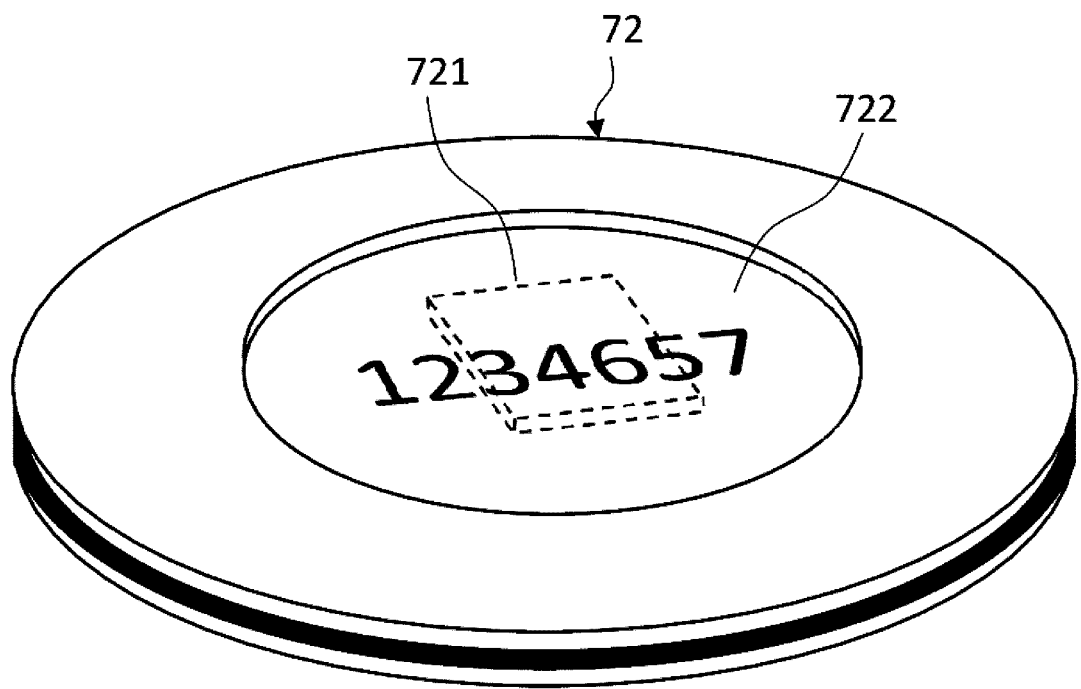
FIG. 7 shows a diagram of a gaming chip (with the decal removed) as a casino item of an embodiment of the present disclosure.

FIG. 7 is a diagram of a gaming chip with the decal removed. The gaming chip 72 carries information for identifying the gaming chip 72 in a manner other than the RFID tag 721. The gaming chip 72 has a circular recess in the center, and a decal 723 is attached to the bottom 722 of the recess. The number representing the value of the gaming chip 72 is indicated on the decal 723. When the decal 723 is removed, the bottom surface (decal attachment surface) 722 shows the chip notation ID as unique identification information for the gaming chip 72. The chip notation ID may be indicated on the bottom surface 722 of the recessed portion of the gaming chip 72 by laser engraving, or may be printed on the decal attachment surface 722 with some kind of ink. The chip notation ID may also be printed on the surface of the decal 723. In this case, the chip notation ID may be printed with visible ink or invisible ink which is invisible under normal conditions, such as UV emitting ink that emits light when irradiated with UV light or infrared absorbing ink that absorbs infrared light.

The registration device 325 identifies the identification information for which the registration should be invalidated using the chip notation ID for identifying the gaming chip 72 for which the identification information cannot be read from the RFID tag 721, and invalidates the registration. For the gaming chip 72 whose RFID tag 721 has failed and the identification information cannot be read, when invalidating it, the operator peels off the decal 723, sees the chip notation ID written on the decal attachment surface 722, and inputs it to the registration device 325 via the input device 324. The registration device 325 refers to the database 326 to identify the identification information corresponding to the input chip notation ID (see FIG. 5). As a result, even for a gaming chip 72 whose RFID tag 721 has been broken, such gaming chip 72 can be identified in the database 326 and the procedure for invalidating it can be performed.

As described above, the gaming chips 72 passed to the players 74 are passed back and forth among multiple players 74 and the tables 36 by betting by the players 74 and payouts by the dealers 75, and are finally returned to the bank 34 via the pit 35. At this time, the gaming chips 72 that have been excluded at each casino items handling location as described above are subject to invalidation by the registration device 325.

In addition, the gaming chips 72 that are not excluded as problematic and are collected in the bank 34 are checked for identification information and the usable/unusable status in the banking system 34, and it is also determined whether a predetermined period of time has not elapsed since the initial activation. At this time, if a gaming chip 72 that fails to match the identification information, a gaming chip 72 whose activation status is not "valid," or a gaming chip 72 whose activation status has been valid for a predetermined period of time since the first activation is detected, an invalidation procedure shall be performed for those gaming chips.

In addition, for the gaming chips 72 that are not registered in the database 326 as a result of checking the read identification information against the database 326 at each casino items handling location, and for the gaming chips 72 whose usable/unusable status is not "valid," the registration device 325 may immediately perform the procedure to invalidate the gaming chip 72 without waiting for the gaming chip 72 to be returned to the backyard 301. In addition, the reader/writer at each casino items handling location may rewrite the usable/unusable status of such a gaming chip 72 to "invalid" if the usable/unusable status of such a gaming chip 72 is "valid."

When the gaming chip 72 is read at each casino items handling location, the central verification device 323 may check the history of the location of the gaming chip 72 based on the information in the database 326. If the location history is inappropriate in light of the predetermined criteria, the central verification device 323 may rewrite the usable/unusable status of the gaming chip 72 to "invalid" as a suspicious gaming chip 72. For example, if the location history of the gaming chip 72 shows that the gaming chip 72 has been moved directly from one player 74 to another player 74 without passing through the chip tray 36a, the location history of the gaming chip 72 is determined to be suspicious (a possibility of money laundering). Alternatively, a list of suspicious gaming chips 72 (black list) may be created in advance in the database 326, and if the gaming chip 72 involved in the verification is listed in the black list, the registration device 325 may actually perform the process of invalidating the gaming chip 72 concerned.

As described above, the information for each gaming chip 72 in the database 326 includes location history information 266. Each time the central verification device 323 receives a referral inquiry for identification information from each casino items handling location, it updates the location history information 266 corresponding to the identification information. Specifically, when the central verification device 323 receives an inquiry for identification information from each casino items handling location, the central verification device 323 records the information that identifies the casino items handling location as the location information in the location history information 266 corresponding to the identification information and the date and time of the inquiry as the reading date and time. In the database, a predetermined number of information can be recorded as the location history information, and after the predetermined number of location history information is recorded, the old information is overwritten.

The location information is information that specifies each casino items handling location, as described above. For example, if a cashier has more than one window, the window ID that identifies the window can be used as the location information, and if there are more than one pit and table, the pit ID and table ID that identify which pit and table are used can be used as the location information.

In addition, when the gaming chip 72 is given to a player 74, the player ID of the player 74 shall be recorded as the location information. For example, if antennas 361b are provided for each player position at table 36, the player ID of each player position can be identified by the member card held by the player 74 or by facial recognition on an image of the player playing at the table 36.

By detecting to which player position the gaming chips 72 that are paid out to the players are paid out, it is possible to determine to which player ID the gaming chips 72 were paid out. In addition, when a player 74 purchases a gaming chip 72 at the cashier 33, the player ID of the player 74 is identified and the player ID is recorded as the location information.

By recording the history of the location information and the information of the date and time of its reading in the database 326, it is possible to grasp how the gaming chip 72 in question has been moved by referring to the database 326.

Figure 8:
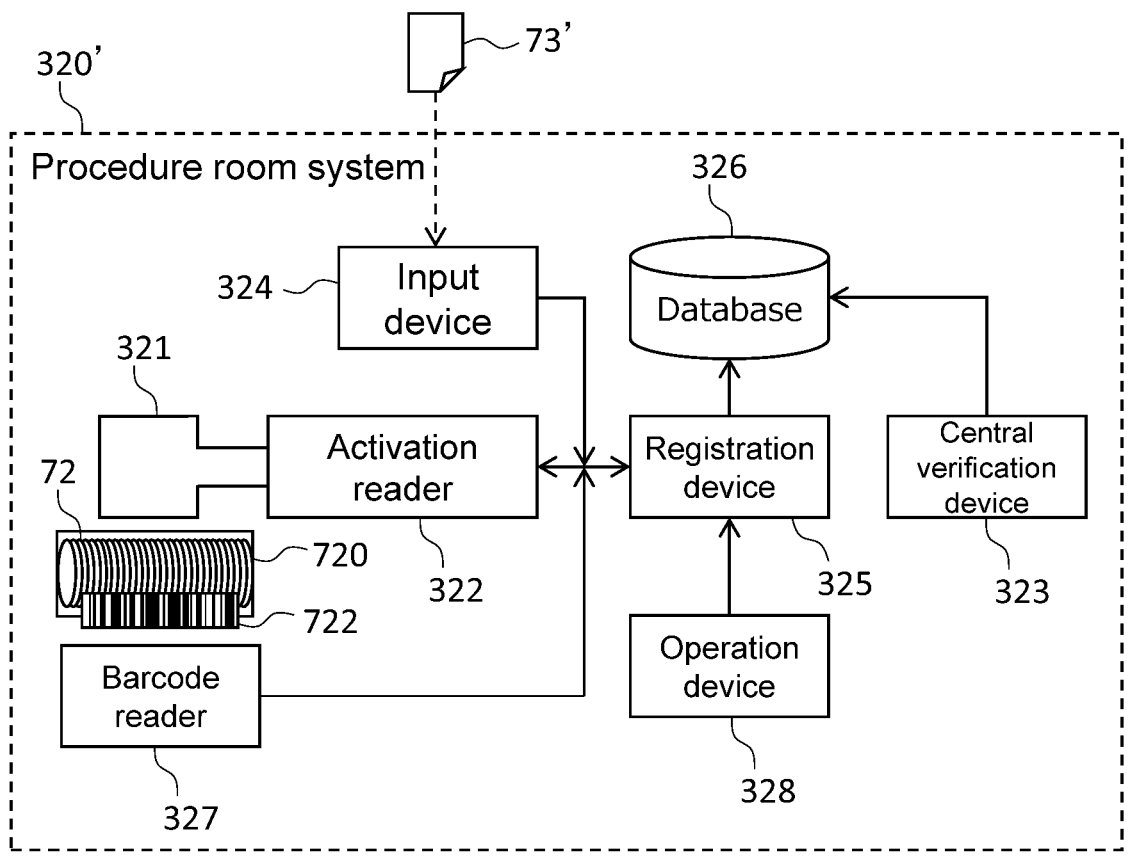
FIG. 8 shows a block diagram of a configuration of a procedure room system of Variant 1 of the embodiment of the present disclosure.

FIG. 8 is a block diagram showing the configuration of the procedure room system of Variant 1 of the present disclosure. The procedure room system 320' of this Variant 1 activates a plurality of gaming chips 72 simultaneously. The plurality of gaming chips 72 are activated while they are contained in a chip case 71. The chip case 71 is provided with a barcode 722 as case identification information to identify the chip case 71.

In the data file 73 provided by the manufacturer of the gaming items to the casino 300, the code information represented by the barcode 722 is mapped to the information of each gaming chip 72. The procedure room system 320' is further equipped with a barcode reader 327. The barcode reader 327 reads the barcode 722 of the chip case 71 that contains the gaming chip 72 pertaining to the activation.

The antenna 321 and the activation reader 322 simultaneously read the RFID tags 721 of a plurality of gaming chips 72 housed in the chip case 720. The plurality of identification information read from the RFID tags 721 of the plurality of gaming chips 72 by the antenna 321 and the activation reader 322, the information in the data file 73' decoded by the input device 324, and the barcode 722 of the chip case 71 read by the barcode reader 327 are input to the registration device 325. The registration device 325 first determines whether or not the code information of the chip case 71 given by the manufacturer of the gaming chip 72 and the code information of the chip case 71 read by the barcode reader 327 match. In other words, the registration device 325 first determines whether the chip case 71 itself is a chip case that should be there.

Next, the registration device 325 identifies, from the data file 73', the identification information of the gaming chips 72 corresponding to the code information of the barcode 722, i.e., the plurality of gaming chips 72 pertaining to the activation. The registration device 325 determines the authenticity of those gaming chips 72 by comparing the identified identification information of the gaming chips 72 with the identification information read from the RFID tag 721 of the gaming chip 72 pertaining to the activation by the activation reader/writer 322. If all the gaming chips 72 pertaining to the activation are successfully verified, the registration device 325 sets the usable/unusable status of the gaming chips 72 as "valid" and stores the information on the gaming chips 72 in the database 326 to register the gaming chips 72.

According to this configuration, the gaming chips 72 can be managed in a state of being housed in the chip cases 720 from manufacture to activation, and it can be guaranteed that there is no excess or deficiency of the gaming chips 72 that should be housed in each chip case 720.

Figure 9:
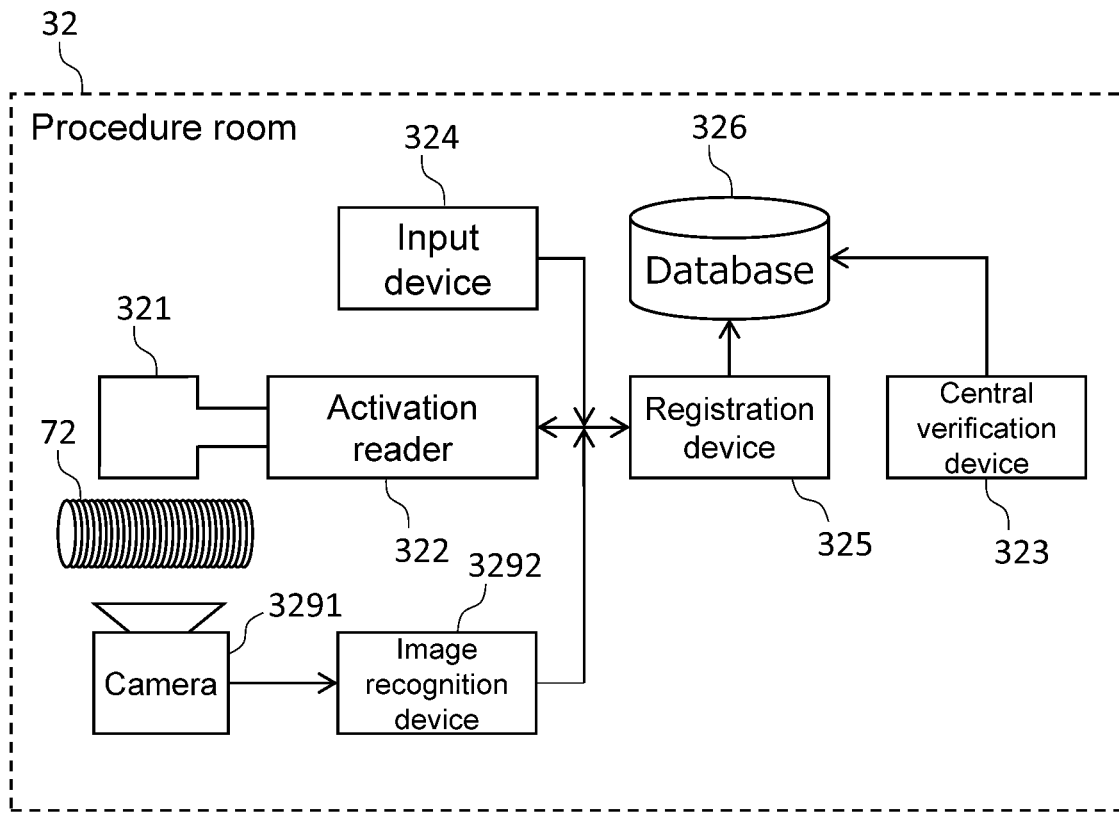
FIG. 9 shows a block diagram of a configuration of a procedure room system of Variant 2 of the embodiment of the present disclosure.

FIG. 9 is a block diagram of the procedure room system of Variant 2 of the present disclosure. The procedure room system 320" of Variant 2 also activates a plurality of gaming chips 72 simultaneously. The gaming chips 72 have type information stored in them as well as identification information. The procedure room system 320" is equipped with a camera 3291 that photographs the sides of the plurality of gaming chips 72 whose RFID tags 721 are read by the antenna 321, and an image recognition device 3292 that performs image recognition on the images generated by the camera 329.

The plurality of gaming chips 72 are photographed by the camera 329 in a stacked state. The camera 3291 generates image data by taking pictures. The image recognition device 3292 performs image recognition on the image data to determine the types of the plurality of gaming chips 72 by the patterns appearing on the sides thereof. In this embodiment, as shown in FIG. 2, the sides of the gaming chips 72 have a center line as a pattern, and the color of the center line represents the type of the gaming chip 72 concerned. Therefore, the image recognition device 3292 recognizes the center line from the image and determines the type of the gaming chip 3292 in the image by color of the center line.

The registration device 325 determines whether the types of the plurality of gaming chips read by the activation reader 322, that is, the respective number of chips of each type, match the types of the plurality of gaming chips recognized by the image recognition device 3292, that is, the respective number of chips of each type.

According to this configuration, it is possible to inspect whether or not the types of the gaming chips 72 pertaining to the activation determined based on the appearance match the types stored in the RFID tag 721. It is also possible to inspect whether or not the number of the gaming chips 72 that can be seen from the external appearance matches the number of chips for which the RFID tag 721 is read.

In Variant 2, the type of the gaming chip 72 is identified from its appearance and whether or not it matches the type stored in the RFID tag 721 is determined. However, instead of determining the type using the image and the RFID tag 721, the image recognition device 3292 may recognize the number of the gaming chips based on the image, the gaming chips 72 is inspected by determining whether the recognized number of the gaming chips matches the number of the RFID tags 721 read by the activation reader 322. In Variant 2, the plurality of gaming chips 72 need not be inspected at the same time, but may be inspected one by one.

In the above Variant 1, for the plurality of gaming chips 72 contained in the chip case 720, the identification and other information of the gaming chips 72 contained in the chip case 720 are determined by reading the RFID tag 721, while the barcode reader 327 is used to read the barcode 722, and by referring to the data file 73', the identification information and other information of the gaming chip 72 contained in the chip case 720 are determined, and the gaming chip 72 is inspected by comparing those determined information. In the above Variant 2, the type of the plurality of gaming chips 72 is determined by reading the RFID tags 721 of the plurality of gaming chips 72, and the type of the gaming chips 72 contained in the chip case 720 is determined by photographing the sides of the plurality of gaming chips 72 with the camera 329 and performing image recognition, and the gaming chips 72 were inspected by comparing those determined information.

As another example, the gaming chips 72 may be inspected by the number of gaming chips 72 contained in the chip case 720 without using the barcode reader 327 or the camera 329. That is, by using a known case as the chip case 720, the procedure room system 320 may know the number of gaming chips 72 contained in the chip case 720, and inspect the gaming chips 72 by checking whether the number of RFID tags 721 read by the antenna 321 and activation reader 322 is the known number.

The inspection may also be performed based on information input by an operator of the activation procedure from the operation device 328 instead of the camera 3291 and the image recognition device 3292. The operator may, for example, by visually inspecting a plurality of gaming chips 72, identify their type information and input it into the input device. In this case, the registration device 325 may inspect the gaming chips 72 by determining whether or not the information on the type of the gaming chips 72 entered by the operator in the operation device 328 matches the information on the type read from the RFID tag 721 of the gaming chips 72 by the activation reader 322.

The registration device 325 may also inspect the gaming chip 72 by determining whether or not the information of the type input by the operator into the operation device 328 matches the information of the type recorded in the data file 73 given by the manufacturer of the casino item.

In the procedure room system 320" of the above-described Variant 2 and its variations, the inspection is performed by comparing the number of the gaming chips 72 identified using the RFID tag 721 with the number of the gaming chips 72 identified by image recognition, the known number of chips based on the chip case 720, or the number of chips input by the operator. By this inspection, the gaming chip 72 with broken RFID tag 721 (hereinafter referred to as "faulty chips") can be detected. In other words, the procedure room system 320" can be used as an inspection device to detect the faulty chip.

The detection of the faulty chip may be performed in the procedure room 32 in the backyard 301 for the gaming chips 72 pertained to the activation, the gaming chips 72 to be filled in any of the pits 35 on the floor 302, and the gaming chips 72 that have been returned to the backyard 301 by credit after being used on the floor 302. An inspection system similar to the procedure room system 320" may also be installed at the cashier 33, and inspection for the faulty chips may be performed on the gaming chips 72 to be sold to players from the cashier 33 and the gaming chips 72 redeemed for cash at the cashier 33.

Furthermore, an inspection device similar to the procedure room system 320" may be installed in the pit 35, and the gaming chips 72 brought from the backyard 301, the gaming chips 72 to be credited from the pit 35 to the backyard 301, the gaming chips 72 to be filled from the pit 35 to the table 36, and the gaming chips 72 moved from the table 36 to the pit 35 may be inspected for the faulty chips.

The registration device 325 may thus perform a deactivation process on the gaming chips 72 detected as broken by the inspection. If the above inspection is performed when filling or crediting, the filling or crediting is performed after confirming that the gaming chip 72 pertaining to the filling or crediting is not broken. If the above inspection is carried out at the time of redemption, the redemption will be carried out after confirming that the gaming chip 72 for the redemption is not broken.

Furthermore, the gaming chips 72 that are moved between the pit 35 and the backyard 301 in the filling or crediting may be inspected for faulty chips to detect broken gaming chips 72. In this case, the carrier (cart) for transferring the gaming chips 72 may be provided with an inspection device similar to the procedure room system 320".

In the above embodiments and Variant 1 and 2, a pit 35 that manages a plurality of the tables 36 is provided in the floor 302, and the gaming chips 72 are supplied from the bank 34 in the backyard 301 to the tables 36 via the pit 35 in the fill, and in the credit, the gaming chips 72 are transported from the table 36 to the bank 34 in backyard 301 via pit 35, but pit 35 does not have to be provided. In the case where pit 35 is not provided, fills and credits are made directly between bank 34 and each table 36. In this case, the inspection performed in the pit 35 above will be performed in table 36.

In the above embodiment, the usable/unusable status as activation information was stored in the database 326 and the RFID tag 721 built into the gaming chip 72, but the activation information may not be recorded in the RFID tag 721. Also, the activation information may not be recorded in the database 326, and a data table containing only valid gaming chips 72 that have been activated may be created in the database 326, and the central verification device 323 stores in the data table the identification information corresponding to the identification information read from the RFID tag 721 of the gaming chip 72 to be collated. The central verification device 323 may determine whether or not the gaming chip 72 is an activated and valid gaming chip 72 by determining whether or not the identification information corresponding to the identification information read from the RFID tag 721 of the gaming chip 72 to be collated exists in the data table.

In the examples of FIGS. 3 and 5 of the above embodiment, the location history information is stored in the database 326, but the location history information may be recorded in the RFID tag 721 of the gaming chip 72.

With a game token based on conventional technology, it has been possible to determine authenticity of the game token itself by determining information written in a memory area by reading RFID. However, information obtained during use of the game token at a casino site, in particular, information about an owner of the game token has not been able to be recorded and determined. Therefore, it has not been possible to determine, by reading RFID, presence of a genuine game token having abnormal history in terms of usage, such as history of being used or exchanged by an owner different from an original owner, failing to prevent use of such a game token having strange use history in a casino.

Therefore, in order to increase security by always determining and managing ownership information of each game token, the purpose of this disclosure is to provide a system capable of determining and recording which player is in possession of the game token when the dealer pays the player for the game token and the ownership of the game token is transferred from the casino to the player.

Figure 10:
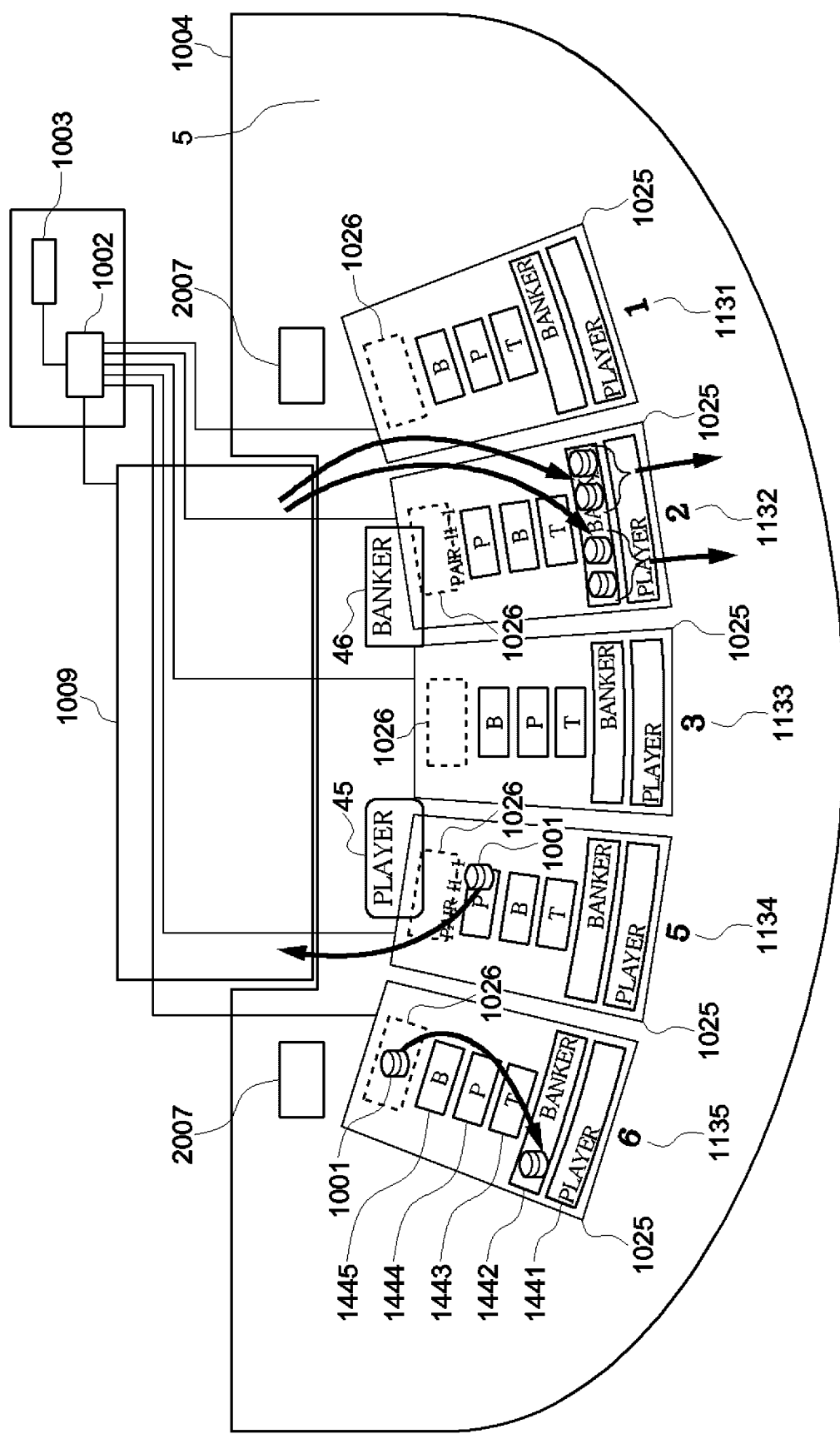
FIG. 10 shows an overall structure of a table game management system of Variation 4 of the embodiment of the present disclosure.

The overall overview of the table game management system in the first example of Variant 4 is shown in FIG. 10. FIG. 10 is a diagram of an overall overview of the table game management system. A game table 1004 for a baccarat game includes betting areas including player 1441, banker 1442, tie 1443, player pair 1444, and banker pair 1445 for each of player positions 1131 to 1135. Each of the player positions is provided with a chip placement area 1025. The table game management system further includes a chip reading device 1002 that reads RFID of game tokens 1001 placed on the chip placement areas.

Each of the chip placement areas 1025 includes a payment area 1026 on which a dealer places a game token 1001 removed from a chip tray 1009 of the game table 1004 when the dealer pays the game token 1001 out of the chip tray 1009 to a winning player.

Further, the table game management system includes a control device 1003 that determines a result of reading RFID of the game token 1001 read by the chip reading device 1002.

First, a player who participates in a game bets a game token 1001 on a betting area in the chip placement area 1025. By the chip reading device 1002 reading RFID of the bet game token 1001, the control device 1003 determines owner information of the game token 1001. The owner information is associated with ID information of the RFID in a database.

In a case where a casino wins based on a result of the game, the dealer collects a game token 1001 bet by a losing player and places the game token 1001 in the chip tray 1009. The chip reading device 1002 determines RFIDs of game tokens 1001 in the chip tray 1009, and the control device 1003 records in the database that the game token 1001 collected by the casino is owned by the casino.

If a player wins based on the result of the game, the dealer pays a game token 1001 in an amount corresponding to an amount of a bet chip out of a chip tray to the winning player according to a rule of the game.

At a time of payout, a payout chip may be placed on the above-described payment area 1026 or on a chip placement area 1025 other than the payment area.

Figure 11:
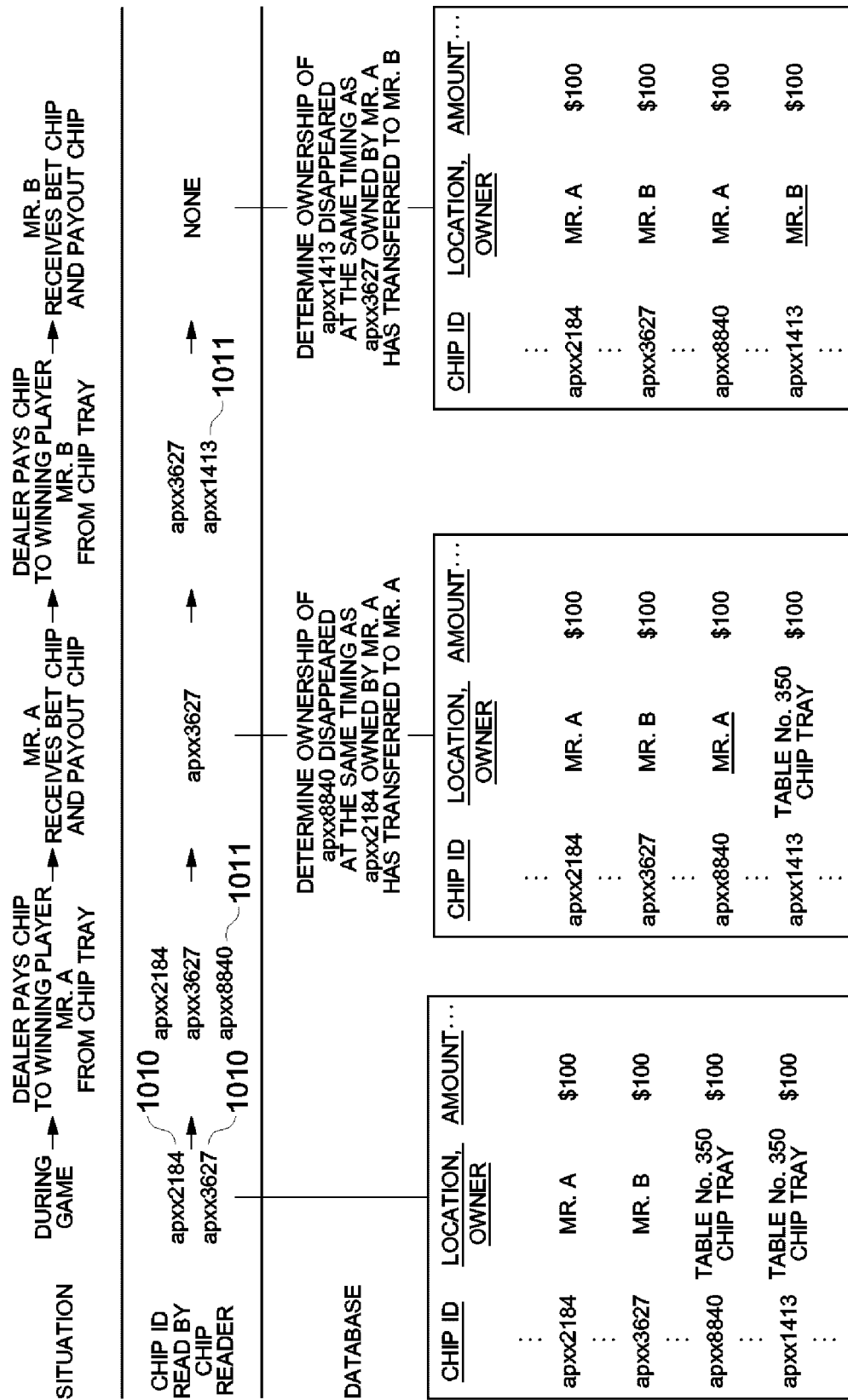
FIG. 11 shows an overview of a database of Variation 4 of the embodiment of the present disclosure.

Here, a method for recording owner information of the payout chip will be described with reference to FIG. 11. FIG. 11 illustrates a method for recording owner information of the game token 1001 when the chip is paid to the winning player.

In a case where a plurality of players place bet chips, and there are two or more stacks of the bet chips in the same player position, the chip reading device 1002 collectively reads the game tokens 1001 placed on the chip placement area 1025. Thus, during a game, the chip reading device 1002 acquires an ID 1010 of the bet game tokens without determining which game token 1001 belongs to which player. When payment is to be made to a winning player after determination of a win/loss result of the game, the dealer pays out to each winning player (for each stack) from the chip tray 1009. A game token 1001 removed from the chip tray 1009 is placed on a chip placement area 1025. The chip reading device 1002 reads an ID 1011 of the payout chip placed on the chip placement area 1025.

The winning player receives the paid out game token 1001 together with the originally bet game token 1001. At this time, because the bet chip and the payout chip transfer outside the chip placement area 1025, an ID of the bet chip and an ID of the payout chip disappear from the reading result by the chip reading device 1002. With this arrangement, the control device 1003 determines to which player the payout chip has been paid by associating with the owner information of the bet chip.

The control device 1003 stores the determined owner information of the payout chip in the database by associating the owner information with the ID of the game token.

The above-described arrangement enables traceability of the owner of the game token 1001 and, in a case of wrong transfer of the game token 1001, detection of the owner information stored in the database being different from information of an actual owner.

Note that the actual owner can be identified by using face authentication technology or an ID of a membership card.

In the above description, an ID of each game token is managed in a database. However, the game token 1001 itself may store owner information.

In addition to the above-described case where a payment area 1026 is provided to each player position, a payment area may be provided separately from the player positions, and the chip reading device 1002 may perform reading independently.

Use or non-use of the payment area 1026 may be selected depending on reading performance of the chip reading device 1002.

The table game management system may be able to use information mutually with an RFID reader that reads chips in the chip tray 1009 by RFID, a camera that reads a bet chip, a win/loss result determination device such as a shoe that determines a win/loss result of a game, or other device, which is connected to the table game management system.

Figure 12:
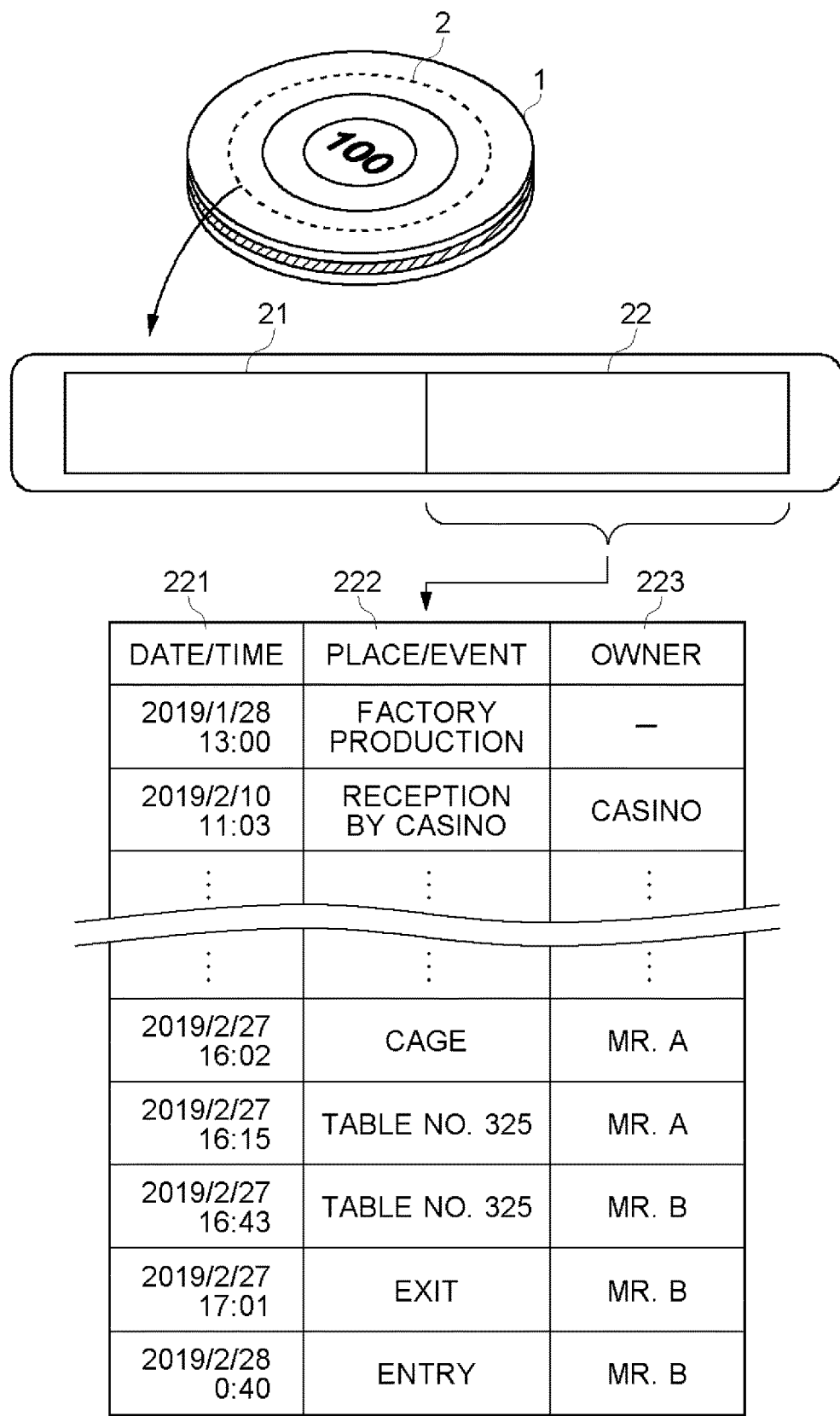
FIG. 12 shows an illustration of the RFID tag that the game token of the second example of Variation 4 of the embodiment of the present disclosure.

First, a game token used in a game token management system according to the second example of Variant 4 will be described. FIG. 12 illustrates a game token 1 used in the game token management system. In FIG. 3, an RFID tag 2 capable of storing various pieces of information is embedded in the game token 1. The RFID tag 2 has a data non-rewritable area 21 and a data rewritable area 22.

The data non-rewritable area 21 stores, as fixed information 3, information that is not to be changed, that does not change, or that must not be changed while the game token 1 is used. Specifically, the data non-rewritable area 21 stores, as the fixed information 3, production information, product information, casino information, amount information, a serial number, or the like of the game token 1. The production information includes date and time when the game token was manufactured, manufacturing machine used for manufacturing the game token, or other information. The product information includes, for example, information indicating that the game token is a chip for a VIP area of a casino and information indicating a type of the chip (for example, rolling chip or cash chip).

The data non-rewritable area 21 may be a functionally non-writable area due to a specification of the RFID tag, or may be a writable area locked to disable writing of data after necessary information is written.

The data rewritable area 22 stores, as variable information 4, information that changes while the game token 1 is used. For example, as illustrated in FIG. 12, the data rewritable area 22 stores, as the variable information 4, location information 220 including date/time information 221, place/event information 222, owner information 223, or other information.

The fixed information 3 and the variable information 4 may be encrypted in order to prevent wrong reading or writing of information by another person. Further, the fixed information 3 and the variable information 4 may be stored as metadata.

Figure 13:
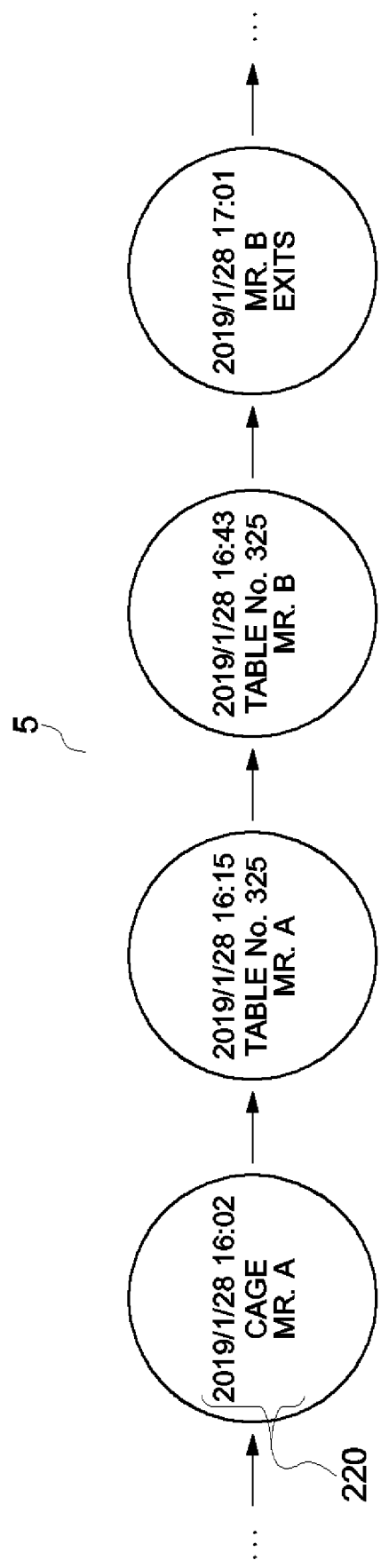
FIG. 13 shows a conceptual diagram of how data is recorded in the second example of Variation 4 of the embodiment of the present disclosure.

FIG. 13 illustrates an example of a method for recording data of the variable information 4 of the game token 1. As illustrated in FIG. 13, the location information 220 including date/time information 221, place/event information 222, and owner information 223 is set as a block. Then, blocks of the location information 220 are connected in a chain so that history of the location information 220 of the game token 1 can be determined.

FIG. 13 illustrates an example of the variable information 4 stored in the game token 1, and transference of the game token 1 as described below can be determined. At 16:02 on Jan. 28, 2019, Person A exchanges cash and a game token 1 at a cage 5. At 16:15 on the same day, Person A makes a bet at table No. 325 by using the game token 1. At 16:43 on the same day, Person B receives the game token 1 as a redemption for having won a bet at table No. 325. At 17:01 on the same day, Person B exits a casino, carrying the game token 1.

The variable information 4 may be configured to store only latest location information as illustrated in FIG. 13 or store all written location information. Further, some of a plurality of pieces of location information may be selected and stored. In a case where some pieces of the location information 220 are selected and stored among all of the location information, a plurality of pieces of the location information including at least the latest location information 220 may be stored. With the above configuration, history of use or transference of a certain game token 1 is known from variable information 4 of the game token 1. That is, traceability information of the game token 1 is written in the game token 1 itself to be determined.

Figure 14:
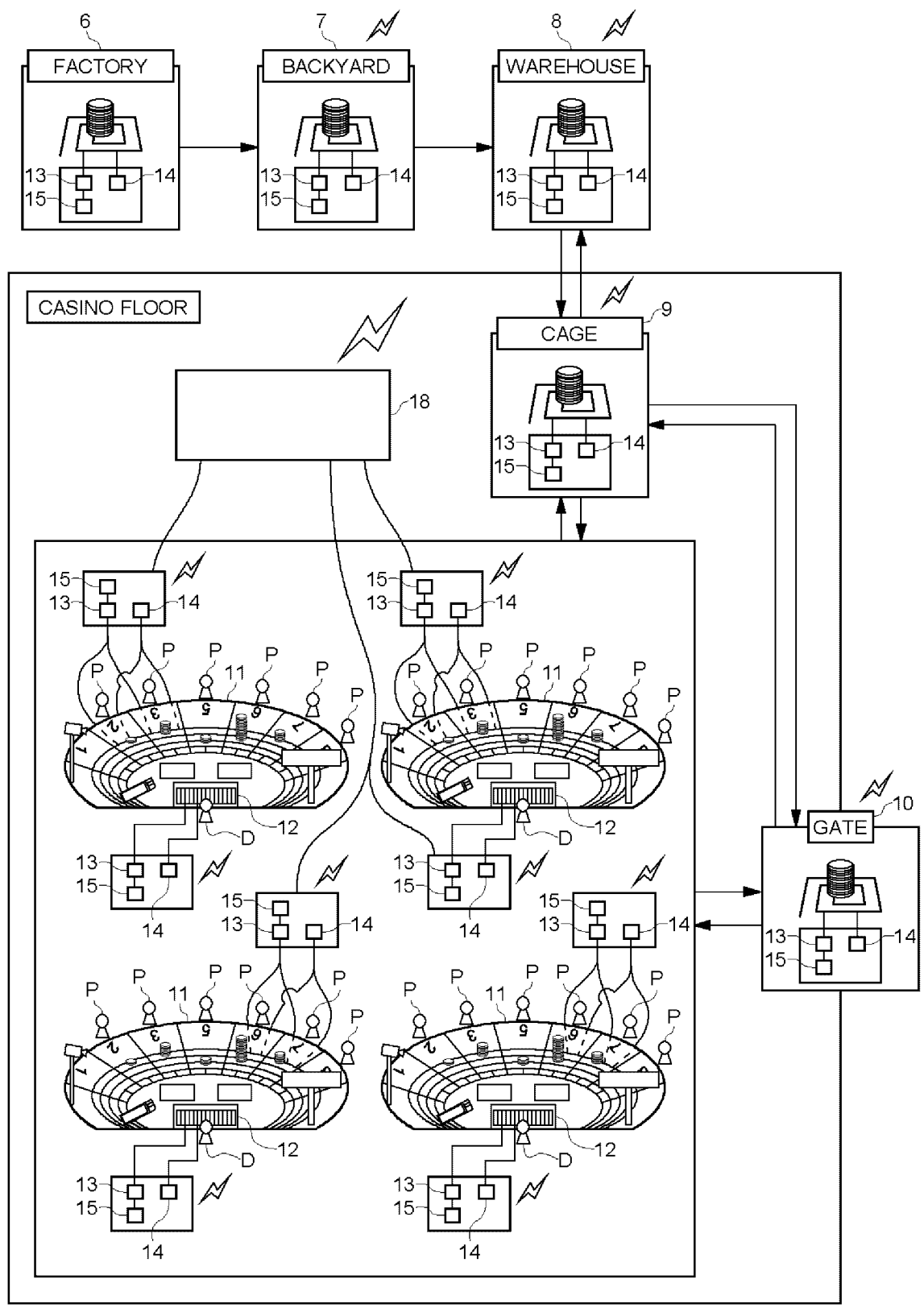
FIG. 14 shows an overview of the entire management system for game tokens in the second example of Variation 4 of the embodiment of the present disclosure.

Next, a management system for the game token 1 of the present example will be described. FIG. 14 illustrates an overall overview of the management system.

First, at a factory 6, a writer 14 writes, in the data rewritable area 22 of the RFID tag 2 of the game token 1, the variable information 4 including information of manufacturing completion or factory shipment as location information 220.

The game token 1 shipped from the factory 6 is subjected to a receiving process in a backyard 7 of the casino. In the backyard 7, a reader 13 reads the variable information 4 stored in the data rewritable area 22 of the game token 1. Then, on the basis of the reading result, a management control device 15 determines whether or not the location information 220 indicating that the information has been written at the factory 6, which is expected to be written, is actually written as latest variable information 4. If there is no record of writing at the factory 6, an error signal is generated indicating that the game token is possibly being wrong. This allows the casino to refuse to receive the game token or to request a factory to conduct investigation. If there is no problem in record of writing, in the data rewritable area 22 of the RFID tag 2, the writer 14 writes location information 220 indicating a backyard. At a time of writing, the location information indicating the backyard may be written either in addition to the location information indicating the factory or after deleting the location information indicating the factory. Further, reading and writing of the game token in the backyard 7 described above can be performed together with usual validation or activation of the game token.

The game token 1 of which receiving inspection has been completed in the backyard 7 is carried to a warehouse 8 or cage 9 of the casino. In the warehouse 8 or the cage 9, the reader 13 reads the variable information 4 stored in the data rewritable area 22 of the game token 1. Then, on the basis of a reading result, a management control device 15 determines whether or not the location information 220 indicating that the information has been written at the backyard 7, which is expected to be written, is actually written as latest variable information 4. Further, it may be also inspected whether information indicating the factory 6 is written in history of the variable information 4. The management control device 15 determines whether or not any abnormality is present in the history of the location information, similarly to the above-described inspection in the backyard 7. If there is no problem in a reading result, the writer 14 writes, in the data rewritable area 22, location information 220 indicating the warehouse 8 or the cage 9.

A player purchases the game token 1 at the cage 9. When the player purchases the game token 1, a writer 14 at the cage 9 writes, as the variable information 4, time at which the game token is purchased and information indicating change of the owner of the game token from the casino to a customer. The player may be identified and recorded by face authentication technology or an ID card such as a membership card of the casino or an official ID card.

The player makes a bet by placing the purchased game token 1 on a betting area 11 at a game table. From the RFID tag 2 of the bet game token 1, a reader 13 reads the location information 220 including date/time information 221, place/event information 222, and owner information 223. The management control device 15 determines whether or not any abnormality is present. It can be determined that abnormality is present, for example, in a case where a certain period has passed since last written date and time of information of use at a game table or information of cashing in at a cage, or in a case where the owner information 223 stored in the game token 1 and the owner information 223 identified by face authentication or an ID card are different from each other.

If there is no problem in a reading result, the writer 14 adds the location information 220 to the data rewritable area 22 of the bet game token 1. The location information 220 includes date/time information 221, place/event information 222, and owner information 223. At the table, for example, the writer 14 writes variable information 4 including information of a player position number where the game token 1 is placed and information of the player. The player information may be identified by an ID card or face authentication. Usually, a plurality of game tokens 1 are stacked and placed on the betting area 11, and therefore writing is performed collectively for the stacked game tokens 1.

When the player takes the game token 1 out of a casino floor, exit processing is performed at a gate 10. At a time of exit of the player, the reader 14 reads the location information 220, and the management control device 15 determines whether or not any abnormality is present with the variable information 4. Further, at the gate 10, the writer 14 writes the variable information 4 including place/event information 222 indicating the exit and owner information 223.

In a case where the player brings in the game token 1, which has been taken out before, and enters the casino floor, the reader 13 reads the location information, and a management control device determines whether or not any abnormality is present with the variable information 4. It is possible to determine that there has been transfer of the game token outside the casino, for example in a case where the owner of the game token 1 once taken out of the casino is different between at the time of exit the casino and at the time of entry to the casino.

The above-described management control device 15 may output an alarm to the cage 9 or to the gate 10 in a case where a reading result by the reader 13 is determined to be abnormal. On the basis of the alarm output by the management control device 15, cashing in may be refused when the owner of the game token 1 attempts to cash in at the cage 9, or a check may be conducted individually when the owner of the game token 1 exits the gate 10. Further, in a case where a determination result is abnormal, the management control device 15 may issue an alarm to a dealer of each game table to interrupt a game or may issue an alarm to a pit, and a pit manager may determine to interrupt or continue a game, or determine to exchange the game token 1. Alternatively, the management control device 15 may be connected to an overall management control device 18 of the casino and may issue an alarm to the overall management control device 18.

Similarly, the management control device 15 may determine whether or not any abnormality is present in the variable information 4 read by the reader 13 when the game token 1 is exchanged for cash at the cage. Specifically, the management control device 15 may determine that abnormality is present in a case where a certain period has passed since latest written date and time of information of use at a game table or information of cashing in at the cage, or in a case where the owner information 223 stored in the game token 1 and information of a person who is going to exchange the game token 1 for cash are different from each other. In a case where abnormality has been determined to be present with the game token 1, the management control device 15 may output an alarm to refuse to exchange the game token 1 for cash.

Further, the above description is given of a case where the reader 13 performs reading, a management control device performs determination, and then the writer 14 performs writing. However, the reading and the writing may be performed simultaneously.

In the following, details of application of an example will be described.

At the factory 6, the RFID tag 2 is read and/or written at a time of production completion or product shipment. The production information and the product information are written as the fixed information 3 and locked it so as not to be rewritten if necessary, and the variable information 4 is written.

At the backyard 6, the game token 1 shipped from the factory is received, and the RFID tag 2 is read and/or written when the game token 1 is activated as a usable game token 1.

At the warehouse 8, the RFID tag 2 is read and/or written when the game token 1 is transferred from the warehouse 8 to the cage 9, or from the cage 9 to the warehouse 8. Alternatively, the RFID tag 2 of the game token 1 kept in the warehouse 8 may be read and/or written at regular time intervals or at a predetermined timing.

At the cage 9, the RFID tag 2 is read and/or written when the game token 1 is transferred from or to the warehouse 8 or when cash owned by a customer and the game token 1 are exchanged. In a case where cash and the game token 1 are exchanged at the cage 9, as the variable information 4, place/event information 222 indicating the exchange and owner information 223 indicating a player who exchanged the cash and the game token 1 are written. The owner information 223 can be acquired from a casino ID card of the player, a face authentication system, a credit card, or the like.

At the gate 10, the RFID tag 2 is read and/or written on entry or exit of the player. To all game tokens 1 that a player takes out of the casino when exiting the casino, as the variable information 4, place/event information 222 indicating the taking out and owner information 223 indicating a player who takes out the game tokens 1 are written and registered. Similarly, at a time of entry to the casino, as the variable information 4, place/event information 222 indicating the bringing in and owner information 223 indicating a player who brings in the game token 1 are written and registered to the game token 1 brought in the casino.

At the betting area 11, the RFID tag 2 of the game token 1 that a player placed on the betting area 11 to participate in a betting is read and/or written. The RFID tag 2 of a game token 1 that the dealer has placed on a betting area 11 as redemption to the player is read and/or written.

In a chip tray 12, the RFID tag 2 of each of the game tokens 1 collected in the chip tray and the RFID tag 2 of each of the game tokens 1 kept in the chip tray are read and/or written.

Further, the game table may include a payout area including area 2007 and pay area 1026, and the RFID tag 2 of a game token 1 that the dealer has placed on the betting area 11 as redemption to a player may be read and/or written.

The management control device 15 has a function to determine whether or not any abnormality is present in location information 220 obtained from a reading result by a reader 13 at each place. Determination of presence of abnormality is made in a case where the game token 1 has not been used for a predetermined period since last writing, or where location information, which is supported to be written, is not written.

A situation where the game token 1 has not been used for a predetermined period since last writing is a situation where: 1) latest location information indicates the cage 9, and a predetermined period has passed before next information is written, 2) latest location information indicates entry at the gate 10, and a predetermined period has passed before next information is written, or 3) latest location information indicates exit at the gate 10, and a predetermined period has passed before next information is written.

A situation where location information, which is supported to be written, is not written is a situation where: 4) at a time of entry to a gaming hall, information indicating exit at the gate 10 is not written as latest location information in data rewritable area 22 of the game token 1, 5) at a time of use at the cage 9, information indicating the backyard 7 is not written, or 6) at a time of exit from the gaming hall, information indicating the cage 9 or the backyard 7 is not written.

On the basis of the owner information 223 obtained from the reader 13, the management control device 15 can determine presence of abnormality when: 1) a person different from a latest owner whose information is stored in the data rewritable area 22 exchanges the game token 1 for cash or another game token in the gaming hall, or exits the gaming hall, or 2) a person different from an owner at a time of exit whose information is stored in the data rewritable area 22 brings the game token in the gaming hall.

On the basis of information obtained from the reader 13 and indicating a place of the betting area 11, or information indicating location of the chip tray 12 or a payout area, the management control device 15 determines presence of abnormality when: 1) a person different from a latest owner whose information is stored in the data rewritable area 22 uses the game token 1 at a game table, 2) a person different from the person who purchased, at the cage 9, a game token 1 without a record of use at the game table attempts to exchange the game token 1 at the cage 9, 3) a game token 1 not including information indicating the cage 9 or the backyard 7 is used in the gaming hall, or 4) latest location information is information indicating the betting area 11 or the payout area, and after a predetermined period has passed, the game token 1 is exchanged for cash at the cage 9 or is used at the game table.

FIG. 17 illustrates a database according to another example of Variant 4. The management system further includes a database 17 that records similar fixed information 3 and variable information 4 outside the game token 1. The management control device 15 is able to record information in the database 17 on the basis of a reading result by the reader 13, check the fixed information 3 and the variable information 4 stored in the game token 1 with information in the database, and determine presence of abnormality.

In the RFID tag 2 according to the example, a functionally non-writable area in the data non-rewritable area 21 may be a tag identifier (TID) area. An area in the data non-rewritable area 21, which is locked to disable further writing of data after necessary information is written, may be an electronic product code (EPC) area or a user area. The data rewritable area 22 may be an EPC area or a user area.

Figure 15:
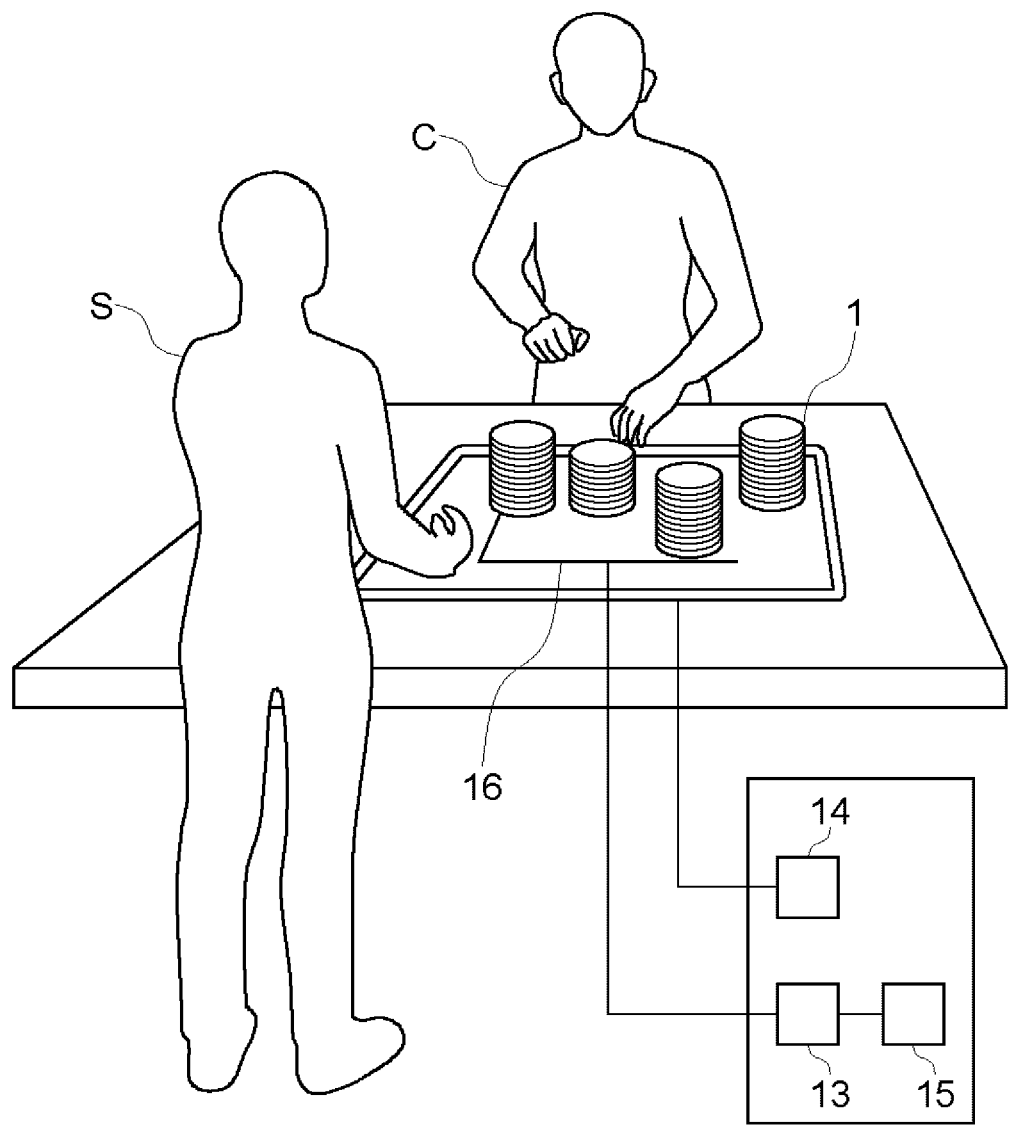
FIG. 15 shows a reading and writing devices for the game token in the second example of Variation 4 of the embodiment of the present disclosure.

The reader 13 and the writer 14 may be changed in form depending on a place. For example, the reader 13 and the writer 14 may be on a board at the factory 6 as illustrated in FIG. 15, and may be box-shaped at the gate 10. The betting area 11 or the chip tray 12 may include functions of the reader 13 and the writer 14. Further, the game token 1 either may be read and written in a stacked state without any support or may be read and written while being contained, for example, in a chip case. Further, the reader 13 and the writer 14 may be unified.

The above Variant 4 describes a case where a game token has one RFID tag, and the single RFID tag has an area in which writing to data is impossible and a data rewritable area. Meanwhile, there may be a case where two RFID tags are embedded in the game token. In this case, one RFID tag stores fixed information and then is locked to disable data writing, and another RFID tag is left data-rewritable to record variable information.

Figure 16A:
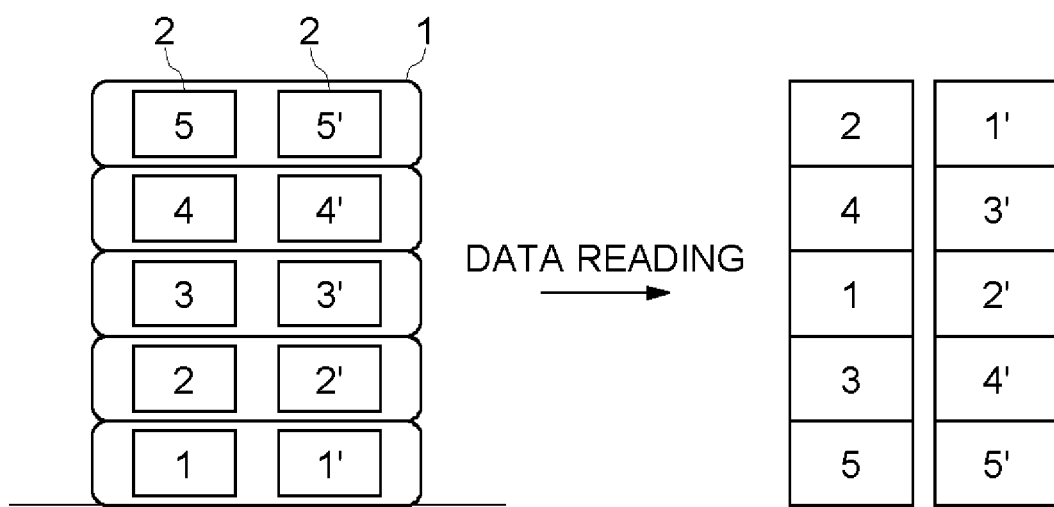
FIG. 16A shows a structure of data of game token in the second example of variation 4 of the embodiment of the present disclosure.

However, in this case, when a plurality of game tokens are read collectively, an information group of fixed information 3 and an information group of variable information 4 are read separately as illustrated in FIG. 16A. Therefore, a problem arises in that a combination of fixed information and variable information of a specific game token cannot be determined, and a game token having abnormal variable information cannot be identified.

Figure 16B:
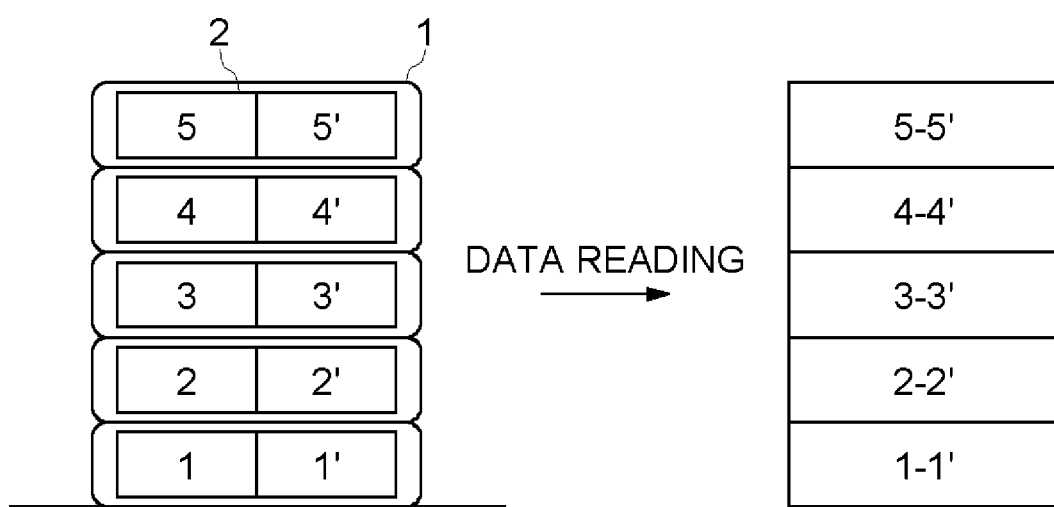
FIG. 16B shows a structure of data of game token in another example of variation 4 of the embodiment of the present disclosure.

On the other hand, in the case of one RFID tag, as illustrated in FIG. 16B, mutually corresponding fixed information and variable information that are read by a reader can be determined even when a plurality of game tokens are read collectively. Therefore, a game token having a single RFID tag is conceived to be preferable.

In general, an RFID tag with a larger diameter has higher reading accuracy. Therefore, in a case where an RFID tag is embedded in the game token, a diameter of the RFID tag is preferably at least equal to or larger than a radius of the RFID tag. Thus, it is not preferable that two RFID tags are embedded in the game token, in which case, the diameter of each of the RFID tags becomes smaller. Further, the number of RFID tags to be read increases with a game token including two RFID tags, resulting in lower reading speed at a time of reading a plurality of game tokens.

In view of the above, a game token having a single RFID tag is considered to be more effective.

Figure 18:
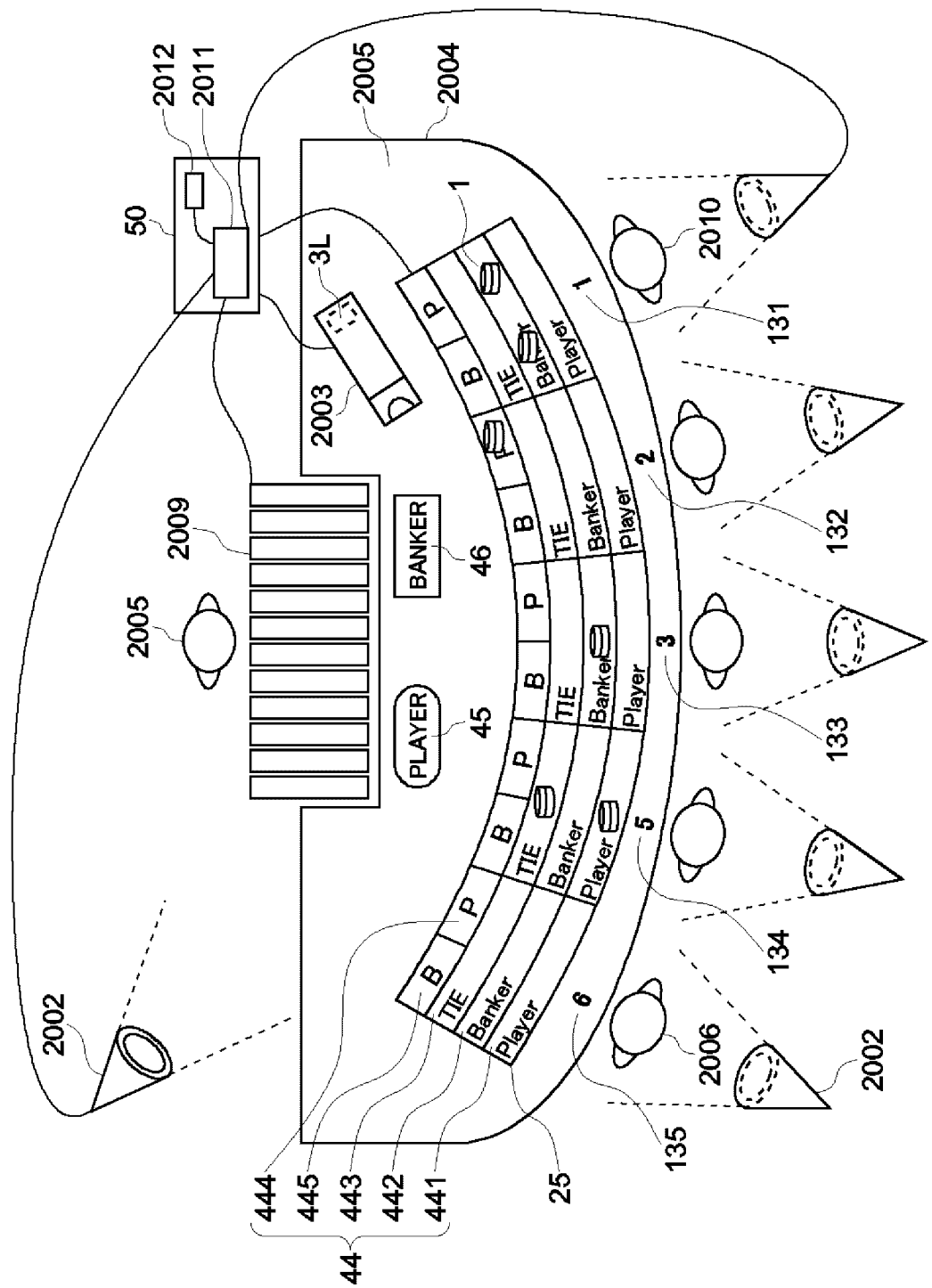
FIG. 18 shows an overview of the entire table game management system in a casino with multiple game tables of Variant 4 of the embodiment of the present disclosure.

Described below is an overall overview of a table game management system at a gaming hall having a plurality of game tables according to a third example of Variant 4. FIG. 18 is a diagram illustrating an overall overview of the table game management system. The table game management system having a plurality of game tables 2004 at a gaming hall includes a game recorder 2011 that records an image of a game at a game table 2004 including an image of the game token 1, via a plurality of cameras 2002, an image analyzer 2012 that performs image analysis on the recorded images, a chip reading device 25 that reads RFID added to the game token 1, and a game result determination device 18 that determines and displays a result of each game played at the game table 2004.

The game result determination device 18 is, for example, a card distributor 2003, which is a so-called electronic shoe that have been used by persons skilled in the art. A rule of a game is previously programmed in the card distributor 2003, which is configured to read information of a distributed card C and determine win or loss of the game. For example, in a baccarat game, a win of a banker, a win of a player, and a tie (draw) are basically determined by each rank of two to three cards, and a determination result (win/loss result) is displayed by a result display lamp 2013.

In FIG. 18, a game table 2004 is a table for baccarat and provided with five sitting numbers 13, allowing five game participants to participate in a game. The five sitting numbers are "sitting number 1" 131, "sitting number 2" 132, "sitting number 3" 133, "sitting number 5" 134, and "sitting number 6" 135. A betting area 44 is provided to each sitting number 13. The betting area 44 of a sitting number 13 includes each area for player (PLAYER) 441, banker (BANKER) 442, tie (TIE) 443, player pair (P) 444, and banker pair (B) 445. Each game participant makes a bet by placing a game token 1 in an amount to be bet at a position corresponding to a bet target. In FIG. 18, for example, at a sitting number 5, two game tokens 1 are placed on tie 443 and two game tokens 1 are placed on player 441 for betting. The game table 2004 further includes a player card area 45 for placing a drawn player card and a banker card area 46 for placing a drawn banker card.

Via a camera 2002 and the image analyzer 2012, the control device 2014 is able to determine on which position (player, banker, tie, or pair) in a betting area 2008 each player 2006 has bet a game token 1, and types and the number of the bet game tokens 1. Different colors are assigned to game tokens 1 in different values. That is, it is possible to determine that, for example, at the sitting number 5, two game tokens 1 are bet on tie 443 and two game tokens 1 are bet on player 441.

As illustrated in FIG. 18, the chip reading device 25 is arranged so that RFIDs of the game tokens 1 in a reading area can be collectively read by regarding an entire betting area for each sitting number as one reading area. In the RFID attached to a game token 1, unique ID information, and an amount, type, manufacturing information, owner information, or the like, of the game token 1 are written. Alternatively, the ID information and the amount, type, manufacturing information, owner information, or the like, of the game token 1 may be associated and stored in a database. By reading the RFID attached to the game token 1, the chip reading device 25 can determine a total amount or the number of game tokens 1 for each sitting number. That is, for example, a type, an amount, and an ID of each of four game tokens bet at the sitting number 5 can be determined.

Figure 19:
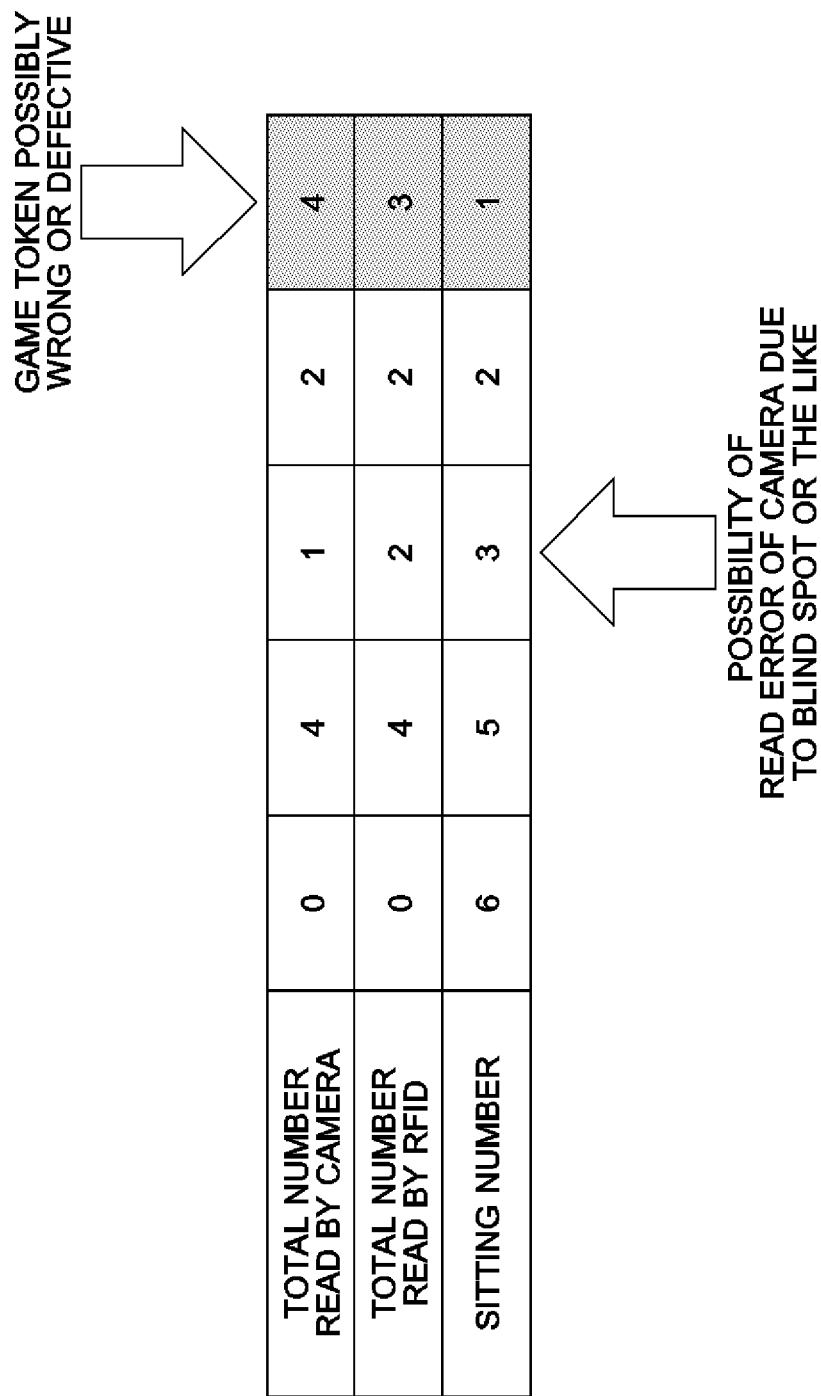
FIG. 19 shows a result of reading the chip by a camera and RFID in Variant 4 of the embodiment of the present disclosure.

As illustrated in FIG. 19, on the basis of types and the number of the game tokens 1 bet at each betting area of each sitting number based an image analysis result by the image analyzer 2012, the control device 2014 determines a total amount or the total number of the game tokens 1 for each sitting number. Then, to determine agreement, the control device 2014 compares the determined a total amount or the total number of the game tokens 1 with a total amount or the total number of the game tokens 1 for each sitting number based on information of RFIDs of the game tokens 1 read by the chip reading device 25. Furthermore, a sitting number for which an amount or the total number of the game tokens 1 determined to be disagreeing can be output, and therefore a sitting number having a problem can be identified.

In a case where the total amount or the total number of the game tokens 1 for each sitting number based on the image analysis result by the chip reading device 25 is smaller than the total amount or the total number of the game tokens 1 for each sitting number based on the reading result by an image analyzer, there is a possibility that RFID attached to a game token 1 is broken, the RFID cannot be read, or RFID is not attached to the game token 1. In FIG. 19, the read total number of game tokens 1 bet at sitting number 1, based on image analysis by the image analyzer 2012, is four, whereas the total number of the game tokens 1 based on reading of RFID by the chip reading device 25 is three. Therefore, it is conceivable that one of the four game tokens 1 bet at the sitting number 1 has unreadable RFID.

In a case where the total amount or the total number of the game tokens 1 for each sitting number based on the image analysis result by the chip reading device 25 is larger than the total amount or the total number of the game tokens 1 for each sitting number based on the reading result by the image analyzer, there is a possibility that the image analyzer 2012 has not been able to read the game token 1 for such reasons that the game token 1 is in a blind spot of a camera. In FIG. 19, the read total number of game tokens 1 bet at sitting number 3, based on image analysis by the image analyzer, is one, whereas the total number of the game tokens 1 based on reading of RFID by the chip reading device 25 is two. Therefore, there is a possibility that only one of the two game tokens 1 bet at a sitting number 3 has been recognized by the image analyzer.

ID information of the RFID attached to the game token 1 is registered in a database of a casino. Information of production and shipment at a factory, and information of reception, validation, and activation at the casino are recorded. The control device 2014 can check the information of the RFID read by the chip reading device 25 with information in the database and determine authenticity of the registered information of the game token 1 to be used in the casino.

With this configuration, types and the number of the game tokens 1 bet at each betting area can be determined by the camera. Further, on the basis of RFID information of game tokens 1 read by the chip reading device 25, a wrong or defective game token 1 can be identified for each sitting number.

The table game management system further includes a game participant identification unit using a face authentication system or a player ID card, and the control device 2014 can associate game participant information identified by the game participant identification unit with a sitting number. For each game participant, the control device 2014 can store the bet amount, redeeming or collecting amount, and win/loss information, which is stored for each sitting number. Further, the control device 2014 can collectively store information of a plurality of games that game participants play at a plurality of tables.

By using a chip tray determination device 12, the control device 2014 can determine a total amount of the game tokens 1 in a chip tray 17 of a dealer 2005 at the game table 2004. After a game end and settlement, the control device 2014 can calculate to figure out whether a total amount of the game tokens 1 in the chip tray 17 has increased or decreased by comparing an amount of collected lost game tokens 1 that each player 2006 has bet with an amount of payment 9W to a winning player 2006W for won chips, according to a win/loss result of the game. A chip tray determination device may capture an image of the game tokens 1 contained in the chip tray 17 by using the camera 2002 and, on the basis of analysis by an image analyzer, determine the total amount of the game tokens 1 in the chip tray 17. Further, the chip tray determination device may detect the total amount of the game tokens 1 contained in the chip tray 17 by providing an RFID reader to the chip tray 17.

In this example, a wrong or an error is detected on the basis of a win/loss result of the game, information about how many and what type of game token 1 has been bet on which position (player, banker, tie, or pair) in the betting area 2008, and increase or decrease in amount of the game tokens 1 in the chip tray 17 after collection of lost chips and redemption for a won game token 1. Therefore, a wrong or an error can be detected without determining transference of the game tokens 1 after a game end, that is, whether a bet game token 1 has transferred to a player side or a dealer side.

Here, in a case of baccarat for example, a win/loss result of a game can be determined according to a rule of baccarat by the card distributor 2003 reading a rank of the card C drawn out in the game. Further, the win/loss result can be determined by capturing an image of a top of the game table 2004 by a camera 2002, analyzing the image by the image analyzer 2012, and then checking an analysis result with a rule of the game by the control device 2014. In this case, a game result determination device includes the camera 2002, the image analyzer 2012, and the control device 2014. Information of how many and what type of game tokens 1 a player at each sitting number 7 has bet on which position (player, banker, tie, player pair, banker pair) in a betting area 2008 is obtained by the camera 2002 capturing an image of the game tokens 1 placed on the betting area 2008 and the image analyzer 2012 analyzing the image for each play position 7.

Further, increase in amount of the game tokens 1 in the chip tray 17 from before collection to after collection of a lost game token 1 and decrease in amount of the game tokens 1 in the chip tray 17 from before redemption to after redemption for a won game token 1 can be calculated by comparison of a total amount of the game tokens 1 in the chip tray 17 before the collection of the lost game token 1 and redemption for the won game token 1 with a total amount of the game tokens 1 in the chip tray 17 after the collection of the lost game token 1 and redemption for the won game token 1.

For example, assuming that a total amount of the game tokens 1 in the chip tray 17 before start of the game is Bb, and a total amount of the game tokens 1 in the chip tray 17 after the end of the game and collection of lost chips and redemption for a won chip are completed is Ba. Further, assuming that, in this game, a total amount of the game tokens 1 bet on player areas of all play positions 7 is bp, a total amount of the game tokens 1 bet on banker areas of all the play positions 7 is bb, and a total amount of the game tokens 1 bet on tie areas of all the play positions 7 is bt. For example, in a case where a banker is a winner as a win/loss result of the game, Ba−Bb=bp−bb+bt should be established. Alternatively, Ba, which is the total amount of the game tokens 1 in the chip tray 17 after the end of the game, should be (Bb+bp−bb+bt). If this is not the case, it can be determined that there has been a wrong or an error in collection or redemption of the chips.

Figure 23A:
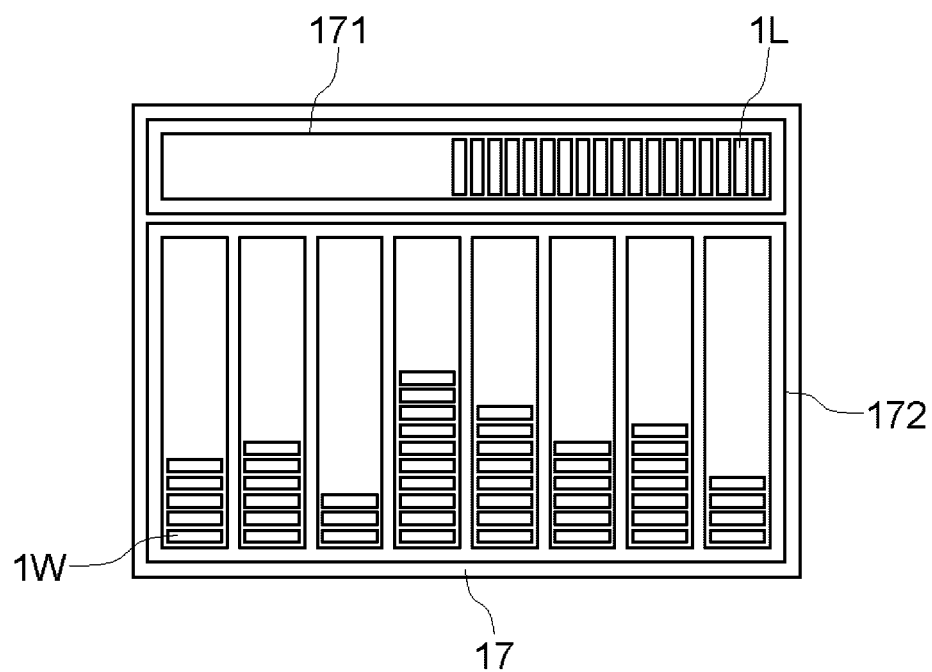
FIG. 23A shows details of a chip tray of Variation 4 of the embodiment of the present disclosure.
Figure 23B:
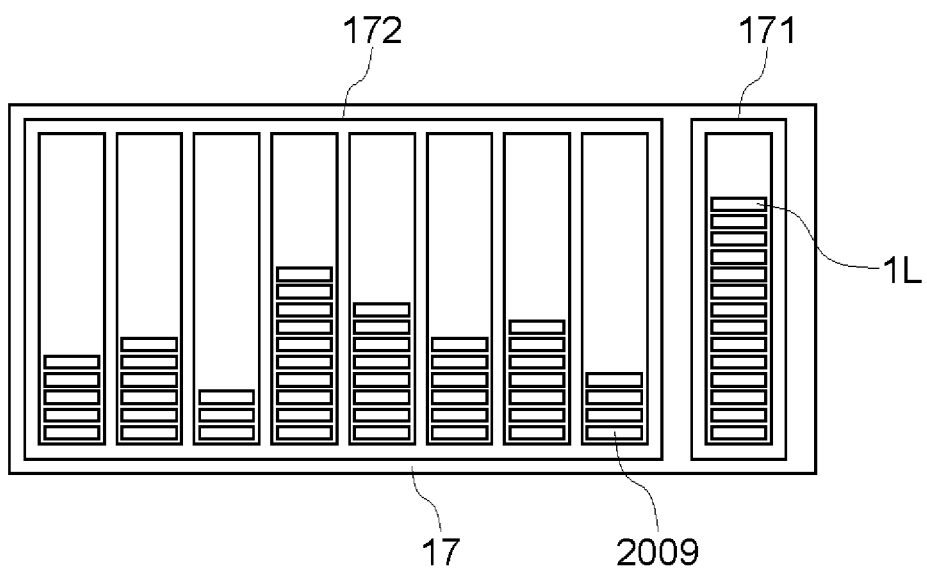
FIG. 23B shows another example of the chip tray of Variation 4 of the embodiment of the present disclosure.

FIG. 23A is a diagram illustrating details of a chip tray of the present example, and FIG. 23B is a diagram illustrating another example of the chip tray. The chip tray 17 includes a collection chip tray 171 for temporarily keeping a collected game token 1L bet by a losing player 2006L, and a redemption chip tray 172 for keeping a game token 1W to be redeemed. The image analyzer 2012 and the control device 2014 determine positions, types, and the number of the game tokens 1L bet by the losing player 2006L, and calculate an increase in amount of the game token 1L, which is the amount of the game token 1 expected to be in the collection chip tray 171. Further, the image analyzer 2012 and the control device 2014 determine an actual total amount of the game tokens 1 in the collection chip tray 171 after the collection, and compare the expected total amount with the actual total amount to determine whether or not there is a difference.

The control device 2014 further performs redemption for the game token 1 to be redeemed, and after the redemption, compares a total amount of the chips expected to be in the chip tray based on the amount of the chips expected to be redeemed in the game, which is calculated from positions, types, and the number of chips each game participant bet at the game table and based on a game result, with the actual total amount of the chips in the chip tray to determine whether or not there is a difference.

Further, the game token 1W is redeemed to the winning player 2006W by using a game token 1 in a redemption chip tray 172. Thus, it is possible to secure sufficient time for the image analyzer 2012 and the control device 2014 determine an actual total amount of the game tokens 1 in the collection chip tray 171 after the collection.

As described above, in the third example, the control device 2014 calculates, for each game, income and outgo of chips from an amount of bet chips placed on the game table 2004 and a win/loss result of the game, and verifies an increase in balance of the chips in the chip tray 17 after the end of the game. If a difference is detected in this verification, the control device 2014 issues an alarm or adds a record of the difference to a record of a video image captured by the camera 2002. A casino operator can track down a cause of the difference by reviewing the video image.

A table game management system according to the third example calculates, from total amount of the game tokens 1 in the chip tray 17 before settlement for each game, an increase or decrease in amount of chips in the game calculated from positions, types, and the number of game tokens 1 bet by all players 2006 of the game and from a win/loss result of the game obtained by a win/loss result determination device. Then, the table game management system compares an expected total amount of the game tokens 1 in the chip tray 17 after settlement of the game end with an actual total amount of the game tokens 1 in the chip tray 17 at the game end, which is obtained via the image analyzer 2012, to determine whether or not there is a difference.

Via the image analyzer 2012, the control device 2014 determines positions, types, and the number of chips bet by each player, and determines an actual total amount of chips in the chip tray at an end of collection of all lost chips bet by each player. Then, the control device 2014 compares an expected total amount of the game tokens 1 in the chip tray 17, which is obtained by adding an increase in chips in the chip tray 17 determined by positions, types, and the number of chips bet by a losing player, to a total amount of chips of the game in the chip tray before settlement of each game, with an actual total amount of the game tokens 1 in the chip tray 17 to determine whether or not there is a difference.

In a case where the control device 2014 compares an expected total amount of the game tokens 1 in the chip tray 17, which is obtained by adding an increase in chips in the chip tray 17 determined by positions, types, and the number of the game tokens 1 bet by a losing player, to a total amount of the game tokens 1 of the game in the chip tray 17 before settlement of each game, with an actual total amount of the game tokens 1 in the chip tray 17 and determines there is no difference between the expected total amount and the actual total amount, and in addition, compares an expected total amount of the game tokens 1 in the chip tray 17 after settlement at the end of the game with an actual total amount of the game tokens 1 in the chip tray 17 at the end of the game, which is obtained via the image analyzer 2012, and determines that there is a difference between the expected total amount and the actual total amount, the control device 2014 determines there has been a wrong payment and issues an error signal that notifies of the wrong payment.

The chip tray 17 includes the collection chip tray 171 that collects and temporarily keeps the game tokens 1 bet by a losing player. The image analyzer 2012 compares an expected total amount of the game tokens 1 in the collection chip tray 171, which is obtained by adding an increase in amount of the game tokens 1 in the game calculated from positions, types and the number of the game tokens 1L bet by the losing player, with an actual total amount of the game tokens 1 in the collection chip tray 171 to determine whether or not there is a difference between the expected total amount and the actual total amount.

In a case where the control device 2014 determines a difference in which a determined actual total amount of the game tokens 1 in the chip tray 17 of the dealer 2005 at the game table 2004 is not corresponding to an increase or decrease in amount of chips calculated from an amount of chips bet by all players and a win/loss result of the game, the game recorder 2011 can play back with an index or time attached to an acquired image or with a scene of collection or payment of the game token 1 specified, so that a record of the game in which the above different has occurred can be analyzed in the game recorder 2011.

As described above, the control device 2014 obtains a total amount of chips in the chip tray 17 via the image analyzer 2012 after the settlement at the end of the game. In this case, determination after settlement is performed when: 1) redemption for the won game token 1 is completed, 2) the card C used in the game is collected and discarded in a discard area 41 or discard slot 42 of the table, 3) a predetermined button attached to a win/loss result determination device is pressed, or 4) a marker 43 that indicates win or loss is reset.

Further, the control device 2014 has an artificial-intelligence utilization structure or deep-learning structure, which allows the control device 2014 to determine positions (player, banker, or pair) and an amount (types and the number) of chips bet at each play position 7 of the game table 2004, and to extract win/loss history of each player 2006, which is obtained from a win/loss result of each game, and an amount of obtained chips (an amount of won chips) as an unusual situation specified by a casino, compared with statistical data of many games in the past (big data). Typically, the control device 2014 includes an artificial-intelligence utilization structure or deep-learning structure, which can extract, as an unusual situation compared with statistical data (big data, or the like) of games in the past, a case of a winning amount of a certain amount (one million dollars) or more, or a case of a series of several games in which amounts of bet chips are small in losing games and amounts of bet chips are large in winning games at a play position 7 of the game table 2004.

Furthermore, unified with the image analyzer 2012, the control device 2014 of this table game management system is configured to be able to identify an individual player 2006 at the play position 7 which has won a predetermined amount or more or at which an unusual situation is extracted. In identification of such a player 2006, in the image analyzer 2012, feature points of an image of a face is obtained by, for example, extraction of a feature point, and the image is identified by adding an identification number (ID, or the like) to the image. Then, the control device 2014 has an alarm function of notifying another game table of the presence of a specific player when the specific player 2006 leaves the seat and sits at the other game table. Specifically, a pit manager or a person in charge of each table (or a dealer) who manages each game table 2004 is notified to further prevent an unusual situation.

The control device 2014 can identify a collected game token 1 for each sitting number on the basis of information of an ID of RFID of the collected game token 1 determined by the chip tray determination device and information of an ID of RFID of the game token 1 read by the chip reading device 25.

Figure 20:
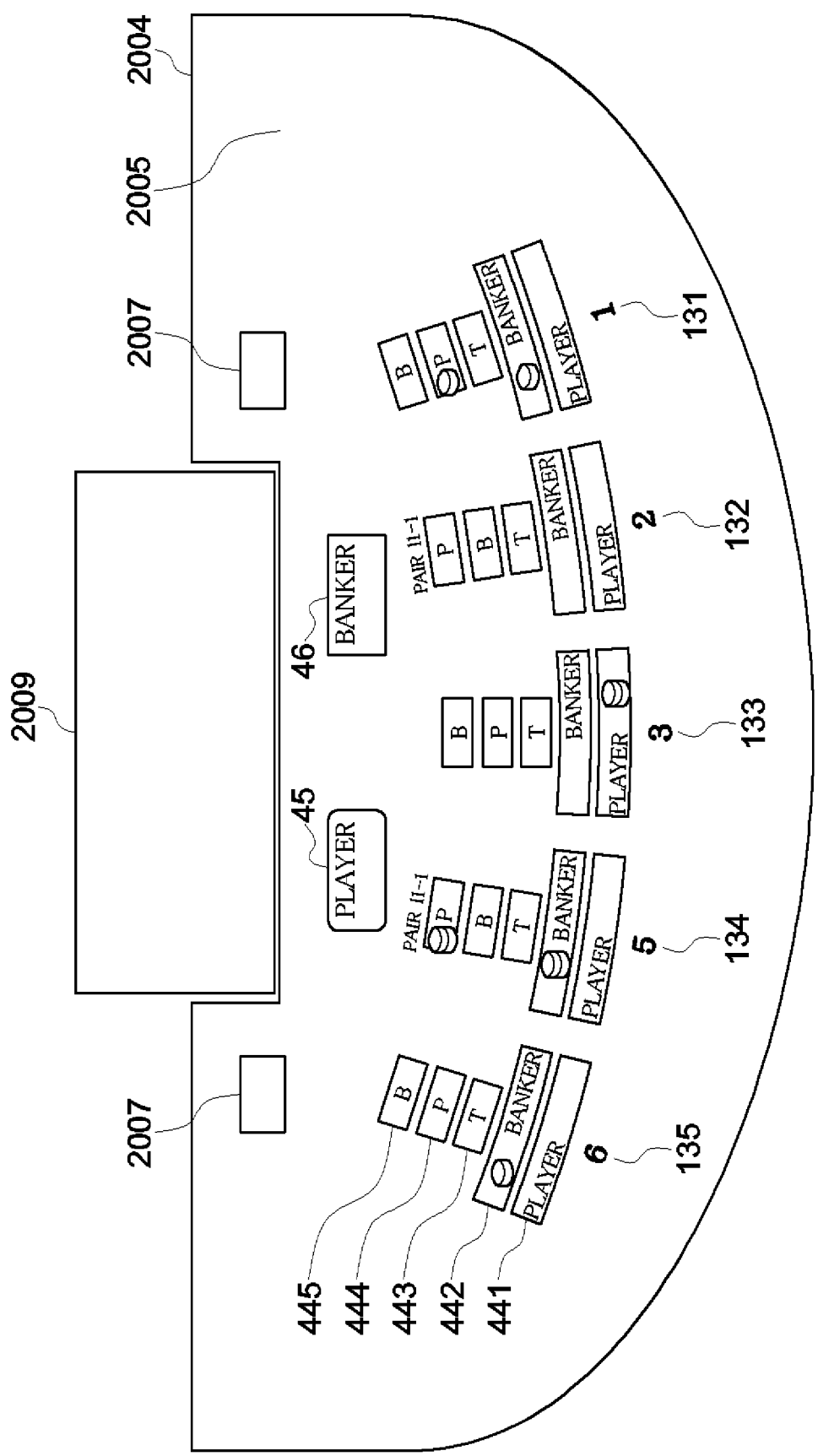
FIG. 20 shows a game table of Variation 4 of the embodiment of the present disclosure.
Figure 22:
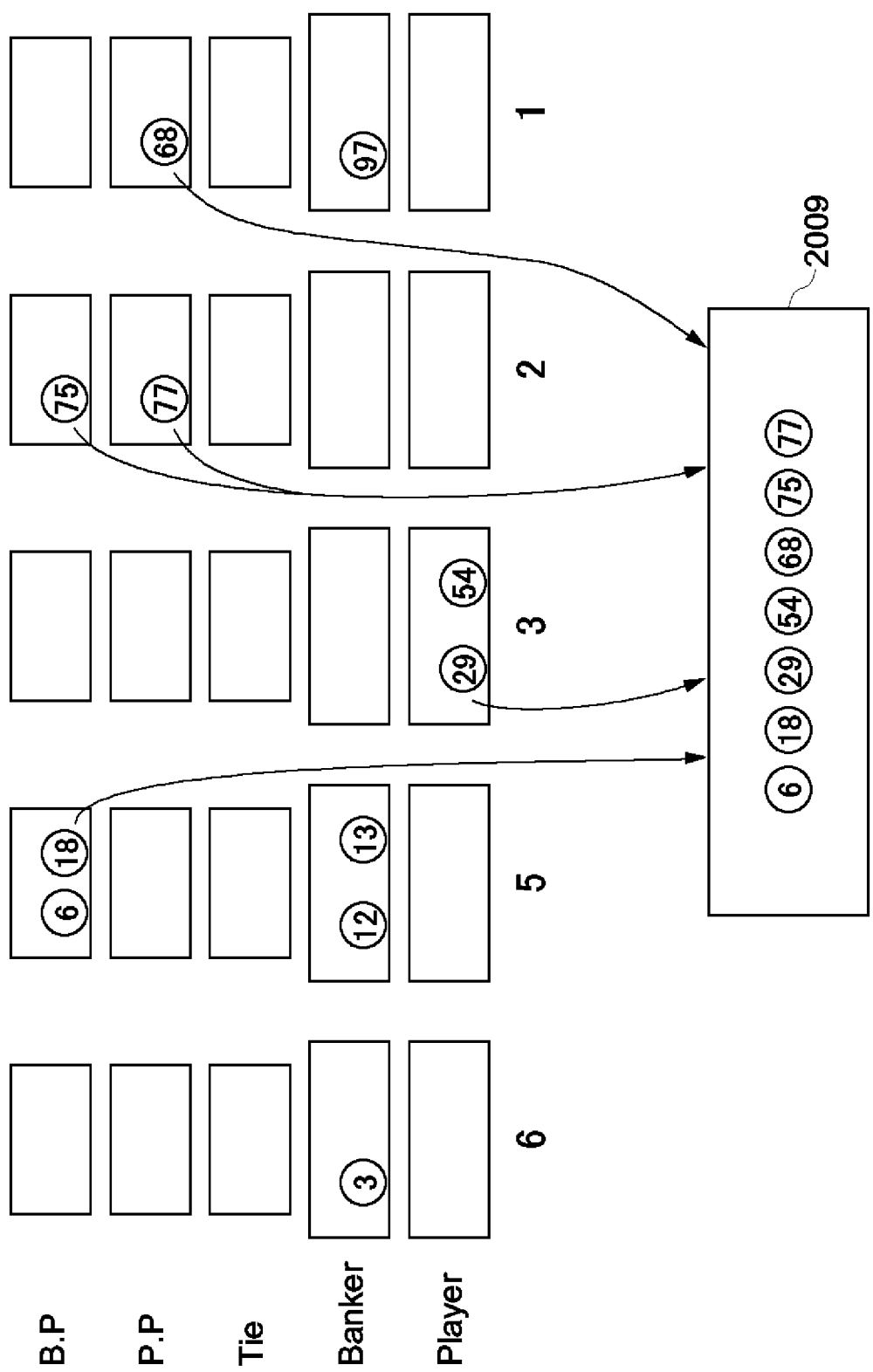
FIG. 22 shows a status of the game token wagered on a game table of Variant 4 of the embodiment of the present disclosure.

In FIG. 20, game tokens 1 are bet as illustrated in the detail tables in FIGS. 21 and 22. In analysis by the image analyzer 2012, places (player, banker, or the like) where the game tokens 1 are bet and the number (and amount) of the bet game tokens 1 can be determined. Meanwhile, in reading by the chip reading device 25, an ID of RFID attached to a game token 1 can be determined for each sitting number. Further, because a chip tray determination device 25 can determine IDs of game tokens 1 in a chip tray 9, the chip tray determination device can determine a collected game token 1 by determining IDs added from before collection to after collection. In a case where a banker has won as a game result in FIGS. 20 to 22, an analysis result by the image analyzer 2012 shows that, among IDs of the collected chips determined by the chip tray determination device, two pieces of chips bet on banker pair should be collected, and that two pieces of chips of ID 6 and ID 18 that the chip reading device 25 has read as chips bet at the sitting number 5 have been collected.

The control device 2014 determines the total amount or the total number of the game tokens 1 expected to be collected for each sitting number, which is determined by using a measurement result of positions, an amount, and the number of the game tokens 1 based on a game result obtained from the game result determination device and an image analysis result by the image analyzer. Therefore, the control device 2014 can compare, to determine agreement, the total amount or the total number of the game tokens 1 collected for each sitting number, which is determined based on RFID, with the total amount or the total number of the game tokens 1 expected to be collected based on the image analysis result.

For example, in a case where a reading result by the chip reading device 25 of the sitting number 1 is "A, B, C, D, E," an analysis result by the image analyzer 2012 is "two pieces on tie, and two pieces on banker," the game result is "winning of banker," and a reading result by a chip tray determination device 18 is "A, B," it is understood that the chips A and B bet on tie have been correctly collected.

The control device 2014 can determine whether or not information of an ID of RFID of the collected game token 1 determined by the chip tray determination device agrees with information of an ID of RFID of the bet game token 1 read by the chip reading device 25. By this determination, it is possible to determine whether or not the game token 1 collected in the chip tray is the game token 1 bet on the game table, and whether or not the game token 1 is wrongly collected from another place.

The control device 2014 can determine, on the basis of the RFID information read by the chip reading device 25, a chip type such as a cash chip, a rolling chip, or a promotion chip, and can store an amount of bet money for each type of the determined chips and an amount of money collected or redeemed.

A rolling chip is a special chip that can be purchased by a specific member and cannot be exchanged for cash, and an amount of the purchased rolling chips is managed for each member. A rolling chip must be consumed for betting, and redemption for betting using a rolling chip is made by a cash chip. By storing an amount of the rolling chips bet or collected on the basis of the RFID information read by the chip reading device 25, an amount of rolling chips that a specific member is expected to have can be determined.

Figure 24:
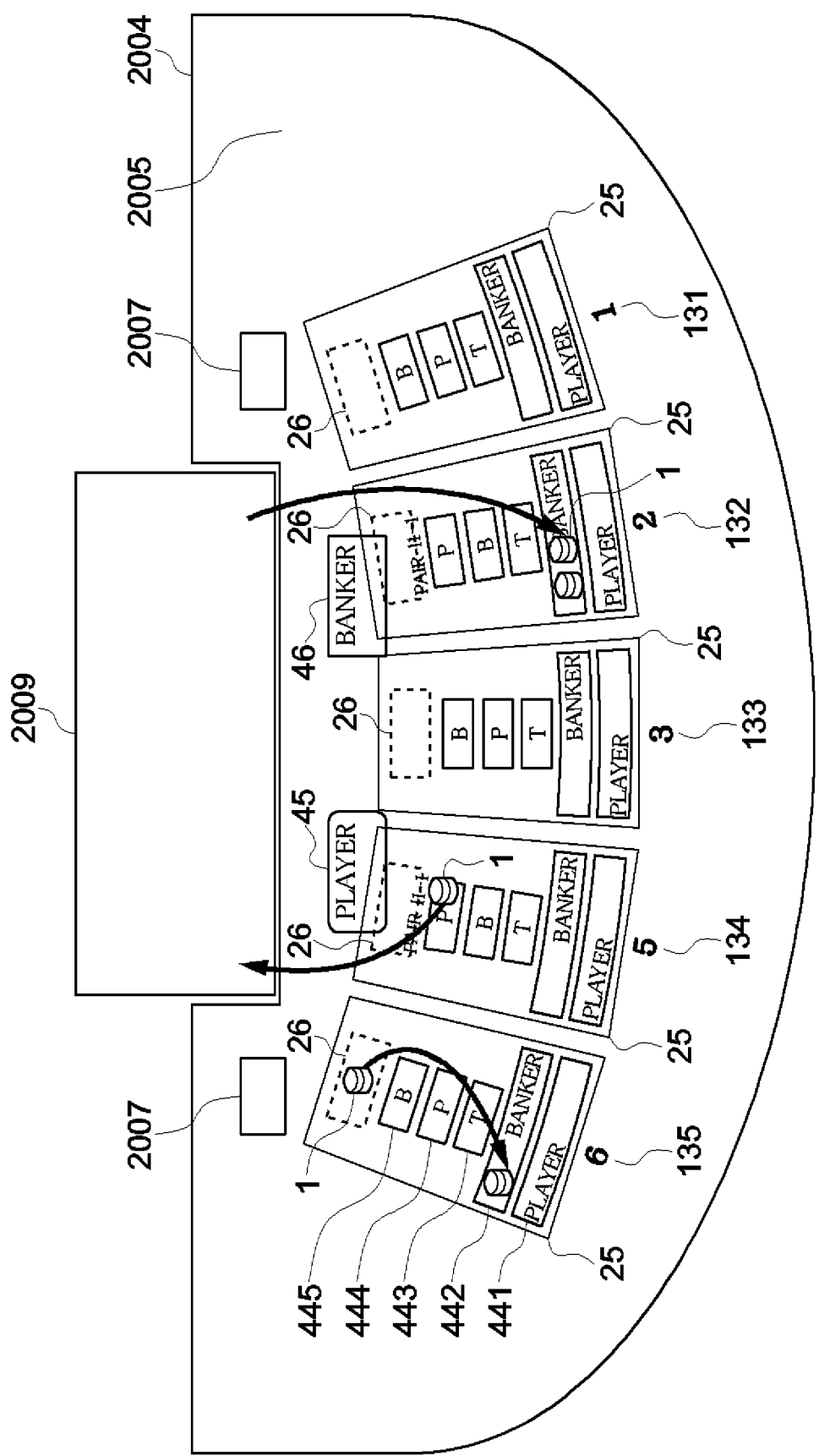
FIG. 24 shows a game table of Variation 4 of the embodiment of the present disclosure.
Figure 25:
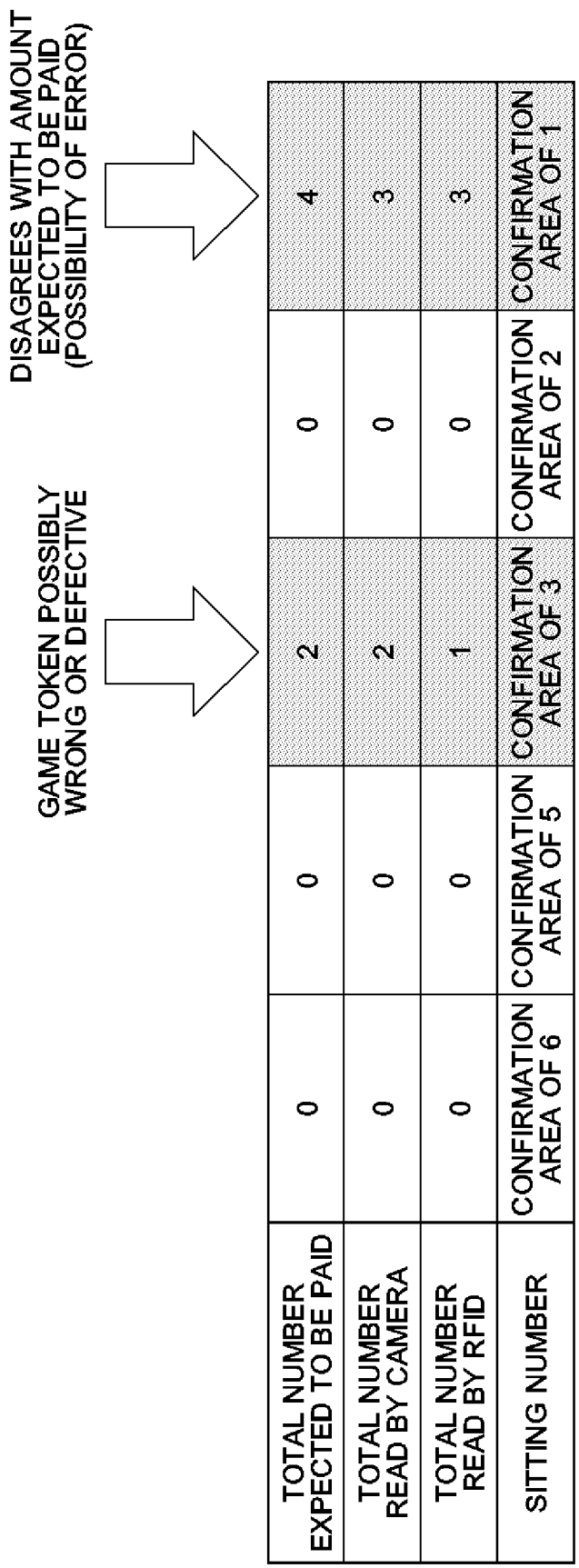
FIG. 25 shows a result of reading the chip by a camera and RFID in Variation 4 of the embodiment of the present disclosure.

The chip reading device 25 has a function of a confirmation area, and can read a game token 1 placed for redemption. As illustrated in FIG. 24, in a case where redemption is made to banker at the sitting number 2, the game token 1 for the redemption is placed and read in the chip reading device 25. In FIG. 24, the game tokens 1 are placed next to the won game tokens 1 bet on banker at the sitting number 2. The control device 2014 can compare an amount of redemption, which is determined by using a measurement result of a position, an amount, and the number of the game tokens 1 based on a game result obtained from the game result determination device and the image analysis result by the image analyzer, with an amount of the game tokens 1 placed for each sitting number, which is based on a reading result by the chip reading device 25, determine whether or not the amount of the redemption agrees with the amount of the game tokens 1 placed for each sitting number, and output a determined result. In FIG. 25, at the sitting number 1, the total number of the game tokens 1 expected to be paid is four, whereas a reading result by the chip reading device 25 is three, which means the total number of the game tokens 1 and the reading result disagree. In a case where an amount of redemption disagrees with an amount of the game tokens 1 placed for each sitting number, a signal indicating the disagreement is output, and the dealer can replace a game token 1 for redemption on the basis of the output signal. In a case where the game token 1 is replaced, determination is performed again, and a determination result can be output. An area for placing the game token 1 for redemption may be anywhere in the chip reading device 25. Further, as illustrated in FIG. 24, separately from a betting area, a payment confirmation area 26 may be arranged on a dealer side of the betting area. In FIG. 24, a game token 1 for redemption is placed in a payment confirmation area 26 at a sitting number 6, the chip reading device 25 performs reading, the control device 2014 makes determination, and a redemption chip is placed next to the won game token 1 placed in banker.

For the confirmation area, the image analyzer 2012 may perform image analysis, and the control device 2014 may check a result of the image analysis with a reading result by the chip reading device 25 to determine whether or not a total number of the result of the image analysis and a total number of the reading result by the chip reading device 25 match.

On the basis of the determination made, the control device 2014 can output a signal. The signal may be displayed in a display unit of the chip tray 9 or a display unit of a card distributor 13, or may be output to the pit manager or to the backyard of the casino.

Figure 26:
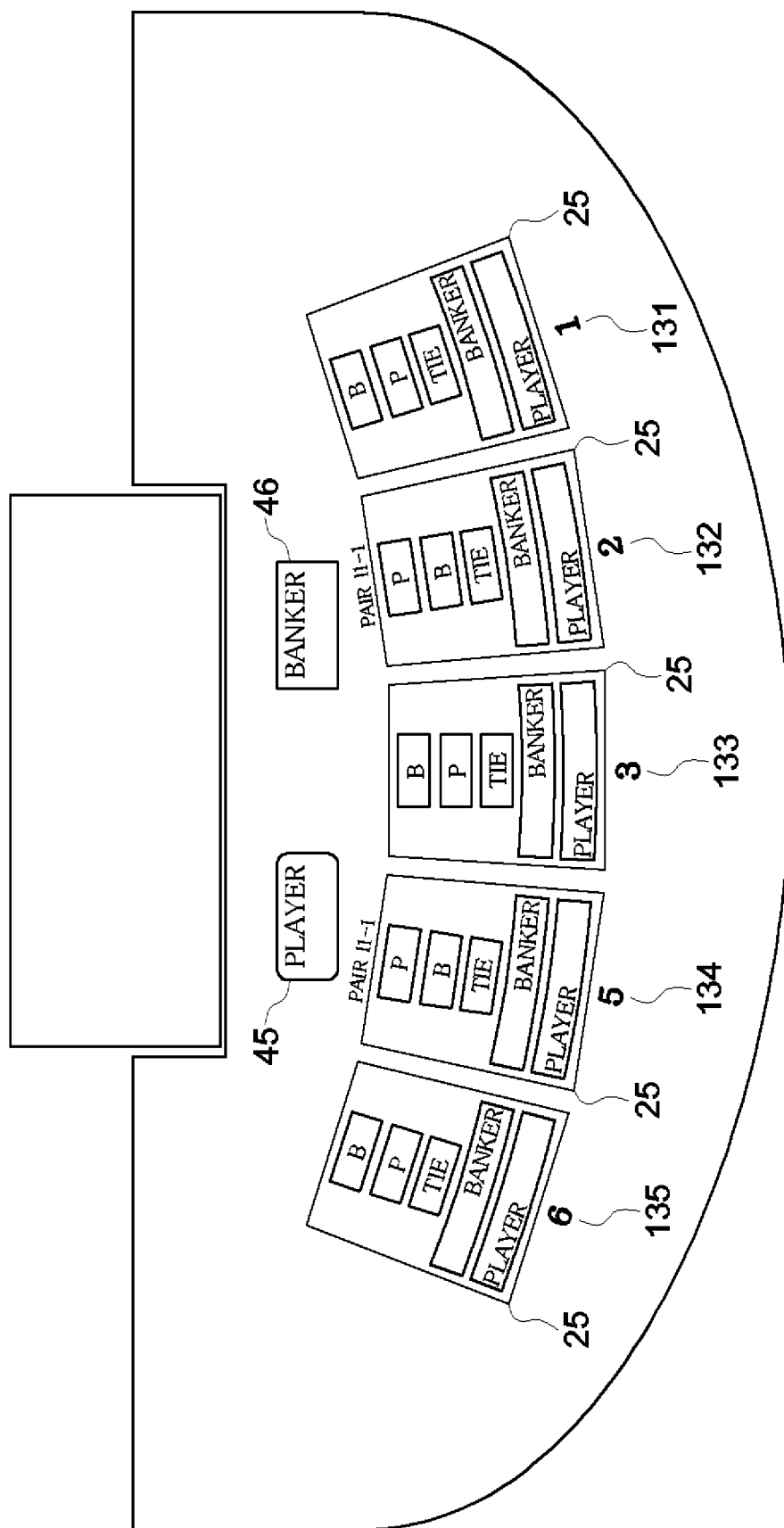
FIG. 26 shows another example of a game table of Variation 4 of the embodiment of the present disclosure.
Figure 27:
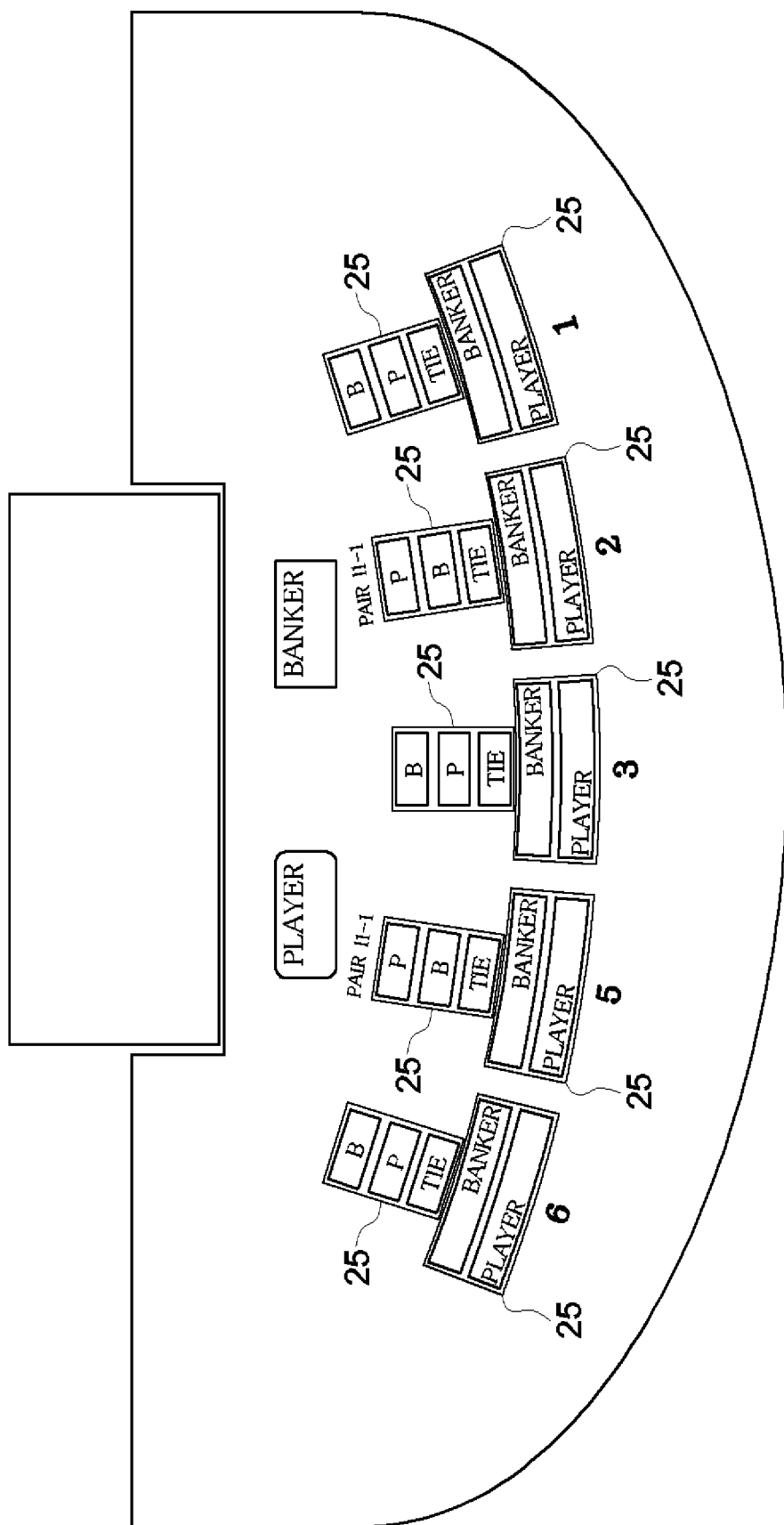
FIG. 27 shows another example of a game table of Variation 4 of the embodiment of the present disclosure.
Figure 28:
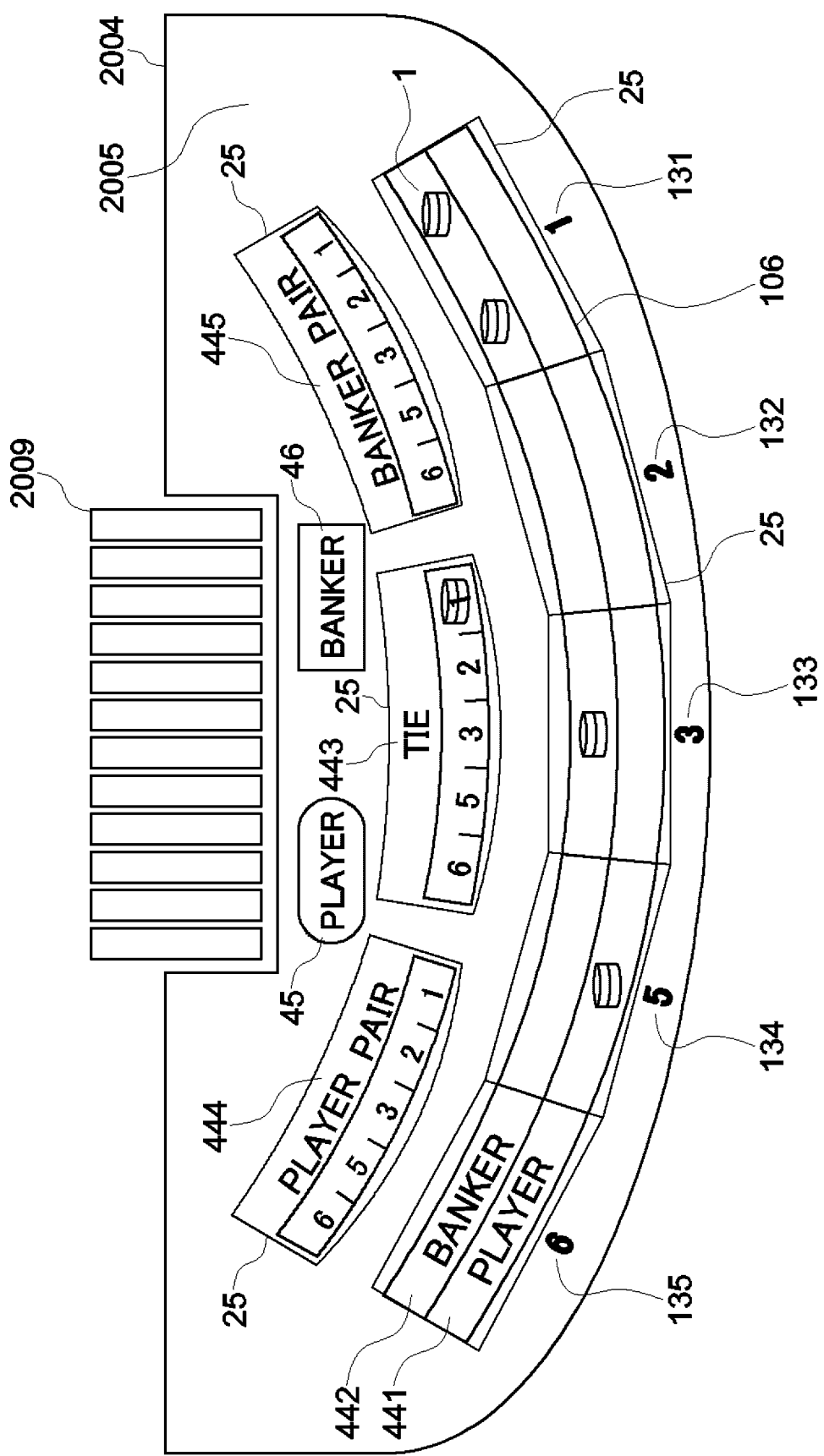
FIG. 28 shows another example of a game table of Variation 4 of the embodiment of the present disclosure.
Figure 31:
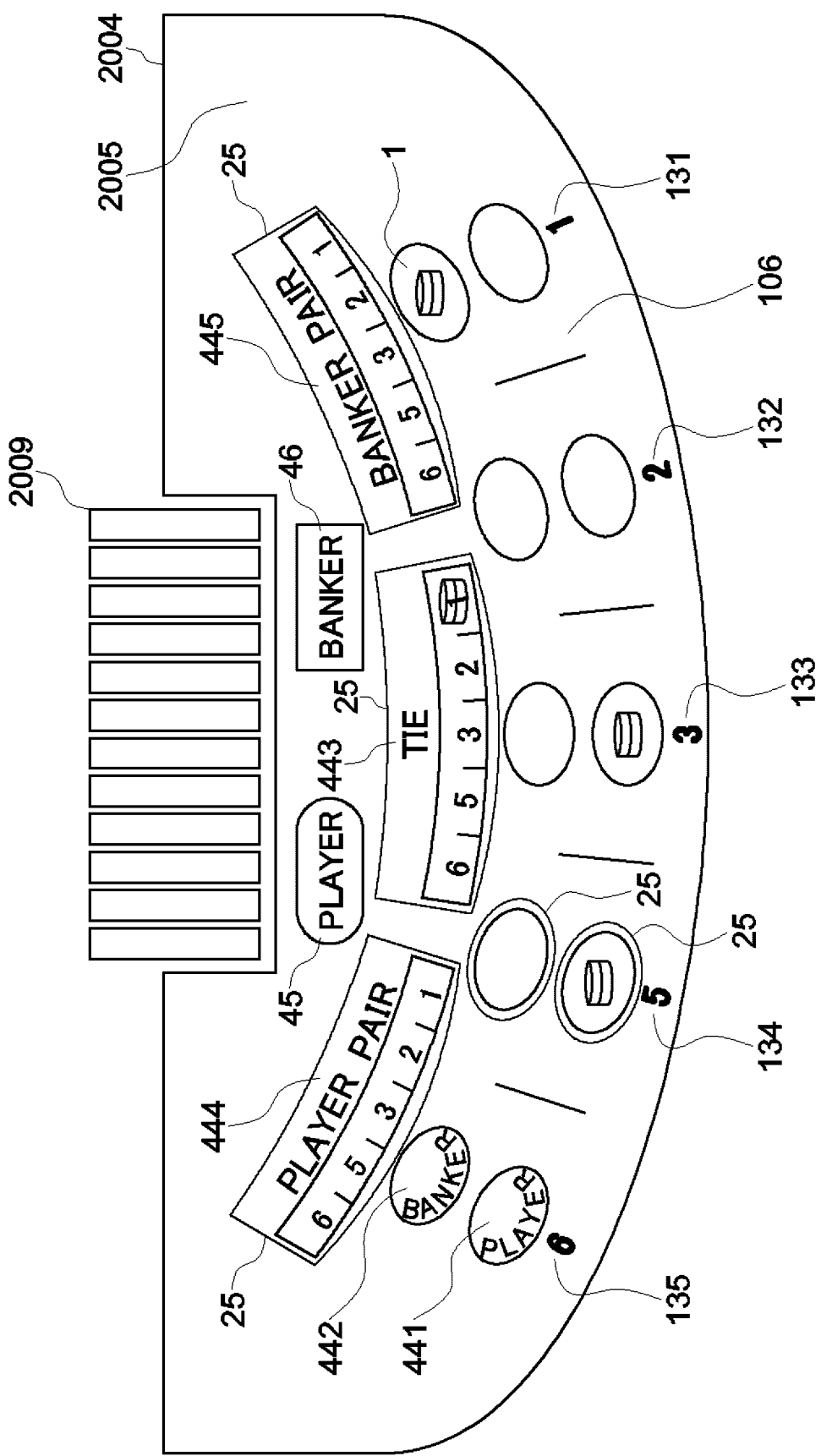
FIG. 31 shows a cross-sectional view of a game token of Variation 4 of the embodiment of the present disclosure.

The chip reading device 25 may use an entire betting area as one reading area for each sitting number as illustrated in FIG. 26, or may use, for each sitting number, a set of a player betting area and a banker betting area as one reading area, and a set of tie betting area, player pair betting area, and a banker pair betting area as one reading area as illustrated in FIG. 27. Further, as illustrated in FIGS. 18 and 31, each side betting area for a tie betting area, a player pair betting area, and a banker pair betting area may be treated as one reading area.

Figure 29:
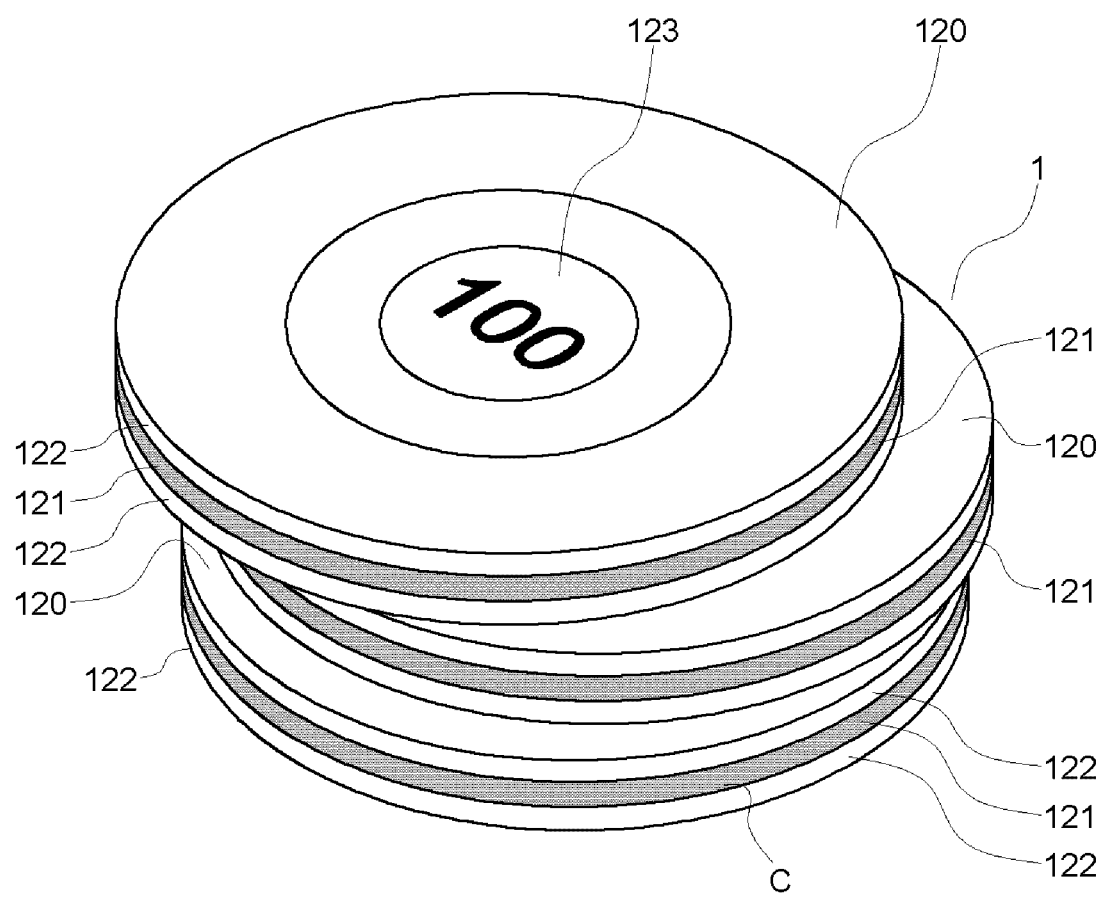
FIG. 29 shows a diagram of a game token of Variation 4 of the embodiment of the present disclosure.
Figure 30:
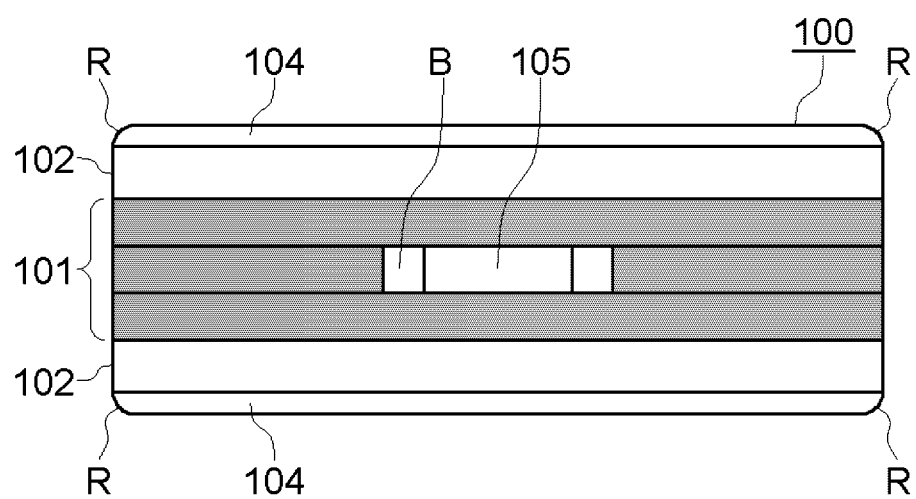
FIG. 30 shows a cross-sectional view of a game token of Variation 4 of the embodiment of the present disclosure.

A game token 1 used in an example will be described below. FIG. 29 is an external view of and FIG. 30 is a front sectional view of a game token 1 used in this system. The game token 1 has a multi-layer structure in which a plurality of plastic layers in different colors are laminated. The game token 1 includes at least an intermediate color layer 101 and white layers 102 or light color layers on both sides of the color layer 101. The light color layers, which are not illustrated, are required at least to be layers in color lighter than color of the color layer 101. With the multi-layer structure in which the intermediate color layer 101 and the white layers 102 or light color layers, which is not illustrated and required at least to be layers in color lighter than color of the color layer 101, on both sides of the color layer 101 are laminated, as illustrated in FIG. 29, to form a stripe pattern in a lamination direction on a side surface, and different colors (red, green, yellow, blue, or the like) are used for the color layer 101, a type (10 points, 20 points, 100 points, 1,000 points, or the like) of the game token 1 can be identifiable.

As illustrated in FIG. 30, the color layer 101 may be formed of a plurality of colored layers (FIG. 30 illustrates three layers). Because the plurality of the colored layers (three layers in FIG. 30) are thermally press-bonded to one another, three-layer structure is not visible as illustrated in FIG. 30 that illustrates the three layers for description. Furthermore, a bore B is partially provided in a middle of the three layers of the color layer 101, and RFID is embedded therein.

A structure of the game token 1 is not limited to a structure in which plastic is laminated, and may be similar to the color layer 101 in appearance.

A method for analyzing the game token 1 by the image analyzer 2012 will be described below in detail. The image analyzer 2012 analyzes an image recorded on a recorder 11 and recognizes at least two colors, which are a specific color 121 that is at least partially attached to the game token 1 and a reference color R that is present in the image and is different from the specific color 121. Note that the specific color 121 is at least partially provided to a predetermined position of a game token 1 or in a predetermined form. For example, the specific color 121 may be provided as the color layer 101, may be provided on a side surface of the game token 1 in a circumferential direction, or may be provided on a surface of the game token 1 as a predetermined mark. Further, the reference color R may be, for example, a color of a specific area of the game table 2004, or may be a color attached to a place different from the specific color 121 in the game token 1.

The image analyzer 2012 includes an artificial intelligence device 12a that identifies a specific color by, for example, deep learning technology, and determines the number and types of the game tokens 1 placed on the game table 2004. A recognition device 12 may further determine a position of the game token 1 on the game table 2004.

The image analyzer 2012 acquires a plurality of images of the game token 1 and reference color R, which are irradiated with different illuminances, learns the acquired images and a correct specific color 121 and reference color R of the game token 1 in each image as teaching data by teaching from a human, and creates a learning model 13a (recognition program). Note that a relative relation of the specific color 121 and the reference color R can be acquired, because in the images of the game token 1 and the reference color R irradiated with an illuminance of the same condition, the specific color 121 and the reference color R are irradiated with the same illuminance. For example, this relative relation may be used for recognition of the specific color 121.

Further, without using artificial intelligence, a chip recognition device 12 may extract a center line C of the game token 1 with a method for measuring a feature of a shape, brightness, saturation, and hue in the images by using a result of an image analysis of the images captured by a camera 200212 and recorded as images.

Furthermore, the artificial intelligence device 12a is configured to recognize at least two colors of the specific color 121 and the reference color R, which is different from the specific color 121 in a peripheral image of a predetermined range around the extracted center line C, by analyzing the peripheral image, which is for example a range of eight pixels orthogonal to the center line as a center. Note that, the extracted peripheral image of the predetermined range around the center line C may be analyzed as is, or after image processing such as color emphasis and noise reduction so that the specific color 121 can be easily recognized.

In summary, the artificial intelligence device 12a of the recognition device 12 is an artificial intelligence device configured to extract the center line C from the image of the game token 1 and recognize at least two colors of the specific color 121 and the reference color R different from the specific color 121, which are in the peripheral image, by analyzing the peripheral image of the predetermined range around the center line C as a center, and taught, as teaching data, the plurality of peripheral images of the game token 1 and the reference color R irradiated with different illuminances.

In another example, the control device 2014 further includes a function to determine at least one among whether or not: 1) in each game, there is transference of a chip from time of start of drawing cards or start of game operation by the dealer to time before display of a win/loss result of the game by a card distributor, 2) after an end of each game, there is transference of a chip by a person other than the dealer while the dealer is collecting the chips bet by a loser among the game participants, 3) after an end of each game, any chip has been added while the dealer is collecting a chip bet by a loser among the game participants, 4) after an end of each game, the dealer has paid to a position of a chip that a winner among the game participants has bet, and 5) after an end of each game, a winner among the game participants has taken a bet chip and a paid chip.

Further, the control device 2014 may be configured to determine at least one of 1) to 5) described above by detecting transference of hands of the dealer and game participant, transference of chips, or transference of the hands and the chips by using an analysis result from the image analyzer.

As a feature function, the control device 2014 has functions described in 1) to 5) below to determine whether or not there is any wrong against a rule of a baccarat game: 1) In each game, the control device 2014 monitors, by information that the image analyzer 2012 obtains by using the camera 2002, whether or not there is transference of a game token 1 from time of a signal that starts drawing of cards obtained from the card distributor 2003, or time of start of game operation by the dealer 2005 pressing a start button 4s to time before display of a win/loss result of the game by the card distributor 2003; 2) After an end of each game, the control device 2014 monitors, by information that the image analyzer 2012 obtains by using the camera 2002, whether or not a loser 6 has wrongly taken a game token 1 while the dealer 2005 is collecting a game token 1 bet by a loser among game participants 2006; 3) After an end of each game, the control device 2014 monitors, by information that the image analyzer 2012 obtains by using the camera 2002, whether or not a person other than the dealer 2005 (winner or loser) has added a won game token 1W or has replaced the game token 1 to a winning position not bet while the dealer 2005 is collecting a game token 1 bet by a loser among the game participants; 4) After an end of each game, the control device 2014 monitors, by information that the image analyzer 2012 obtains by using the camera 2002, whether or not the dealer 2005 has correctly placed a won game token 1W for payment to a position of the game token 1 that a winner among the game participants 2006 has bet; 5) After an end of each game (the dealer 2005 operates the card distributor 2003 to display a win/loss result in a display lamp 13), the control device 2014 monitors, by information that the image analyzer 2012 obtains by using the camera 2002, whether or not a winner 6W among the game participants 2006 has taken a bet game token 1 and a paid game token 1W.

Note that, in the above example, the image analyzer 2012 and the control device 2014 are devices having an artificial-intelligence utilization structure or deep-learning structure. Specifically, the image analyzer 2012 and the control device 2014 may analyze an image or perform various controls described above by using scale-invariant feature transform (SIFT) algorithm, a convolutional neural network (CNN), deep learning, machine learning, or the like. These technologies perform image recognition of a captured image to recognize an object included in the image. In recent years, in particular, deep learning technology using a multilayered neural networks has been used to recognize an object with high accuracy. This deep learning technology generally recognizes an object with high accuracy by, over a plurality of stages, layering in an intermediate layer between an input layer and an output layer of a neural network. Regarding this deep learning technology, a convolutional neural network, in particular, has drawn attention for having higher performance than a conventional object recognizing method based on an amount of image features.

In a convolutional neural network, a recognition object image to which a label is attached is learned, and a main object included in the recognition object image is recognized. If there are a plurality of main objects in a learning image, learning is performed by designating a region with a rectangle and attaching a label to an image corresponding to the designated region. Furthermore, in a convolutional neural network, it is also possible to determine a main object and position of the object in the image.

To further describe a convolutional neural network, an object recognition process involves extraction of candidate regions based on a local feature by performing edge extraction processing, or the like, on a recognition object image, input of the candidate regions to the convolutional neural network, classification of the candidate regions after extracting feature vectors, and obtainment of a classified candidate region with a highest degree of certainty as a recognition result. A degree of certainty is quantity indicating how much similarity of an object in an image learned together with a certain image region and a label is relatively higher than similarity of another class.

As described above, various examples have been described. However, it is needless to say that a device of the present embodiments may be modified by a person skilled in the art as appropriate within the scope of the preset disclosure according to a game to which the present disclosure is applied.

In order to solve the above-described conventional problem, a game token management system according to an embodiment has a configuration in which: a single RFID tag having a data non-rewritable area and a data rewritable area is attached to a game token, the data non-rewritable area of the RFID tag stores, as fixed information, at least one of production information of the game token, product information of the game token, casino information, amount information of the game token, or a serial number of the game token, the data rewritable area stores, as variable information, location information of the game token, and the variable information stored in the data rewritable area can be extracted from the fixed information stored in the data non-rewritable area in an identical RFID tag, and the game token management system further includes: a writer that adds the location information of the game token to the data rewritable area, a reader that can collectively reads the fixed information stored in the data non-rewritable area of the plurality of game tokens, on the basis of the read fixed information, can read the location information, which is a counterpart of the fixed information and stored in the data rewritable area, and a management control device that examines the location information obtained from the reader, in which the data rewritable area stores a plurality of pieces of location information including at least latest location information among all pieces of location information written by the writer, and the management control device includes a function to determine whether or not any abnormality is present in history of the location information obtained from the reader, and is configured to be able to, if there is abnormality, generate an error signal and identify the fixed information of the game token, which has been determined to be abnormal.

The data rewritable area is configured to store, together with the location information, information of time at which the writer writes to the game token, and the management control device is configured to determine, from the location information obtained from the reader, presence of abnormality by determining whether or not the game token has not been used for a predetermined period since last writing, or whether or not the location information, which is supported to be written, is not written.

In the management control device, the location information may include at least one of information indicating a cage, information indicating entry or exit, or information indicating a backyard, a situation where the game token has not been used for a predetermined period since last writing may be a situation where: 1) latest location information is information indicating a cage, and a predetermined period has passed before next information is written, 2) latest location information is information indicating entry, and a predetermined period has passed before next information is written, or 3) latest location information is information indicating exit, and a predetermined period has passed before next information is written, and a situation where location information, which is expected to be written, is not written may be a situation where: 4) at a time of entry to a gaming hall, information indicating exit is not written as latest location information in the data rewritable area of the game token, 5) at a time of use at the cage, information indicating a backyard is not written, or 6) at a time of exit from the gaming hall, information indicating a cage or a backyard is not written.

The location information may include information about an owner who owns the game token.

The management control device may have a function to determine, on the basis of the owner information obtained from the reader, presence of abnormality when: 1) a person different from a latest owner whose information is stored in the data rewritable area exchanges the game token for cash or another game token in the gaming hall, or exits the gaming hall, or 2) a person different from an owner at a time of exit whose information is stored in the data rewritable area brings the game token in the gaming hall.

The information about the owner of the game token may be identified by face authentication or ID card reading.

The location information may further include information indicating a place of a chip tray of a specific game table, information indicating a place of a betting area, or information indicating a payout area.

The management control device may have a function to determine, on the basis of information indicating location of the chip tray of the game table or information indicating a place of the betting area or of the payout area, which is obtained from the reader, presence of abnormality when: 1) a person different from a latest owner whose information is stored in the data rewritable area uses the game token at a game table, 2) a person different from the person who purchased a game token without a record of use at a game table attempts to exchange the game token at a cage, 3) a game token not including information indicating a cage or a backyard is used in the gaming hall, or 4) latest location information is information indicating a betting area or a payout area, and after a predetermined period has passed, the game token 1 is exchanged for cash at a cage or is used at a game table.

Information that the RFID tag has may be encrypted.

The data non-rewritable area may be configured to be functionally non-writable or locked to disable wiring of data.

The reader may be configured to collectively read the fixed information stored in the data non-rewritable area and location information stored in the data rewritable area, and the management control device may be configured to extract and determine, from the plurality of pieces of fixed information of the plurality of game tokens, which are obtained from the reader, the location information stored in the data rewritable area in an identical RFID tag.

In order to solve the above-described conventional problem, the game token according to an embodiment includes a single RFID tag having a data non-rewritable area and a data rewritable area, in which the data non-rewritable area stores, as fixed information, at least one of production information of the game token, product information of the game token, casino information, amount information of the game token, or a serial number of the game token, the data rewritable area is configured to store, as variable information, location information of the game token written by the writer, and configured to extract the variable information stored in the data rewritable area based on the fixed information stored in the data non-rewritable area in an identical RFID tag.

The game token may be configured to be able to collectively read the fixed information stored in the data non-rewritable area of the plurality of game tokens by a reader, and to read the location information stored in the data rewritable area on the basis of the read fixed information.

In order to solve the above-described conventional problem, the table game management system according to an embodiment includes: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reading device that reads RFID attached to the game token bet by each game participant, and a control device that determines an image analysis result by the image analyzer and a reading result by the chip reading device, in which the game table includes a plurality of betting areas including at least a player betting area and a banker betting area for each sitting number, the chip reading device reads the game token regarding an entire betting area as one reading area for each sitting number, or reads the game token for each of a plurality of reading areas by dividing the entire betting area into a plurality of reading areas which are less than the number of betting areas, and the control device is configured to be able to determine types and the number of the bet game tokens separately for each betting areas including at least the player betting area and the banker betting area, on the basis of an image analysis result by the image analyzer, determine whether or not a total amount or the total number of the game tokens for each of the sitting numbers or for each of the reading areas based on an image analysis result by the image analyzer agrees with a total amount or the total number of the game tokens for each of the sitting numbers or for each of the reading areas based on a reading result by the chip reading device, and output a determination result.

The control device may be configured to be able to output a sitting number with a determination result of disagreed amount or number.

The control device may be configured to be able to generate a signal that indicates a possibility that RFID attached to the game token is broken or RFID is not attached to the game token in a case where a total amount or the total number of the game tokens for each of the sitting numbers based on a reading result of the chip reading device is smaller than a total amount or the total number of the game tokens for each of the sitting numbers based on an image analysis result by the image analyzer.

The control device may further be configured to be able to generate a signal that indicates a possibility of a reading error by the image analyzer reading the game token in a case where the total amount or the total number of the game tokens for each of the sitting numbers based on a reading result of the chip reading device is larger than the total amount or a total number of the game tokens for each of the sitting numbers based on an image analysis result by the image analyzer.

The table game management system may include a database storing an ID of RFID attached to the game token, and the control device may be configured to be able to check an ID of RFID based on a reading result by the chip reading device with an ID stored in the database, determine authenticity of the game token, and output a determination result.

The table game management system includes: a chip tray that keeps a game token used by a dealer at a game table, a chip tray determination device that can determine types and the number of the game tokens contained in the chip tray, and a game result determination device that determines a game result of each game at the game table, in which the control device may include: a calculation function that calculates income and outgo at a game table for a casino, at every collection and redemption for each game by using a measurement result of positions, an amount, and the number of game tokens based on a game result obtained from the game result determination device and an image analysis result by the image analyzer, a collection determination function that, after collection of lost chips bet by each game participant, compares an amount of chips at the game expected to be collected, which is calculated from positions, types, and the number of chips bet by each game participant at the game table, and the game result with an amount of actually collected chips in the chip tray, and determines whether or not there is a difference between the amount of the chips expected to be collected and the amount of the actually collected chips to determine whether or not there has been any wrong or an error with the collection of the game token, and a redemption determination function that performs redemption for a chip expected to be redeemed, compares, after the redemption, a total amount of chips expected to be in the chip tray based on an amount of the chips to be redeemed in the game, which is calculated from positions, types, and the number of chips bet by each game participant at the game table, and the game result, with an actual total amount of chips in the chip tray, and if having determined that there is a difference between the expected total amount and the actual total amount, determines that there has been a wrong or an error with the redemption.

The control device may be configured to identify the collected game token for each sitting number on the basis of information of an ID of RFID of the collected game token determined by the chip tray determination device and information of an ID of RFID of the game token read by the chip reading device, compare, IDs, an amount, or the number of the identified game tokens with IDs, an amount, or the number of the game tokens expected to be collected for each sitting number, which has been determined by using a measurement result of positions, an amount, or the number of the game tokens based on a game result obtained from the game result determination device and an image analysis result by the image analyzer, and determine whether or not the IDs, an amount, or the number of the identified game tokens agrees with the IDs, an amount, or the number of the game tokens expected to be collected for each sitting number.

The control device may be configured to be able to determine, at each game, a type of the game token classified by application or purpose of use on the basis of information of ID of RFID of the game token read by the chip reading device, and store, for each sitting number, an amount of the bet game tokens or an amount of the collected or redeemed game tokens by the type.

The control device may be configured to be able to store a cumulative amount of the game tokens bet by type or a cumulative amount of the collected or redeemed game tokens for each sitting number in a plurality of games.

A type of the game token may be at least a cash chip, a rolling chip, or a promotion chip.

The control device may be configured to be able to identify an owner on the basis of ID information of the rolling chip and store a cumulative amount of bet, collected, or redeemed rolling chip for each owner.

The chip reading device may be configured to read the game token for redemption placed on the chip reading device for each sitting number, and the control device may be configured to be able to compare an amount of redemption, which is determined by using a measurement result of a position, an amount, and the number of the game tokens based on a game result obtained from the game result determination device and an image analysis result by the image analyzer, with an amount of the game tokens placed for each sitting number, which is based on the reading result by the chip reading device, determine whether or not the amount of the redemption agrees with the amount of the game tokens placed for each sitting number, and output a determined result.

Further, the control device may be configured to be able to display disagreement in a case where a determination result of the redemption disagrees, perform determination again in a case where there has been any change in amount of the game tokens placed on and read by the chip reading device for each sitting number, and output agreement or disagreement again.

The control device may be configured to be able to compare an amount of the game tokens placed for redemption for each sitting number with increase or decrease in amount of the game tokens in the chip tray from before redemption to after the redemption and determine whether or not there is a difference.

The chip reading device may include a payment confirmation area, which is arranged on a dealer side of the betting area, for placing the game token for redemption.

The table game management system may further include a game participant identification unit using a face authentication system or a player ID card, and the control device may be configured to be able to associate the sitting number with information of the game participant identified by the game participant identification unit.

A display unit that displays based on output of the control device may be included.

The game table may include a side betting area, in which the side betting area may be adjacently provided with a betting area for each sitting number, the chip reading device may be able to collectively read at least one side betting area, and the control device may be configured to be able to determine types and the number of the game tokens bet at least one side betting area on the basis of an image analysis result by the image analyzer, determine whether or not a total amount or the total number of the game tokens in at least one side betting area based on an image analysis result by the image analyzer agrees with a total amount or the total number of the game tokens in the side betting area based on a reading result by the chip reading device, and output a signal of a determination result.

Another aspect is a table game management system including: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reading device that reads RFID attached to the game token bet by each game participant, and a control device that determines an image analysis result by the image analyzer and a reading result by the chip reading device, in which the game table includes a betting area including a player betting area, a banker betting area, and a side betting area, the side betting area is adjacently provided with a betting area for each sitting number, the chip reading device is able to collectively read at least one side betting area, and the control device is configured to be able to determine types and the number of the bet game tokens separately for at least one side betting area on the basis of an image analysis result by the image analyzer, determine whether or not a total amount or the total number of the game tokens for at least one side betting area based on an image analysis result by the image analyzer agrees with a total amount or the total number of the game tokens of the side betting based on a reading result by the chip reading device, and output a signal of a determination result.

The control device may be configured to be able to output the side betting with a determination result of disagreeing amount or number.

The control device may be configured to be able to generate a signal that indicates a possibility that RFID attached to the game token is broken or RFID is not attached to the game token in a case where a total amount or the total number of the game tokens for each side betting based on a reading result of the chip reading device is smaller than a total amount or the total number of the game tokens for each side betting based on an image analysis result by the image analyzer.

The control device may be configured to be able to generate a signal that indicates a possibility of a reading error by the image analyzer reading the game token in a case where a total amount or the total number of the game tokens for each side betting based on a reading result of the chip reading device is larger than a total amount or the total number of the game tokens for each side betting based on an image analysis result by the image analyzer.

The control device may include a database storing ID of RFID attached to the game token and may be configured to be able to check an ID of RFID based on a reading result by the chip reading device with an ID stored in the database, and determine authenticity of the game token.

The control device may be configured to be able to identify the collected game token for each side betting on the basis of information of an ID of RFID of the collected game token determined by the chip tray determination device and information of an ID of RFID of the game token read by the chip reading device, compare IDs, an amount, or the number of the game tokens expected to be collected for each side betting, which has been determined by using a measurement result of positions and an amount of the game tokens based on a game result obtained from the game result determination device and an image analysis result by the image analyzer, with IDs, an amount, or the number of the game tokens collected for each side betting, and determine whether or not a collecting amount agrees for each side betting.

When there is a single chip or stack of chips to be paid within a reading area of single chip reading device 25, the bet chips can be paired with the payout chips to be associated with ownership information without detecting the chips moving outside the reading area of the chip reading device 25. In other words, if there is one game token 1001 or one stack consisting of several game token 1001 in the reading area of one chip reading device 25, the ownership information can be associated by pairing the bet chips and the payout chips, without detecting the movement of the chip outside the area of the chip reading device 25, based on information about the disappearance of the payout chips from the chip tray or information indicating that the payout chips have been read by the chip reading device 25 on the table. Of course, it is possible to recognize the bet chips based on information about the chips moved outside the reading area of the chip reading device 25, and associate information on owner of the payout chips based on the ownership information of the bet chips by pairing the payout chips and the bet chips using some of information of chips taken out from the chip tray, information of chips placed at the bet area, or information on chips moved outside of the reading area of the chip reading device 25. It may also be configured to read the ID of the chip by RFID and recognize the type and number of chips and identify a stack by a camera.

The case where a single chip or a single stack of chips to be paid within a reading area of a chip reading device 25 includes a case where there is only one chip or only one stack of chips in the reading area at the time the bet is placed, or where there were multiple stacks at the time the bet is placed, but as the payment proceeds, the stack became the last one. Only the last stack of bet chips may be paired with the payout chips and associated with the ownership information. In this case, the last remaining stack can be the chips bet by the member to ensure that the member's chips are traced. It is desirable to allow one member to bet per chip reading device (e.g. per player position) and multiple non-members to bet. When there is one member per player position, the information of the member assigned to each player position can be ascertained from the information on the bet chips, since the chips are associate with the owner. Also, when there is a rule that members bet chips before non-member members, the information of the member assigned to the player position (e.g. sitting in player position 1) may be associated with the chip that was bet first in the player position, or the association may be confirmed. To assign a member to a player position, a member card may be used.

The chip reading devices 25 may be provided for each area including player area, bunker area, tie area, pair area, etc., or for each player position, or for each of multiple divisions of the entire table, such as player positions 1-3 and player positions 4-6, or one large reading device 25 for the entire table may be provided. In any case, it is possible to update the ownership information etc. by pairing the bet chip and the payout chip based on information that the chips have been moved out of the reading area of the chip reading device (i.e., the chips are no longer read by the chip reading device), the IDs of the payout chips that have disappeared from the chip tray, and the IDs of the payout chips that have been placed in the betting area.

REFERENCE SINGS LIST

| | |
|---|---|
| 31 Vault | 321 Antenna |
| 32 Procedure room | 322 Activation reader/writer |
| 33 Cashier | 323 Central verification device |
| 34 Bank | 324 Input device |
| 35 Pit | 325 Registration device |

-continued

REFERENCE SINGS LIST

| | |
|---|---|
| 36 Table | 326 Database |
| 72 Gaming chips | 327 Barcode reader |
| 73 Data files | 328 Operation device |
| 74 Player | 330 Cashier system |
| 75 Dealer | 340 Bank system |
| 100 RFID tag manufacturing factory | 350 Pit systems |
| 200 Chip manufacturing factory | 360 Table system |
| 211 TID area | 720 Chip case |
| 212 EPC area | 722 Barcode |
| 300 Casino | 721 RFID tag |
| 301 Backyard | 3291 Camera |
| 302 Floor | 3292 Image recognition device |
| 320 Procedure room system | |

The invention claimed is:

1. A casino system in a casino configured to use a casino item including a radio-frequency identification (RFID) tag configured to store identification information, the casino system comprising:
   a determination device configured to determine whether or not the identification information read from the RFID tag matches identification information prepared by a manufacturer of a plurality of casino items delivered from the manufacturer to the casino, the plurality of casino items including the casino item;
   a registration device that is installed in the casino and is configured to, for the casino item which is to be used in the casino:
      based on a determination by the determination device that the identification information read from the RFID tag of the casino item matches the identification information prepared by the manufacturer, update a usable/unusable status of activation information related to the casino item to usable in a database; and
   a verification device that is installed at a casino items handling location in the casino and is configured to:
      read the identification information from the RFID tag of the casino item; and
      verify, based on the identification information read from the RFID tag by the verification device, whether or not the usable/unusable status of the activation information related to the casino item is usable in the database.

2. The casino system according to claim 1, wherein the registration device is configured to register, in the database, the casino item based on the determination by the determination device that the identification information read from the RFID matches the identification information prepared by the manufacturer.

3. The casino system according to claim 2, wherein the database is configured to store the identification information that is determined, by the verification device, to match the identification information read from the RFID tag by the verification device.

4. The casino system according to claim 3, wherein the verification device is configured to verify whether or not the identification information read by the verification device from the RFID tag is stored in the database.

5. The casino system according to claim 2, wherein the determination device is configured to perform the determination when a registration is performed by the registration device.

6. The casino system according to claim 2, wherein the determination device is installed in a factory that manufactures the plurality of casino items and is configured to perform a determination, at the factory, about the plurality of casino items that are manufactured and to be shipped.

7. The casino system according to claim 2, wherein the registration device is configured to update the database so as to make the usable/unusable status of the activation information related to at least one casino item of the plurality of casino items registered in the database as unusable under a predetermined condition.

8. The casino system according to claim 7, wherein the verification device is configured to, even if the identification information read from the RFID tag of the casino item by the verification device matches the identification information prepared by the manufacturer, in a case where the usable/unusable status of the activation information related to the casino item is not usable in the database, determine that the casino item is unusable.

9. The casino system according to claim 2, wherein the registration device is configured to update the database so as to delete from the database the casino item that meets a predetermined condition.

10. The casino system according to claim 2, wherein:
the casino item carries information for identifying the casino item in a manner other than the RFID tag, and
the registration device is configured to update the database, when the identification information cannot be read from the RFID tag but when the information carried by the casino item is identifiable, so as to make the usable/unusable status of the activation information related to the casino item unusable or remove the casino item from the database.

11. The casino system according to claim 2, wherein the identification information stored by the RFID includes tag identification information assigned by a manufacturer of the RFID tag and item identification information assigned by the manufacturer of the casino item.

12. The casino system according to claim 11, wherein the verification device is configured to:
match the item identification information read from the casino item at the casino items handling location in the casino with the item identification information read in the past, and
at a predetermined timing and/or under a predetermined condition, match the tag identification information read from the casino item at the casino items handling location with the tag identification information of the casino item registered in the database.

13. The casino system according to claim 2, wherein:
the identification information prepared by the manufacturer of the plurality of casino items is encrypted, and
the registration device has a function to decrypt the encrypted identification information.

14. The casino system according to claim 2, wherein the registration device is configured to register multiple casino items of the plurality of casino items simultaneously, the multiple casino items including the casino item.

15. The casino system according to claim 14, wherein:
the multiple casino items of the plurality of casino items received from the manufacturer are contained in a single case,
the case is provided with case identification information,
the casino system further comprises a reading device configured to read the case identification information, and
the determination device is configured to determine whether or not case identification information given by the manufacturer matches the case identification information read by the reading device.

16. The casino system according to claim 14, wherein:
the multiple casino items of the plurality of casino items received from the manufacturer are contained in a single case that can hold a predetermined number of casino items, and
the determination device is configured to determine whether a number of the casino items based on the number of the identification information read from the RFID tag matches the predetermined number of casino items that can be accommodated in the case.

17. The casino system according to claim 14, wherein:
the multiple casino items of the plurality of casino items accepted from the manufacturer are contained in a single case,
the case is provided with case identification information,
the casino system further comprises a reading device configured to read the case identification information, and
the determination device is configured to:
identify the identification information of the multiple casino items contained in the case based on the case identification information read by the reading device, and
determine whether or not the identified identification information matches the identification information read from the RFID tag.

18. The casino system according to claim 1, wherein:
the RFID tag stores manufacturing information indicating a manufacturing status of the casino item, type information indicating a type of the casino item, and/or casino information associated with the casino where the casino item is used, and
the manufacturing information, the type information, and/or the casino information corresponding to the identification information is given to the registration device by the manufacturer, along with the identification information.

19. The casino system according to claim 18, wherein:
the type information and the identification information are prepared by a manufacturer, and the type of the casino item is specified by an operator of the determination device, and
the determination device is configured to determine whether or not the type information prepared by the manufacturer corresponding to the identification information read from the RFID tag matches the type information specified by the operator.

20. The casino system according to claim 1, wherein:
the RFID tag is configured to store type information indicating a type of the casino item,
a type of the casino item to be determined is specified to the determination device by an operator of the registration device, and
the determination device is configured to determine whether or not the type information read from the RFID tag matches the type information specified by the operator.

21. The casino system according to claim 1, further comprising:
an identification device configured to capture an image of the casino item and identify type information of the casino item based on the image,
wherein the determination device is configured to:
be provided with the type information along with the identification information from the manufacturer and be provided with the type information identified by the identification device, and
determine whether or not the type information given by the manufacturer corresponding to the identification information read from the RFID tag matches the type information identified by the identification device.

22. The casino system according to claim 1, further comprising:
an identification device that is configured to capture an image of the casino item and identify type information of the casino item based on the image,
wherein:
the RFID tag stores type information indicating a type of the casino item, and
the determination device is configured to determine whether or not the type information read from the RFID tag matches the type information identified by the identification device.

23. The casino system according to claim 18, wherein the type information is information representing a value of the casino item.

24. The casino system according to claim 1, wherein the casino item further has the identification information by means other than the RFID tag.

25. The casino system according to claim 1, wherein:
the identification information prepared by the manufacturer has date information, and
the determination device is configured to determine whether or not a difference between the date information provided by the manufacturer and the current date is greater than a predetermined threshold.

26. The casino system according to claim 1, wherein the casino item is configured to be used by a player in the casino to bet in a game and can be redeemed for cash.

27. The casino item with the RFID tag storing the identification information, used in a casino system according to claim 1.

28. The casino system according to claim 1, wherein the registration device is configured not to update, for the casino item which is broken, the usable/unusable status of the activation information to usable.

29. The casino system according to claim 1, wherein the registration device is configured not to update, for the casino item whose RFID tag is broken, the usable/unusable status of the activation information to usable.

30. The casino system according to claim 1, wherein the registration device is configured not to update, for the casino item determined by the determination device to have the identification information read from the RFID that matches the identification information prepared by the manufacturer but which is not to be used yet and stored, the usable/unusable status of the activation information to usable.

31. The casino system according to claim 1, wherein the registration device is further configured to, for each casino item of the plurality of casino items manufactured by the manufacturer and delivered to the casino for use in the casino:
based on determination by the determination device that the identification information read from the RFID tag of the casino item matches the identification information prepared by the manufacturer, update a usable/unusable status of activation information related to the casino item to usable in the database.

32. A casino system installed in a backyard of a casino configured to use a casino item with a radio-frequency identification (RFID) tag that stores identification information, the casino system comprising:
a first reading device configured to read the RFID tag of the casino item received from a manufacturer of a plurality of casino items that include the casino item;
an inspection device configured to compare identification information given by the manufacturer with the identification information read from the RFID tag of the casino item by the first reading device; and
a registration device configured to update, for the casino item which is determined to have the identification information read from the RFID by the first reading device that matches the identification information by the manufacturer, a usable/unusable status of activation information related to the casino item to usable in a database.

33. The casino system according to claim 32, further comprising:
a camera configured to capture an image of the casino item to be read by the first reading device; and
an image recognition device configured to obtain a number of casino items by performing image recognition on the image,
wherein the inspection device is configured to compare the number of casino items obtained by the image recognition device with a number of RFID tags read by the first reading device.

34. The casino system according to claim 32, wherein:
the first reading device is configured to read RFID tags of multiple casino items contained in a case capable of containing a predetermined number of casino items, and
the inspection device is configured to compare the predetermined number of casino items with a number of the RFID tags read by the first reading device.

35. The casino system according to claim 34, further comprising:
an input device configured to receive an input of a number of casino items from an operator,
wherein the inspection device is configured to compare the number of casino items received by the input device with the number of RFID tags read by the first reading device.

36. A casino system in a casino that is configured to use a casino item with a radio-frequency identification (RFID) tag that stores identification information, the casino system comprising:
a registration device that is installed in the casino and configured to, for the casino item received from a manufacture of the casino item to be used in the casino and having identification information stored at the RFID tag that is determined to match identification information provided by the manufacturer of the casino item, update a usable/unusable status of activation information related to the casino item to usable in a database; and
a verification device that is installed at a casino item handling location in the casino and configured to read the identification information from the RFID tag of the casino item and verify whether or not the usable/unusable status of the activation information related to the casino item whose identification information is read is usable in the database.

37. The casino system according to claim 36, further comprising a determination device configured to determine whether or not the identification information read from the RFID tag matches the identification information prepared by a manufacturer of the casino item.

38. The casino system according to claim 37, wherein the registration device is configured to register, in the database, the casino item based on a determination by the determination device that the identification information read from the RFID tag matches the identification information prepared by the manufacturer of the casino item.

39. The casino system according to claim 36, wherein the registration device is configured not to update, for the casino item which is broken, the usable/unusable status of the activation information to usable.

40. The casino system according to claim 36, wherein the registration device is configured not to update, for the casino item whose RFID tag is broken, the usable/unusable status of the activation information to usable.

41. The casino system according to claim 37, wherein the registration device is configured not to update, for the casino item determined by the determination device to have the identification information read from the RFID that matches the identification information prepared by the manufacturer but which is not to be used yet and stored, the usable/unusable status of the activation information to usable.

42. A casino system associated with a casino, the casino system comprising:
   a determination device configured to perform a comparison between chip identification information read from a radio-frequency identification (RFID) tag of a casino item to be used in the casino and manufacturer identification information prepared by a manufacturer of a plurality of casino items;
   a registration device configured to, based on a result of the comparison associated with a determination that the chip identification information read from the RFID tag of the casino item matches the manufacturer identification information prepared by the manufacturer, update activation information related to the casino item to indicate that a usable/unusable status of is usable, the activation information stored at a database; and
   a verification device configured to, based on the chip identification information read from the RFID tag of the casino item by the verification device and based on the database, verify that the usable/unusable status of the activation information related to the casino item is usable.

43. The casino system according to claim 42, wherein:
   the registration device is installed in the casino;
   the verification device that is installed at a casino items handling location in the casino; or
   a combination thereof.

44. The casino system according to claim 42, wherein the plurality of casino items manufactured by the manufacturer include the casino item and are delivered to the casino for use in the casino.

45. The casino system according to claim 44, wherein each casino item of the plurality of casino items includes an RFID tag configured to store chip identification information of the casino item.

46. The casino system according to claim 45, wherein, for each casino item of the plurality of casino items:
   the determination device configured to determine whether or not chip identification information read from the RFID tag of the casino item matches the manufacturer identification information prepared by the manufacturer.

47. The casino system according to claim 46, wherein, for each casino item of the plurality of casino items:
   the registration device configured to, based on a determination that the chip identification information of the casino item matches the manufacturer identification information, update activation information related to the casino item and stored in the database to indicate that a usable/unusable status of the casino item is usable.

48. The casino system according to claim 46, wherein, for each casino item of the plurality of casino items:
   the registration device configured to, based on a determination by the determination device that the chip identification information of the casino item matches the manufacturer identification information, set a status of the casino item in the database to usable to individually register the casino item in the database.

* * * * *